(12) United States Patent
Li et al.

(10) Patent No.: US 11,592,969 B2
(45) Date of Patent: Feb. 28, 2023

(54) AUTOMATED TOOLS FOR GENERATING BUILDING MAPPING INFORMATION

(71) Applicant: MFTB Holdco, Inc., Seattle, WA (US)

(72) Inventors: Yuguang Li, Seattle, WA (US); Pierre Moulon, Seattle, WA (US); Lambert E. Wixson, Bellevue, WA (US); Christopher Buehler, Seattle, WA (US); Ivaylo Boyadzhiev, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 330 days.

(21) Appl. No.: 17/069,800

(22) Filed: Oct. 13, 2020

(65) Prior Publication Data

US 2022/0114291 A1 Apr. 14, 2022

(51) Int. Cl.
| | |
|---|---|
| G06F 3/0484 | (2022.01) |
| H04W 4/024 | (2018.01) |
| G06T 19/00 | (2011.01) |

(52) U.S. Cl.
CPC ............ *G06F 3/0484* (2013.01); *G06T 19/00* (2013.01); *H04W 4/024* (2018.02); *G06T 2210/04* (2013.01)

(58) Field of Classification Search
None
See application file for complete search history.

(56) References Cited

U.S. PATENT DOCUMENTS

| | | |
|---|---|---|
| 5,140,352 A | 8/1992 | Moore et al. |
| 6,031,540 A | 2/2000 | Golin et al. |

(Continued)

FOREIGN PATENT DOCUMENTS

| | | |
|---|---|---|
| EP | 2413097 A2 | 2/2012 |
| EP | 2505961 A2 | 10/2012 |

(Continued)

OTHER PUBLICATIONS

"Deep Floor Plan Recognition Using a Multi-Task network with Room-Boundary-Guided Attention", https://arxiv.org/pdf/1908.11025. pdf, 9 pages (Year: 2019).*

(Continued)

*Primary Examiner* — Adam M Queler
*Assistant Examiner* — Haimei Jiang
(74) *Attorney, Agent, or Firm* — VLP Law Group LLP; James A. D. White

(57) ABSTRACT

Techniques are described for computing devices to perform automated operations related to using images acquired in a building as part of generating a floor plan for the building, in some cases without using depth information from depth-sensing equipment about distances from the images' acquisition locations to objects in the surrounding building, and for subsequent use in further automated manners, such as controlling navigation of mobile devices and/or for display to end users in a corresponding GUI (graphical user interface). In some cases, the MIGM system interacts with an MIGM system operator user, such as by displaying a GUI showing information related to the images and/or a floor plan being generated, and by receiving and using input submitted by the user via the GUI to assist with the generating of the floor plan, such as to specify interconnections between particular rooms via particular inter-room wall openings of the rooms.

34 Claims, 26 Drawing Sheets

(56) References Cited

U.S. PATENT DOCUMENTS

| | | |
|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,395,435 B2 | 8/2019 | Powers et al. |
| 2006/0256109 A1 | 11/2006 | Acker et al. |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2015/0116691 A1* | 4/2015 | Likholyot ............ G01C 15/002 356/4.01 |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1* | 12/2018 | Hovden ............... G06T 15/04 |
| 2019/0012833 A1 | 1/2019 | Eraker et al. |

(56) References Cited

U.S. PATENT DOCUMENTS

| | | |
|---|---|---|
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0074668 A1* | 3/2020 | Stenger .................. G06V 10/82 |
| 2020/0116493 A1* | 4/2020 | Colburn ................... G06T 7/73 |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

"Antomatic Generation of Structural Building Descriptions from 3D Point Cloud Scans", https://ieeexplore.ieee.org/stamp/stamp.jsp?tp=&arnumber=7296039, 8 pages (Year: 2014).*

CubiCasa | From video to floor plan in under 5 minutes, retrieved on Mar. 26, 2019, from https://www.cubi.casa/, 6 pages.

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGuide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform For Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How To Make A 3-D Model Of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

* cited by examiner

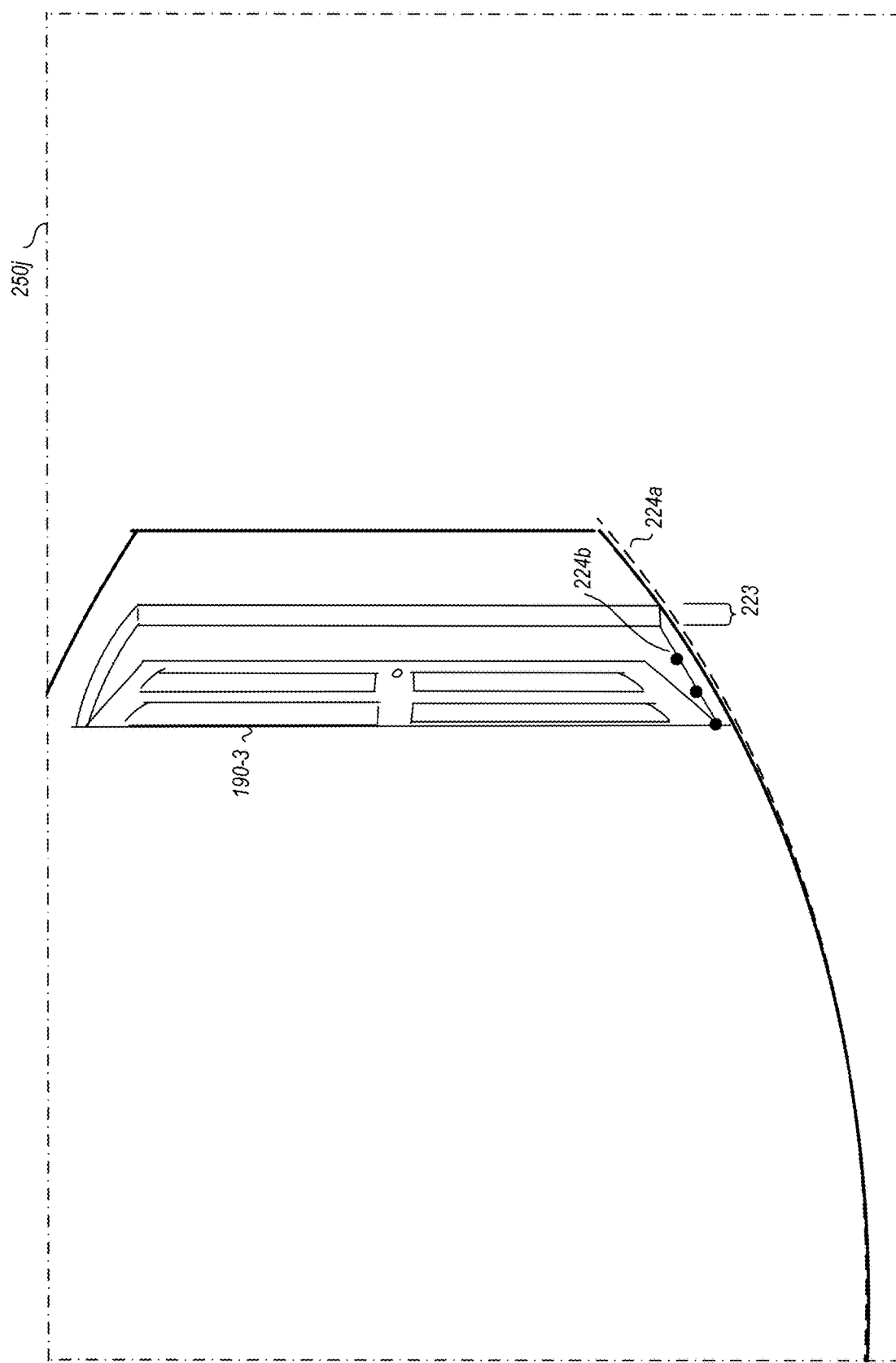

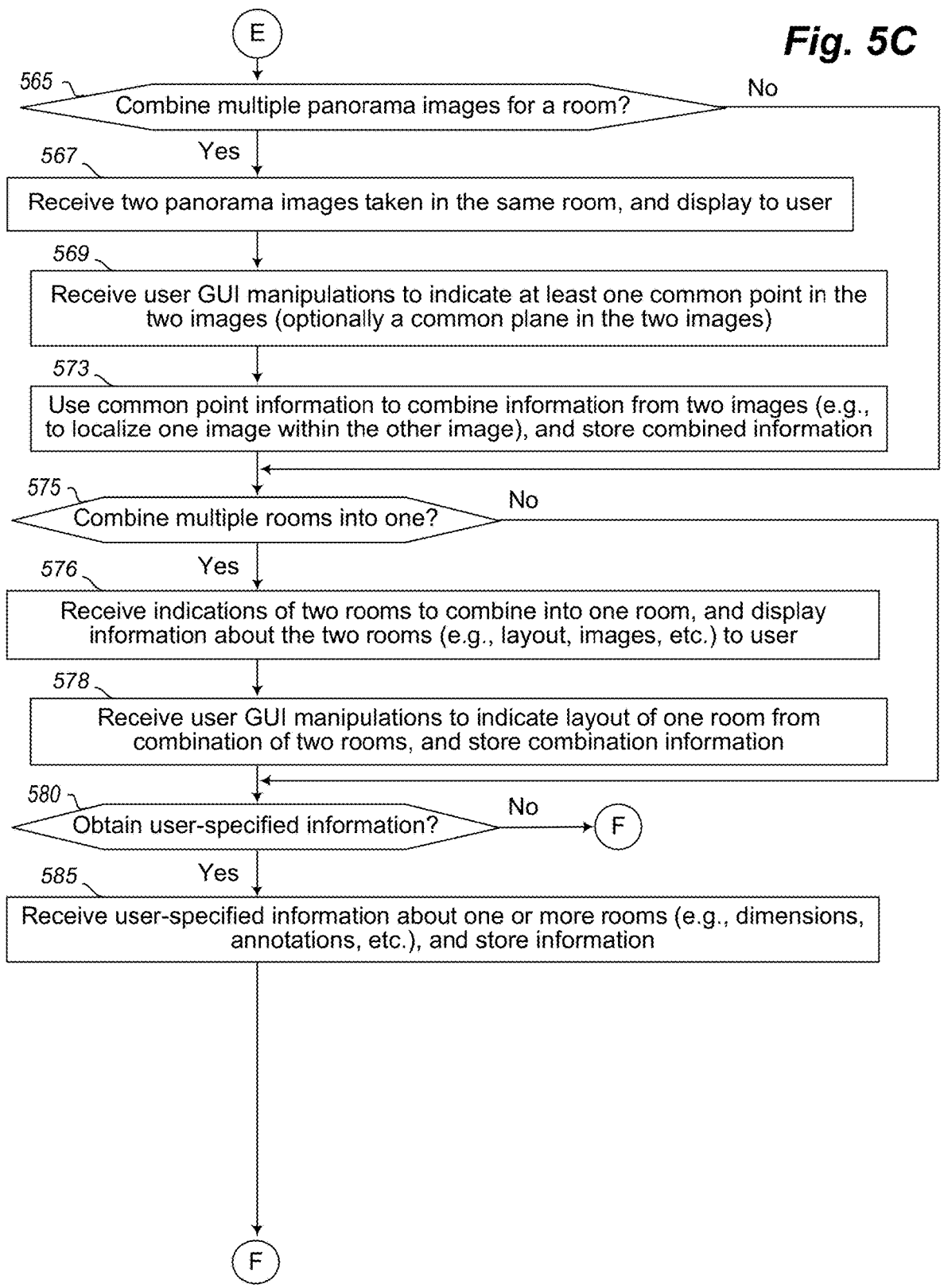

AUTOMATED TOOLS FOR GENERATING BUILDING MAPPING INFORMATION

TECHNICAL FIELD

The following disclosure relates generally to using automated tools and associated techniques to analyze and use images acquired in a defined area as part of generating mapping information for the area, such as to generate a floor plan for a building using images acquired at the building, as well as subsequently using the generated mapping information in one or more manners.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult to effectively capture, represent and use such building interior information, including to display visual information captured within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks in certain situations, including that floor plans can be difficult to construct and maintain, to accurately scale and populate with information about room interiors, to visualize and otherwise use, etc.

BRIEF DESCRIPTION OF THE DRAWINGS

FIGS. 5A-5C illustrate an example embodiment of a flow diagram for a Mapping Information Generation Manager (MIGM) system routine in accordance with an embodiment of the present disclosure.

DETAILED DESCRIPTION

Figure 1A:
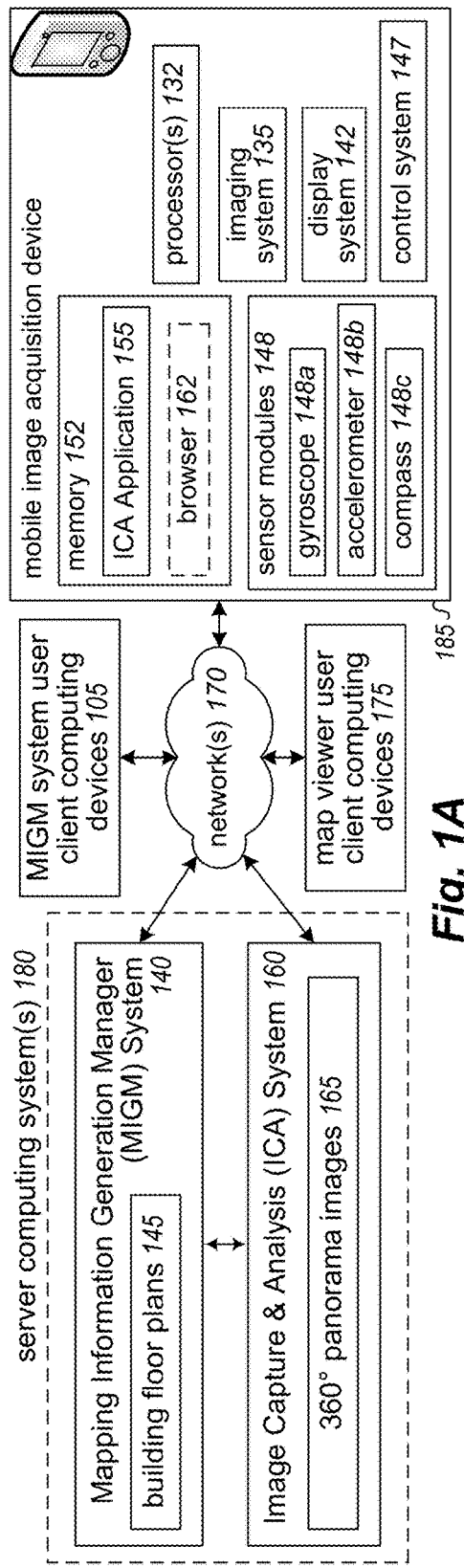
FIGS. 1A-1B are diagrams depicting an exemplary building environment and computing system(s) for use in embodiments of the present disclosure, including to generate and present information representing the building.

The present disclosure describes techniques for using one or more computing devices to perform automated operations related to, as part of generating mapping information of a defined area for subsequent use in one or more further automated manners, performing analyses and/or other uses of images acquired in the defined area. In at least some embodiments, the defined area includes an interior of a multi-room building (e.g., a house, office, etc.), the images include panorama images acquired at the building (e.g., 360° panorama images acquired at various acquisition locations within rooms of the building), and the generated information includes a floor plan of the building, such as a 2D (two-dimensional) overhead view (e.g., an orthographic top view) of a schematic floor map that is generated using information from the images—in at least some such embodiments, the generating of the mapping information is further performed without having or using depth information acquired from depth-sensing equipment about distances from the images' acquisition locations to walls or other objects in the surrounding building interior. The generated floor plan and/or other generated mapping-related information may be subsequently used in one or more manners in various embodiments, such as for controlling navigation of mobile devices (e.g., autonomous vehicles), for display on one or more client devices in corresponding GUIs (graphical user interfaces), etc. Additional details are included below regarding the automated operations of the computing device(s) involved in the generation and use of the mapping information, and some or all of the techniques described herein may, in at least some embodiments, be performed at least in part via automated operations of a Mapping Information Generation Manager ("MIGM") system involved in the generating of the mapping information, as discussed further below.

In at least some embodiments and situations, some or all of the images acquired for a building are 360° panorama images that are each acquired at one of multiple acquisition locations in or around the building, such as with each panorama image covering 360 degrees horizontally around a vertical axis (e.g., by using an image acquisition device with a spherical camera having one or more fisheye lenses to capture a panorama image that extends 360 degrees horizontally, such as in a single moment, or by otherwise generating 360° panorama images, such as by horizontally rotating a camera at an acquisition location that captures video or a sequence of constituent images during the rotating). In addition, in at least some such embodiments, such panorama images may be provided and used in a spherical format having an equirectangular projection in which straight vertical data (e.g., the sides of a typical rectangular door frame) in the room remains straight in the image and in which straight horizontal data (e.g., the top of a typical rectangular door frame) in the room remains straight in the image if it is shown at a horizontal midline of the image but is increasingly curved in the image in a convex manner relative to the horizontal midline as the distance increases in the image from the horizontal midline. It will be appreciated that a 360° spherical panorama image may in some situations be represented in a spherical coordinate system and cover up to 360° around a vertical axis, such that a user viewing such a panorama image may move the viewing direction within the panorama image to different orientations to cause different subset images (or "views") to be rendered within the panorama image (including, if the panorama image is represented in a spherical coordinate system, to convert the image being rendered into a planar coordinate system, such as for a perspective image view before it is displayed). Furthermore, acquisition metadata regarding the capture of such panorama images may be obtained and used in various manners, such as data acquired from IMU (inertial measurement unit) sensors or other sensors of a mobile image acquisition device as it is carried by a user or otherwise moved, and/or other data from other associated sensors (e.g., depth data from one or more depth sensors at an image acquisition location to measure distances to walls of the room or other objects in the room surrounding the acquisition location). In addition, images acquired for a building may further include one or more non-spherical images acquired in one or more rooms in at least some embodiments, such as perspective images in a rectilinear format in which horizontal and vertical straight lines in the room remain straight in the perspective images. Additional details are included below regarding automated operations of device(s) implementing an Image Capture and Analysis (ICA) system involved in acquiring images and optionally acquisition metadata, as well as in optionally performing preprocessing of the images before later use (e.g., to render 360° spherical panorama images in an equirectangular format).

The automated operations of the computing device(s) to provide the described techniques may in some embodiments and situations include operations of the MIGM system to interact with one or more MIGM system operator users who assist with the generating of the mapping information using acquired images (e.g., acquired 360° panorama images), such as by displaying one or more GUIs that show information related to the images and/or that show associated mapping information being generated, and by receiving and using input submitted by the user(s) via the GUI(s) as part of the mapping information generation. As one non-exclusive example, one or more MIGM system operator users may, in at least some embodiments, manipulate displayed information in the GUI about two or more rooms in order to identify and/or confirm interconnections between the rooms via passages into and/or out of the rooms, such as doors and other openings in walls of the rooms (e.g., inter-room wall openings such as doors, stairs and other non-door wall openings between rooms; other wall openings that are not between two rooms, such as exterior windows and exterior doors; etc.)—in addition, in at least such embodiments, such user manipulations via the GUI may further modify and otherwise control how rooms are interconnected, such as to specify a width of walls between rooms, to control alignment of room shapes relative to each other, etc., and/or may otherwise specify information about rooms or about a floor plan being generated. In some embodiments, such displayed information in the GUI may include displayed panorama images of one or more of the rooms in one or more distinct sections or 'panes' of the GUI, with additional displayed information overlaid on some or all of those displayed panorama images to show information about one or more other rooms (e.g., an outline of some or all borders of a second room that is overlaid on a panorama image of a first room in a location within the image at which that second room would be situated if connected to the first room via specified connected inter-room openings of the two rooms). In addition, in some embodiments, such displayed information may include a displayed floor plan pane of the GUI that shows room shapes of two or more rooms in locations relative to each other that reflect the rooms being connected via specified inter-room openings of the rooms (e.g., a 2D overhead view outline of the walls and wall openings for the room, with the connected inter-room openings being located adjacent to or on top of each other, and optionally to have walls of the two rooms that are within a defined threshold amount of being parallel being adjusted to be parallel). In such embodiments with multiple panes each showing different information (e.g., a first pane showing a first panorama image of a first room with a first inter-room opening; a second pane showing a second panorama image of a second room with a second inter-room opening to potentially connect to the first room via a connection between the first and second inter-room openings, such as to show that the first and second inter-room openings are two sides of the same wall opening between the first and second rooms; a third pane showing a floor plan view with room shapes of at least the first and second rooms, and possibly other connected rooms; and optionally one or more additional panes showing additional panorama images of additional rooms to potentially connect to one or more of the first and second rooms), the displayed information between the panes may be coordinated in the GUI, such as to simultaneously update corresponding information in other panes as a user manipulates information in one of the panes (e.g., to change relative locations of the first and second rooms as the user adjusts location of at least one of the rooms in one of the panes). In this manner, the generation of a floor plan for the building and optionally other associated mapping information may include using the inter-room passage information and other information to determine relative global positions of the associated room shapes to each other in a common coordinate system or other common frame of reference (e.g., without knowing the actual measurements of the rooms)—in addition, if distance scaling information is available for one or more of the images, corresponding distance measurements may be determined, such as to allow room sizes and other distances to be determined and further used for the generated floor plan. Additional details are included below related to such GUIs and associated user interactions techniques for use in generating floor plans.

In addition, the automated operations of the computing device(s) to provide the described techniques may in some embodiments and situations further include operations of the MIGM system to construct a room connection graph that includes information about possible and/or actual connections between rooms of a building via inter-room wall openings, and/or to use such a room connection graph to assist in generating a floor plan for the building. In at least some embodiments, the room connection graph includes a node for each of the rooms, with each node having information about each inter-room wall opening passage into and out of the room (as well as various other information about the room). For each such inter-room wall opening passage of a room, one or more links are added in the room connection graph to one or more other room nodes in order to represent possible or actual connections from that inter-room wall opening passage to other inter-room wall opening passages of the one or more other rooms represented by the other room node(s). For example, in some embodiments, an initial version of the room connection graph is constructed that is fully connected to include links for each possible connection between two inter-room wall opening passages of two rooms, with the connections that are determined to be possible being limited in at least some such embodiments by factors such as the types of passages (e.g., so that a door opening in one room only has potential connections to door openings of other rooms; a stair opening in one room only has potential connections to stair openings of other rooms; etc.) and/or the sizes of the passages (e.g., so that two inter-room wall openings only have a potential connection if they are of the same size, such as the same width and/or the same height, or have two different sizes that differ by at most a defined threshold size amount). In such embodiments, the links representing possible connections for a particular inter-room wall opening of a particular room may be used during floor plan generation to identify candidates for other rooms and inter-room wall openings to which that particular inter-room wall opening and particular room may be connected, with such candidate rooms and/or candidate inter-room connections optionally being ranked or otherwise assessed by the MIGM system to assist in the floor plan generation, such as to initially present a highest ranked candidate room and inter-room wall opening as a suggestion to an MIGM system operator user for use with the particular inter-room wall opening of the particular room—furthermore, once a particular inter-room connection between two particular inter-room wall openings of two rooms is identified during floor plan generation (whether automatically by the MIGM system and/or manually by one or more MIGM system operator users, such as for such a user to confirm an automated suggestion by the MIGM system), the links corresponding to other possible connections for those two particular inter-room wall openings may be removed from the room connection graph, such that the final room connection graph after that floor plan generation process is completed reflects the final actual inter-room connections shown in the generated floor plan. In embodiments in which possible inter-room connections are ranked or otherwise assessed, the assessment may be done in various ways, such as using one or more cost metrics that assess aspects related to the possible inter-room connection and its two rooms. Additional details are included below related to such a room connection graph and techniques for assessing possible inter-room connections.

The automated operations of the computing device(s) to provide the described techniques may in some embodiments and situations further include operations of the MIGM system to assess images and/or their associated acquisition metadata in order to generate information about room layouts of rooms of a building for use during generation of a floor plan of the building. In at least some embodiments, such room layout information for a room includes a shape of the room (e.g., a 2D overhead view of a rectangular shape or other shape of walls of the room) and/or locations of inter-room wall openings in the room, optionally along with additional information such as types of inter-room wall openings (e.g., a door or stair or other inter-room wall opening), sizes of inter-room wall openings (e.g., width and/or height), types of the rooms (e.g., kitchen, bathroom, bedroom, etc.), dimensions of the rooms (e.g., widths and/or heights of each of the walls), etc. Some or all such room layout information for a room may be determined from one or more images captured in the room in various manners in various embodiments, such as by applying machine learning techniques to automatically assess the image(s) (e.g., supplying the image(s) as input to one or more neural networks that have been trained using other images and associated room layout information to identify one or more such types of room layout information, and obtaining the corresponding room layout information as output from the trained neural networks), and/or by using information supplied by one or more users (e.g., MIGM system operator users) that assess the image(s) to determine some or all of the room layout information. In some embodiments in which acquisition metadata for an image captured at an acquisition location in a room includes depth data from one or more depth sensors at the acquisition location to surrounding walls or other objects of the room, such depth information may be used to determine some or all such room layout information, whether by using such depth information together with other of the described image assessment techniques or instead using only such depth information. Thus, such assessment techniques of one or more images acquired in a room may provide various types of room information in various embodiments and situations, including to identify structural and other visual features of the room, such as to identify one or more of the following: borders between adjacent walls; borders between walls and a floor; borders between walls and a ceiling; windows and/or sky-lights; passages into and/or out of the room, such as doors and stairs and other wall openings; other structures (e.g., represented as cuboid shapes), such as countertops, bath tubs, sinks, fireplaces, and furniture; etc. Additional details are included below related to such generation and use of room layout information for rooms based on assessment of images and/or their associated acquisition metadata.

Additional details are included below regarding further automated operations of computing device(s) implementing an MIGM system as part of performing additional automated analyses of information about the buildings and/or information received from MIGM system operator user(s), as well as in interacting with the MIGM system operator user(s). In some embodiments, one or more types of additional processing may be further performed, such as to determine additional mapping-related information for a generated floor plan or to otherwise associate additional information with a generated floor plan. As one example, one or more types of additional information about a building may be received and associated with the floor plan (e.g., with particular locations in the floor plan), such as additional images, textual and/or audio annotations or other descriptions of particular rooms or other locations, other audio information, such as recordings of ambient noise; overall dimension information, etc. As another example, in at least some embodiments, additional processing of images is performed to determine estimated distance information of one or more types, such as to measure sizes in images of objects of known size, and use such information to estimate room width, length and/or height dimensions—such estimated size information for one or more rooms may be associated with the floor plan, stored and optionally displayed, and if the size information is generated for all rooms within a sufficient degree of accuracy, a more detailed floor plan of the building may further be generated, such as with sufficient detail to allow blueprints or other architectural plans to be generated. In addition, if estimated size information includes height information from floors to ceilings, a 3D (three-dimensional) model (e.g., with full height information represented) and/or 2.5D (two-and-a-half dimensional) model (e.g., with partial representations of height shown) of some or all of the 2D (two-dimensional) floor plan may be created (optionally with information from in-room images projected on the walls of the models), associated with the floor plan, stored and optionally displayed. Other types of additional information may be generated or retrieved and used in some embodiments, such as to determine a geographical alignment for a building (e.g., with respect to true north or magnetic north) and/or geographical location for a building (e.g., with respect to latitude and longitude, or GPS coordinates; for a street address; etc.), and to optionally include corresponding information on its generated floor plan and/or other generated mapping-related information, and/or to optionally further align the floor plan or other generated mapping-related information with other associated external information (e.g., satellite or other external images of the building, including street-level images to provide a 'street view' of the building and/or panorama images acquired at one or more locations in a yard or other area around a building; information for an area in which the building is located, such as nearby street maps and/or points of interest; etc.). Other information about the building may also be retrieved from, for example, one or more external sources (e.g., online databases, 'crowd-sourced' information provided by one or more end users, etc.), and associated with and linked to the floor plan and/or to particular locations within the floor plan—such additional information may further include, for example, exterior dimensions and/or shape of the building, additional images and/or annotation information acquired corresponding to particular locations within the building (optionally for locations different from acquisition locations of the acquired panorama or other images), etc. Such generated floor plans and optionally additional associated information may further be used in various manners, as discussed elsewhere herein.

The described techniques provide various benefits in various embodiments, including to allow floor plans of multi-room buildings and other structures to be generated from images acquired in the buildings or other structures via automated operations of one or more computing systems (including in some embodiments to perform automated operations to interact with one or more users to obtain one or more types of user-supplied input that is used for further automated analysis), including in some embodiments without having or using acquired depth information from depth sensors about distances from images' acquisition locations to walls or other objects in a surrounding building or other structure. Furthermore, such automated techniques allow such a floor plan to be generated much more quickly than previously existing techniques, and in at least some embodiments with greater accuracy, based at least in part on using information acquired from the actual building environment (rather than from plans on how the building should theoretically be constructed), including based on using 360° spherical panorama images in an equirectangular format that display an entire room and allow efficient user identification of elements of interest in the room, as well as enabling the capture of changes to structural elements that occur after a building is initially constructed. Such described techniques further provide benefits in allowing improved automated navigation of a building by mobile devices (e.g., semi-autonomous or fully-autonomous vehicles), including to significantly reduce their computing power used and time used to attempt to otherwise learn a building's layout. In addition, in some embodiments the described techniques may be used to provide an improved GUI in which an end user may more accurately and quickly obtain information about a building's interior (e.g., for use in navigating that interior, such as via a virtual tour), including in response to search requests, as part of providing personalized information to the end user, as part of providing value estimates and/or other information about a building to an end user, etc. Various other benefits are also provided by the described techniques, some of which are further described elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while floor plans may be generated for houses that do not include detailed measurements for particular rooms or for the overall houses, it will be appreciated that other types of floor plans or other mapping information may be similarly generated in other embodiments, including to generate 3D models, and to do so for buildings (or other structures or layouts) separate from houses. As another example, while floor plans for houses or other buildings may be used for display to assist viewers in navigating the buildings, generated mapping information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, acquisition location, or other location (unless context clearly indicates otherwise) may refer to any recording, storage, or logging of media, sensor data, and/or other information related to spatial and/or visual characteristics of the building interior or subsets thereof, such as by a recording device and/or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 1B:
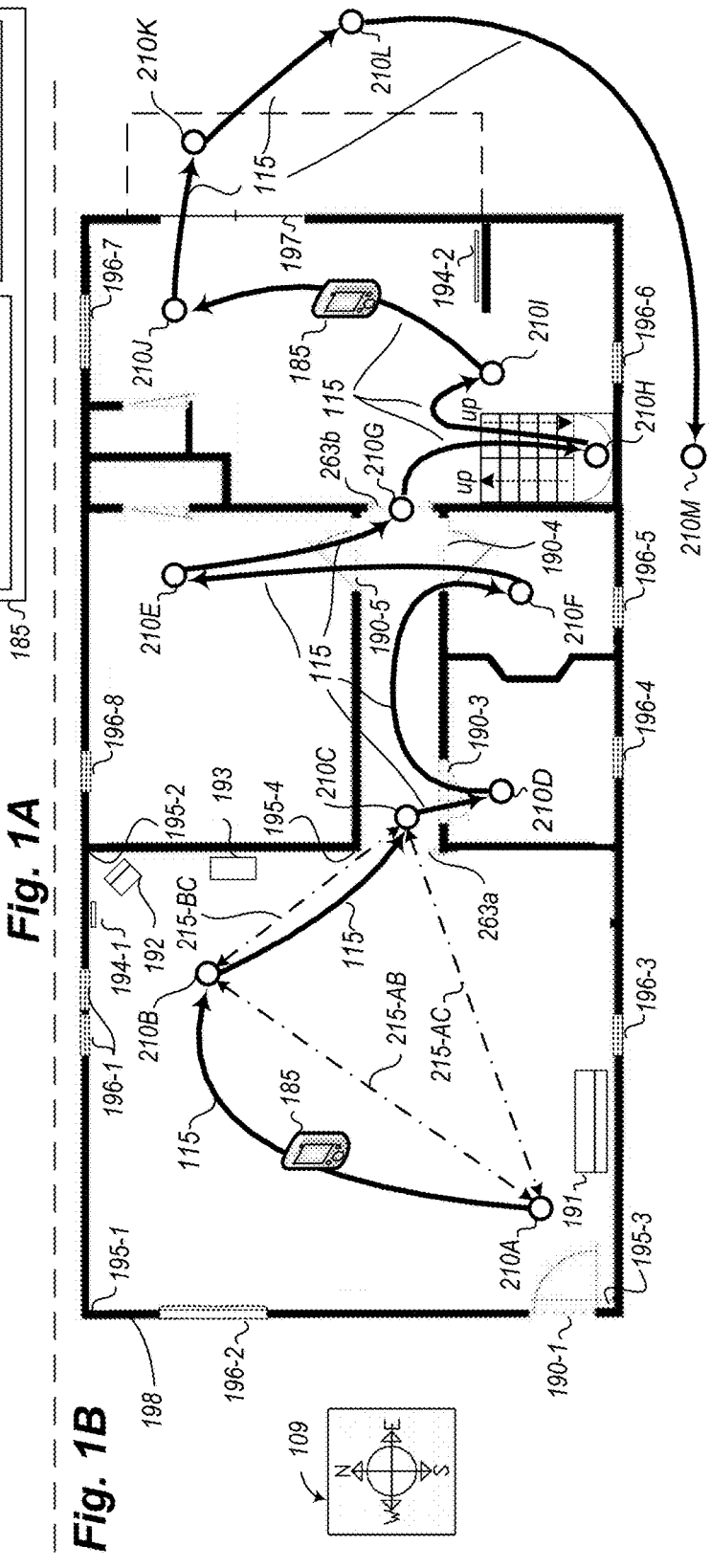
Figure 2A:
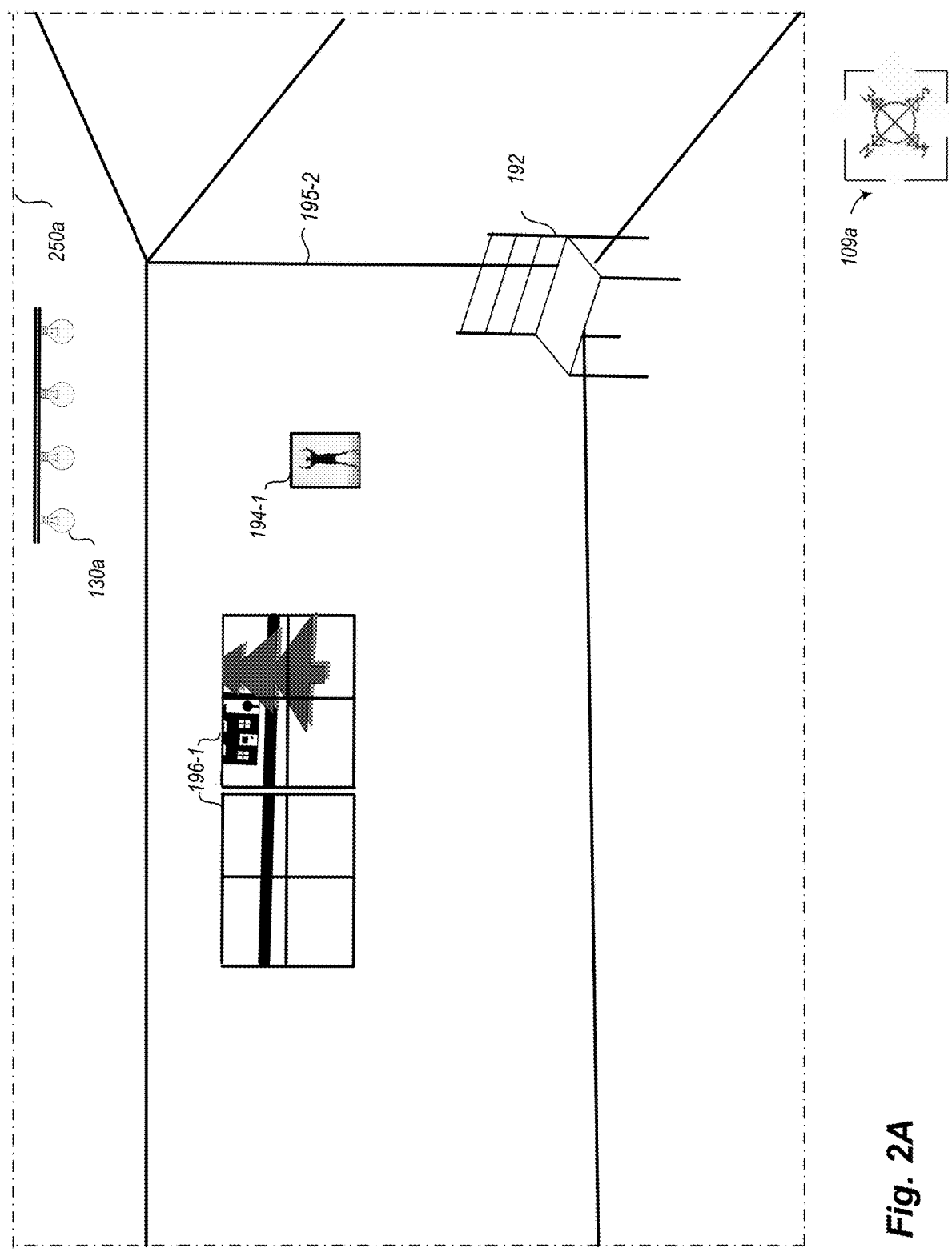
FIGS. 2A-2S illustrate examples of automated operations for participating in analysis of images and generation of a floor plan for a building.

FIG. 1A is an example block diagram of various computing devices and systems that may participate in the described techniques in some embodiments. In particular, one or more 360° panorama images 165 (e.g., in equirectangular format) have been generated by an Interior Capture and Analysis ("ICA") system (e.g., a system 160 that is executing on one or more server computing systems 180, and/or a system provided by application 155 executing on one or more mobile image acquisition devices 185), such as with respect to one or more buildings or other structures—FIG. 1B shows one example of acquisition of such panorama images for a particular house at multiple acquisition locations 210, and FIGS. 2A-2S illustrate additional details about using such panorama images to generate an associated floor plan, as discussed further below.

An MIGM (Mapping Information Generation Manager) system 140 is further executing on one or more server computing systems 180 to generate and provide building floor plans 145 and/or other mapping-related information (not shown) based on use of the panorama images 165 and optionally additional associated information, as well as by using supporting information supplied by MIGM system operator users via computing devices 105 over intervening computer network(s) 170—additional details related to the automated operation of the MIGM system are included elsewhere herein, including with respect to FIGS. 2A-2S and 5A-5C. In some embodiments, the ICA system(s) and MIGM system 140 may execute on the same server computing system(s), such as if both systems are operated by a single entity or are otherwise executed in coordination with each other (e.g., with some or all functionality of both systems integrated together into a larger system), while in other embodiments the MIGM system may instead operate without an ICA system and instead obtain panorama images (or other images) from one or more external sources and optionally store them locally (not shown) with the MIGM system for further analysis and use.

Various components of the mobile image acquisition device 185 are also illustrated in FIG. 1A, including a browser 162 and/or an ICA system application 155 that are executed in memory 152 of the device 185 by one or more hardware processors 132, and including one or more imaging systems 135 of one or more types to acquire visual data. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), optionally a GPS (or Global Positioning System) sensor or other position determination sensor (not shown in this example), optionally one or more depth-sensing sensors of one or more types (not shown in this example), a display system 142 (e.g., with a touch-sensitive screen), one or more control systems 147 managing I/O (input/output) and/or communications and/or networking for the device 185 (e.g., to receive instructions from and present information to the user), etc. Other computing devices/systems 105, 175 and 180 may include various hardware components and stored information in a manner analogous to mobile device 185, which are not shown in this example for the sake of brevity, and as discussed in greater detail below with respect to FIG. 3.

In the example of FIG. 1A, the ICA system may perform automated operations involved in generating multiple 360° panorama images at multiple associated acquisition locations (e.g., in multiple rooms or other locations within a building or other structure and optionally around some or all of the exterior of the building or other structure), such as using visual data acquired via the mobile device(s) 185, and for use in generating and providing a representation of an interior of the building or other structure. For example, in at least some such embodiments, such techniques may include using one or more mobile devices (e.g., a camera having one or more fisheye lenses and mounted on a rotatable tripod or otherwise having an automated rotation mechanism, a camera having sufficient fisheye lenses to capture 360 degrees horizontally without rotation, a smart phone held and moved by a user, a camera held by or mounted on a user or the user's clothing, etc.) to capture data from a sequence of multiple acquisition locations within multiple rooms of a house (or other building), and to optionally further capture data involved in movement of the acquisition device (e.g., movement at an acquisition location, such as rotation; movement between some or all of the acquisition locations, such as for use in linking the multiple acquisition locations together; etc.), in at least some cases without having distances between the acquisition locations being measured or having other measured depth information to objects in an environment around the acquisition locations (e.g., without using any depth-sensing sensors). After an acquisition location's information is captured, the techniques may include producing a 360° panorama image from that acquisition location with 360 degrees of horizontal information around a vertical axis (e.g., a 360° spherical panorama image that shows the surrounding room in an equirectangular format), and then providing the panorama images for subsequent use by the MIGM system. Additional details related to embodiments of a system providing at least some such functionality of an ICA system are included in co-pending U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in co-pending U.S. Non-Provisional patent application Ser. No. 16/236,187, filed Dec. 28, 2018 and entitled "Automated Control Of Image Acquisition Via Use Of Acquisition Device Sensors" (which includes disclosure of an example ICA system that is generally directed to obtaining and using panorama images from within one or more buildings or other structures); and in co-pending U.S. Non-Provisional patent application Ser. No. 16/190,162, filed Nov. 14, 2018 and entitled "Automated Mapping Information Generation From Inter-Connected Images"; each of which is incorporated herein by reference in its entirety.

One or more end users (not shown) of one or more map viewer client computing devices 175 may further interact over computer networks 170 with the MIGM system 140 (and optionally the ICA system 160), such as to obtain, display and interact with a generated floor plan. In addition, while not illustrated in FIG. 1A, a floor plan (or portion of it) may be linked to or otherwise associated with one or more additional types of information, such as one or more associated and linked images or other associated and linked information, including for a two-dimensional ("2D") floor plan of a building to be linked to or otherwise associated with a separate 2.5D model rendering of the building and/or a 3D model rendering of the building, etc., and including for a floor plan of a multi-story or otherwise multi-level building to have multiple associated sub-floor plans for different stories or levels that are interlinked (e.g., via connecting stairway passages). Accordingly, non-exclusive examples of an end user's interactions with a displayed or otherwise generated 2D floor plan of a building may include one or more of the following: to change between a floor plan view and a view of a particular image at an acquisition location within or near the floor plan; to change between a 2D floor plan view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D spherical coordinate system to which a current user viewing direction is directed, and to render a corresponding planar image that illustrates that portion of the panorama image without the curvature or other distortions present in the original panorama image; etc. Additional details regarding an ILTM system, which is one example embodiment of a system to provide or otherwise support at least some functionality of a building map viewer system and routine as discussed herein, are included in U.S. Non-Provisional patent application Ser. No. 15/950,881, filed Apr. 11, 2018 and entitled "Presenting Image Transition Sequences Between Acquisition Locations," which is incorporated herein by reference in its entirety. In addition, while not illustrated in FIG. 1A, in some embodiments the client computing devices 175 (or other devices, not shown) may receive and use generated floor plans and/or other generated mapping-related information in additional manners, such as to control or assist automated navigation activities by those devices (e.g., by autonomous vehicles or other devices), whether instead of or in addition to display of the generated information.

In the depicted computing environment of FIG. 1A, the network 170 may be one or more publicly accessible linked networks, possibly operated by various distinct parties, such as the Internet. In other implementations, the network 170 may have other forms, such as to instead be a private network (such as a corporate or university network) that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks and connections in various situations.

FIG. 1B depicts a block diagram of an exemplary building interior environment in which 360° panorama images are generated, for use by the MIGM system to generate and provide a corresponding building floor plan, as discussed in greater detail with respect to FIGS. 2A-2S, as well as for use in presenting the panorama images to users. In particular, FIG. 1B illustrates one story of a multi-story house (or other building) 198 with an interior that was captured at least in part via multiple panorama images, such as by a mobile image acquisition device 185 with image acquisition capabilities as it is moved through the building interior to a sequence of multiple acquisition locations 210 (e.g., starting at acquisition location 210A, moving to acquisition location 210B along travel path 115, etc., and ending at acquisition location 210M outside of the building). An embodiment of the ICA system (e.g., ICA system 160 on server computing system(s) 180, a copy 155 of some or all of the ICA system executing on the mobile image acquisition device 185, etc.) may automatically perform or assist in the capturing of the data representing the building interior, as well as to further analyze the captured data to generate 360° panorama images to provide a visual representation of the building interior. While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their acquisition locations may be determined in part or in whole based on features in different images, but without using any data from any such depth sensors. In addition, while directional indicator 109 is provided in FIG. 1B for reference of the reader, the mobile device and/or ICA system may not use such absolute directional information in at least some embodiments, such as to instead determine relative directions and distances between acquisition locations 210 without regard to actual geographical positions or directions in such embodiments.

In operation, the mobile image acquisition device 185 arrives at a first acquisition location 210A within a first room of the building interior (in this example, in a living room accessible via an external door 190-1), and captures a view of a portion of the building interior that is visible from that acquisition location 210A (e.g., some or all of the first room, and optionally small portions of one or more other adjacent or nearby rooms, such as through doors, halls, stairs or other connecting passages from the first room). The view capture may be performed in various manners as discussed herein, and may include a number of objects or other features (e.g., structural details) that may be visible in images captured from the acquisition location—in the example of FIG. 1B, such objects or other features within the building include the doorways 190 (including 190-1, 190-3, 190-4 and 190-5) and 197 (e.g., with swinging and/or sliding doors), windows 196 (including 196-1, 196-2, 196-3, 196-4, 196-5, 196-6, 196-7 and 196-8), corners or edges 195 (including corner 195-1 in the northwest corner of the building 198, corner 195-2 in the northeast corner of the first room, corner 195-3 in the southwest corner of the first room, corner 195-4 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures (not shown in FIG. 1B), various built-in appliances or fixtures or other structural elements (not shown in FIG. 1B), etc. The user may also optionally provide a textual or auditory identifier to be associated with an acquisition location, such as "living room" for the room including acquisition locations 210A and/or 210B, while in other embodiments the ICA system may automatically generate such identifiers (e.g., by automatically analyzing images and/or video and/or other recorded information for a building to perform a corresponding automated determination, such as by using machine learning) or the MIGM system may determine such identifiers (e.g., based at least in part on input from MIGM system operator users) or the identifiers may not be used.

After the first acquisition location 210A has been captured, the mobile device 185 may move or be moved to a next acquisition location (such as acquisition location 210B), optionally recording images and/or video and/or other data from the hardware components (e.g., from one or more IMUs, from the camera, etc.) during movement between the acquisition locations. At the next acquisition location, the mobile device may similarly capture a 360° panorama image from that acquisition location. This process may repeat for some or all rooms of the building and in some cases external to the building, as illustrated for acquisition locations 210C-210M in this example. The acquired panorama images for each acquisition location may be further analyzed, including in some embodiments to render or otherwise place each panorama image in an equirectangular format, whether at the time of image capture or later.

Various details are provided with respect to FIGS. 1A-1B, but it will be appreciated that the provided details are non-exclusive examples included for illustrative purposes, and other embodiments may be performed in other manners without some or all such details.

FIGS. 2A-2S illustrate examples of generating and presenting a floor plan for a building using 360° panorama images of the building interior and additional room layout information for rooms of the building, such as for the house 198 and panorama images acquired at acquisition locations 210 discussed in FIG. 1B.

In particular, FIG. 2A illustrates an example image 250a, such as a perspective image taken in a northeasterly direction from acquisition location 210B in the living room of house 198 of FIG. 1B (or a northeasterly facing subset view of a 360-degree panorama image taken from that acquisition location and formatted in a rectilinear manner)—the directional indicator 109a is further displayed in this example to illustrate the northeasterly direction in which the image is taken. In the illustrated example, the displayed image includes built-in elements (e.g., light fixture 130a), furniture (e.g., chair 192), two windows 196-1, and a picture 194-1 hanging on the north wall of the living room. No inter-room passages into or out of the living room (e.g., doors or other wall openings) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the vertical border 195-2 between the north and east walls.

Figure 2B:
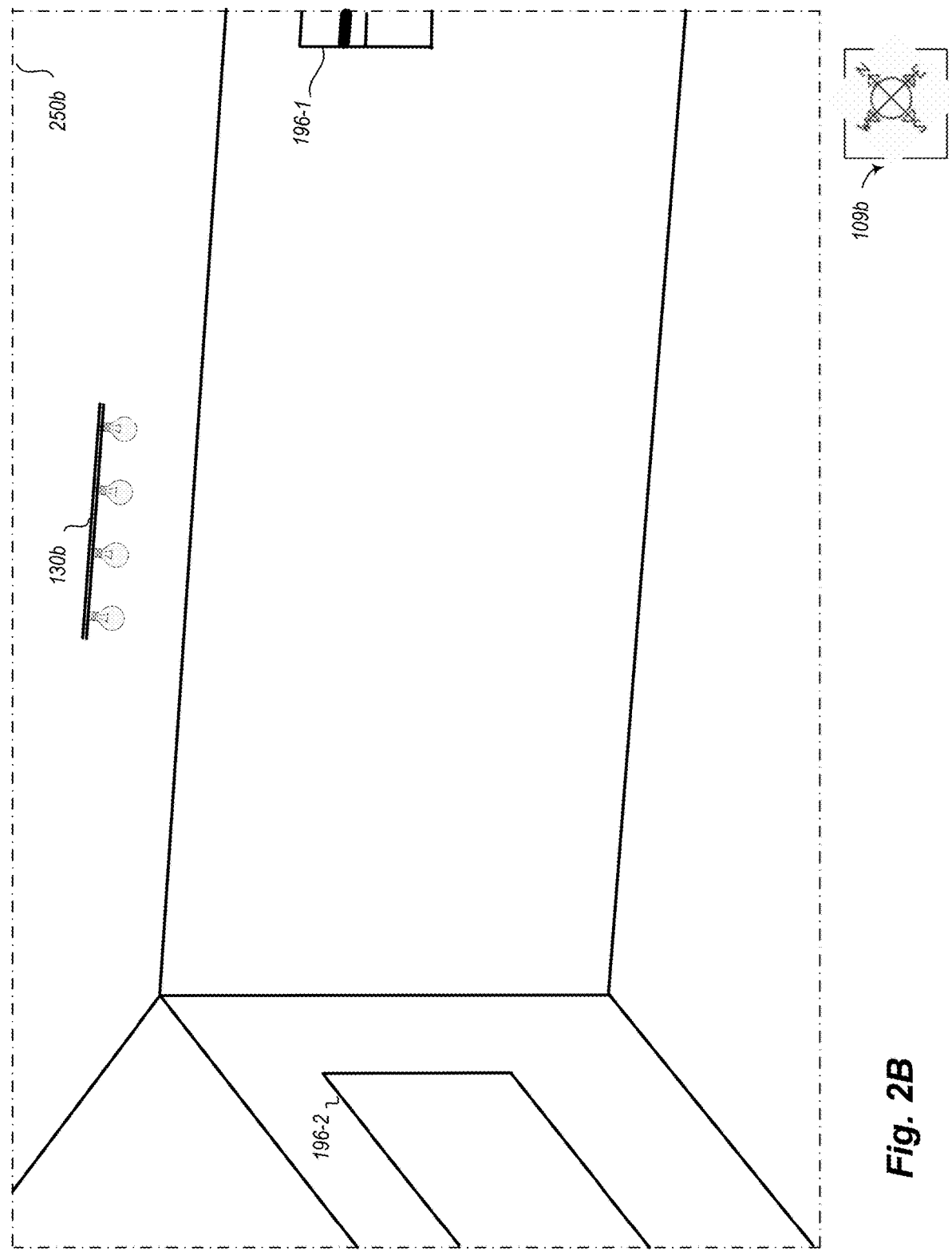

FIG. 2B continues the example of FIG. 2A, and illustrates an additional perspective image 250b taken in a northwesterly direction from acquisition location 210B in the living room of house 198 of FIG. 1B (or a northwesterly facing subset view of a 360-degree panorama image taken from that acquisition location and formatted in a rectilinear manner)—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A.

Figure 2C:
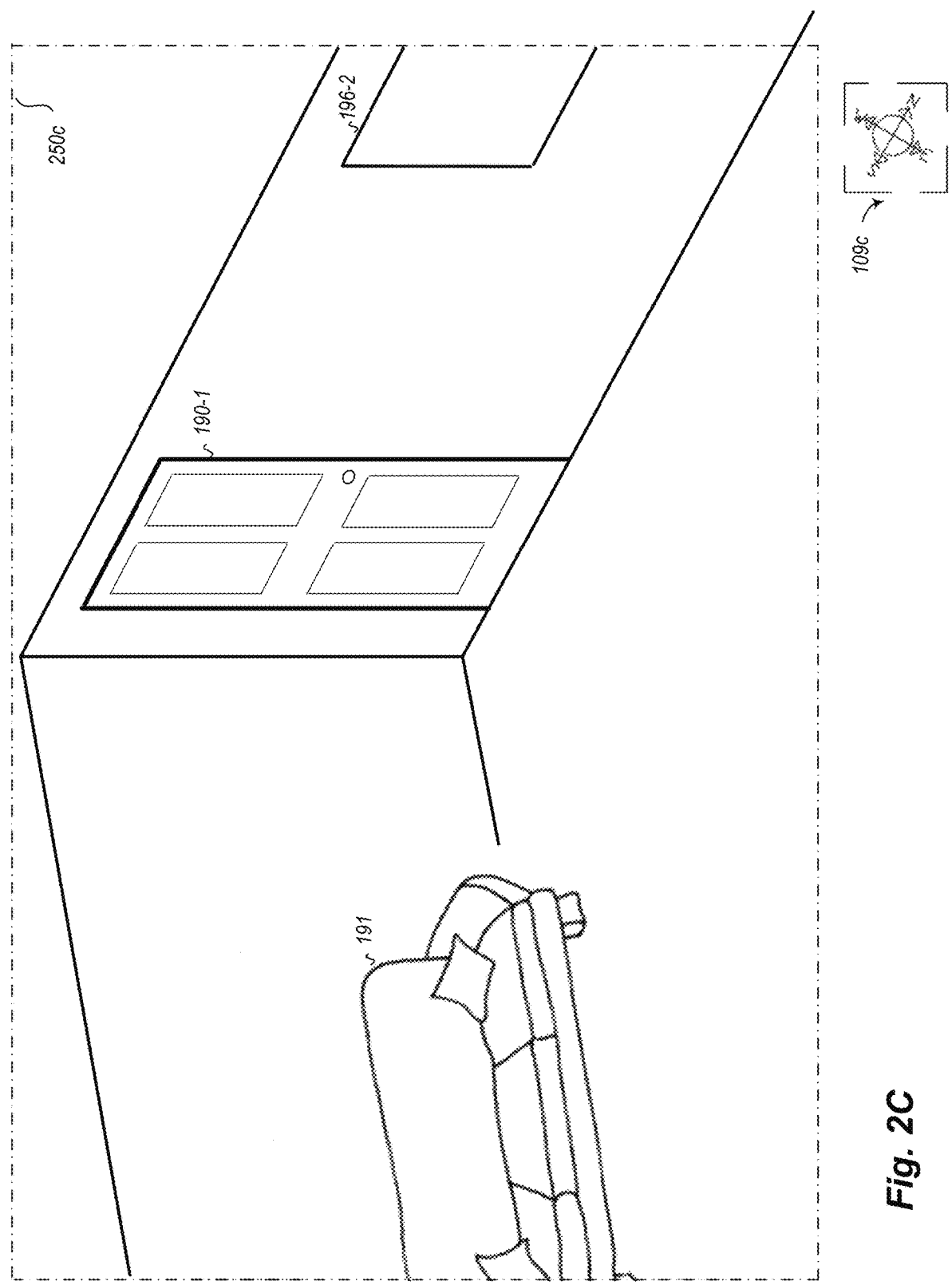

FIG. 2C continues the examples of FIGS. 2A-2B, and illustrates a third perspective image 250c taken in a southwesterly direction in the living room of house 198 of FIG. 1B, such as from acquisition location 210B or 210A—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates a wall opening passage for the living room, which in this example is a door 190-1 (which FIG. 1B identifies as a door to the exterior of the house). It will be appreciated that a variety of other perspective images may be taken from acquisition location 210B and/or other acquisition locations and displayed in a similar manner.

Figure 2D:
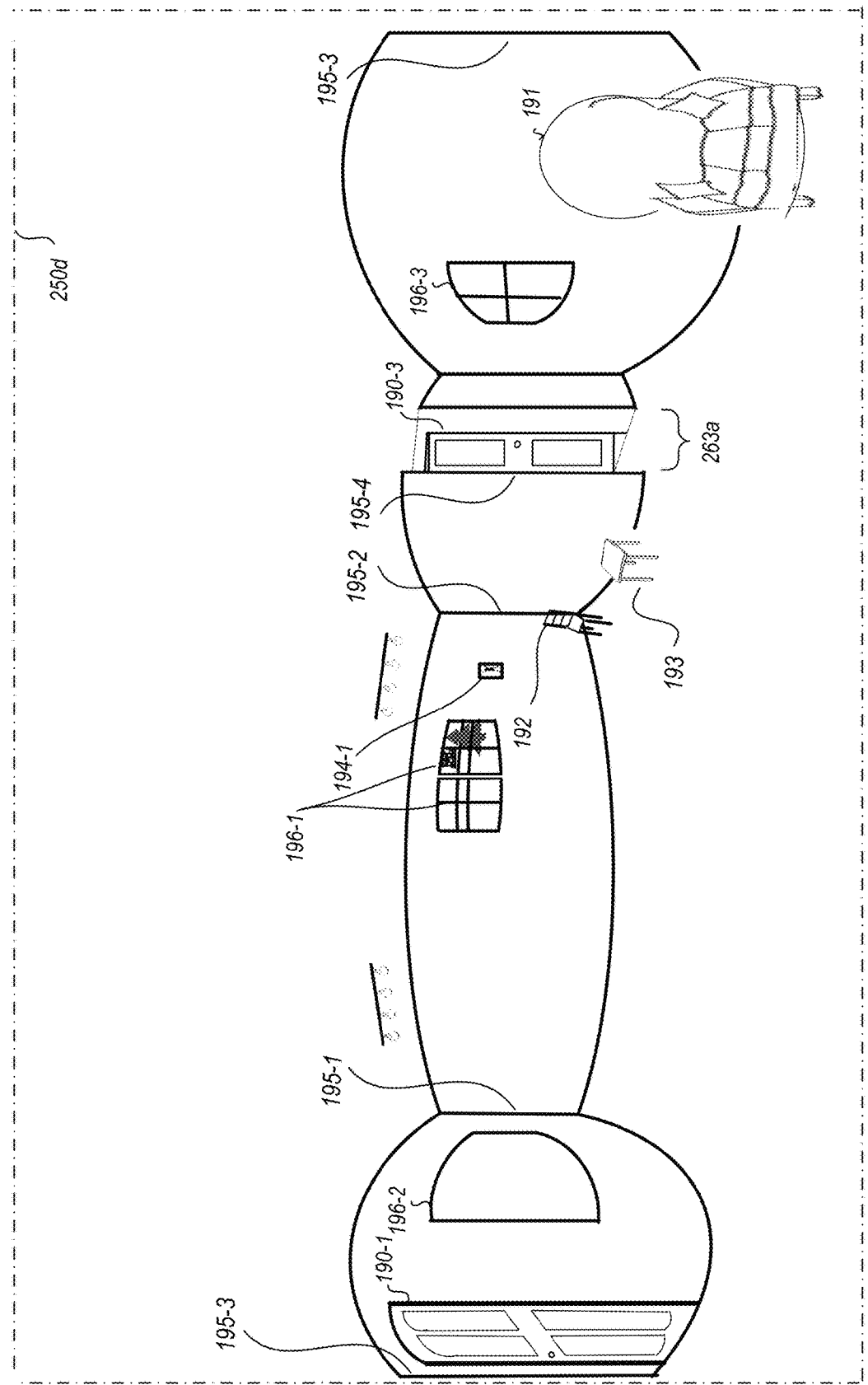

FIG. 2D continues the examples of FIGS. 2A-2C, and illustrates a 360° spherical panorama image 250d (e.g., taken from acquisition location 210B), which displays the entire living room in an equirectangular format—since the panorama image does not have a direction in the same manner as the perspective images of FIGS. 2A-2C, the directional indicator 109 is not displayed in FIG. 2D. A portion of the panorama image 250d which corresponds to the first perspective image 250a is shown in approximately the center portion of the image 250d, while the left portion of the image 250d and the far-right portion of the image 250d contain visual data corresponding to that of the perspective images 250b and 250c. This example panorama image 250d includes windows 196-1, 196-2 and 196-3, furniture 192, 193 and 191, a door 190-1, and an opening 263a to the hallway (with the opening showing part of a door 190-3 visible in the adjacent hallway room). Image 250d further illustrates a variety of room borders in a manner similar to that of the perspective images, but with the horizontal borders being displayed in an increasingly curved manner the farther they are from a horizontal midline of the image—the visible borders include vertical inter-wall borders 195-1, 195-2 and 195-3, vertical border 195-4 at the left side of the hallway opening, vertical borders at the right side of the hallway opening and the southeast corner of the living room, and horizontal borders between the walls and the floor and between the walls and the ceiling.

Figure 2E:
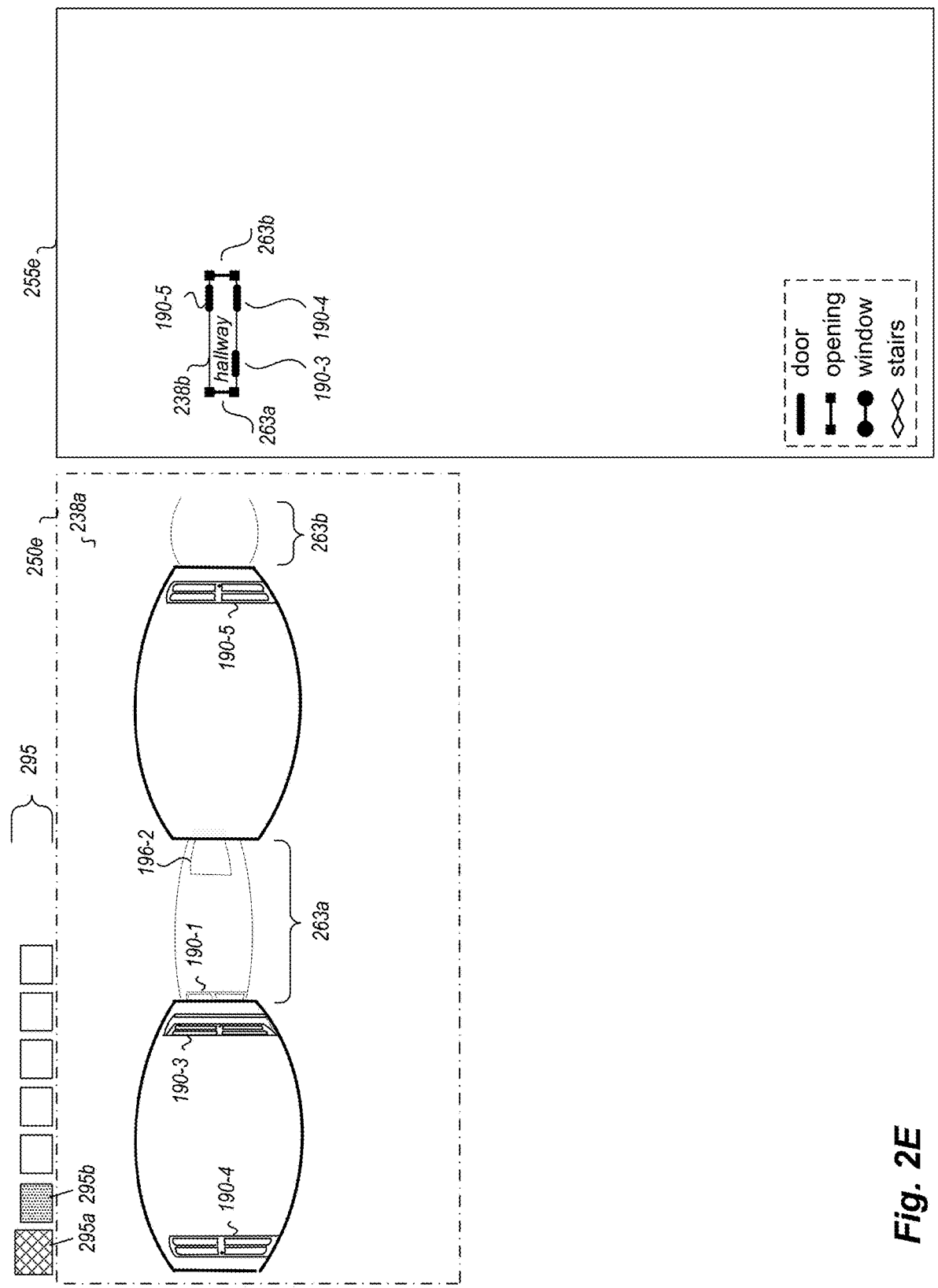

FIG. 2E continues the examples of FIGS. 2A-2D, and illustrates a 360° spherical panorama image 238a similar to that of FIG. 2D, but for the hallway in the middle of the house rather than for the living room—in particular, the panorama image 238a is displayed in a first pane 250e of a GUI being displayed by the MIGM system to an MIGM system operator user (not shown), along with user-selectable GUI controls 295 to select different types of functionality. Various reference labels are shown in pane 250e for the benefit of the reader (e.g., labels 190-3, 190-4 and 190-5 for the doorways in the hallway, label 190-1 for the doorway in the living room that is partially visible through the inter-room wall opening passage 263a between the living room and hallway, etc.), but may not be illustrated to the MIGM system operator user. A second GUI floor plan pane 255e is also shown, which displays an initial room shape 238b corresponding to the hallway, and in this example illustrates the 5 inter-room wall openings of the hallway to which other rooms of the house are to be connected. A primary GUI control 295a is currently selected, corresponding in this example to using functionality of the GUI to generate a floor plan for an indicated building, and GUI control 295b is further selected (e.g., from a group of secondary GUI controls available for the floor plan generation functionality of the GUI) to correspond to selecting and displaying an initial first room from which the generation of the house's floor plan will begin. It will be appreciated that such GUI controls 295 may be displayed and/or accessed in other manners in other embodiments (e.g., via menus, keyboard selections, etc.). In addition, while not illustrated in FIG. 2E, various additional user-manipulatable displayed elements and other user-selectable controls may be included in pane 250e (e.g., overlaid on the panorama image in the first GUI pane 250e) and/or in other GUI panes or areas and available for use by the MIGM system operator user in other circumstances. Furthermore, it will also be appreciated that the hallway room may be selected as the initial room to use for the floor plan generation in various manners and for various reasons in various embodiments, such as based on the room having the largest number of inter-room wall openings or based on it satisfying one or more other defined criteria, and such as automatically by the MIGM system (e.g., by applying such defined criteria to room layout information obtained for the rooms of the house) or by the MIGM system operator user selecting the hallway to use (not shown in this example), as discussed in greater detail elsewhere herein.

Figure 2F:
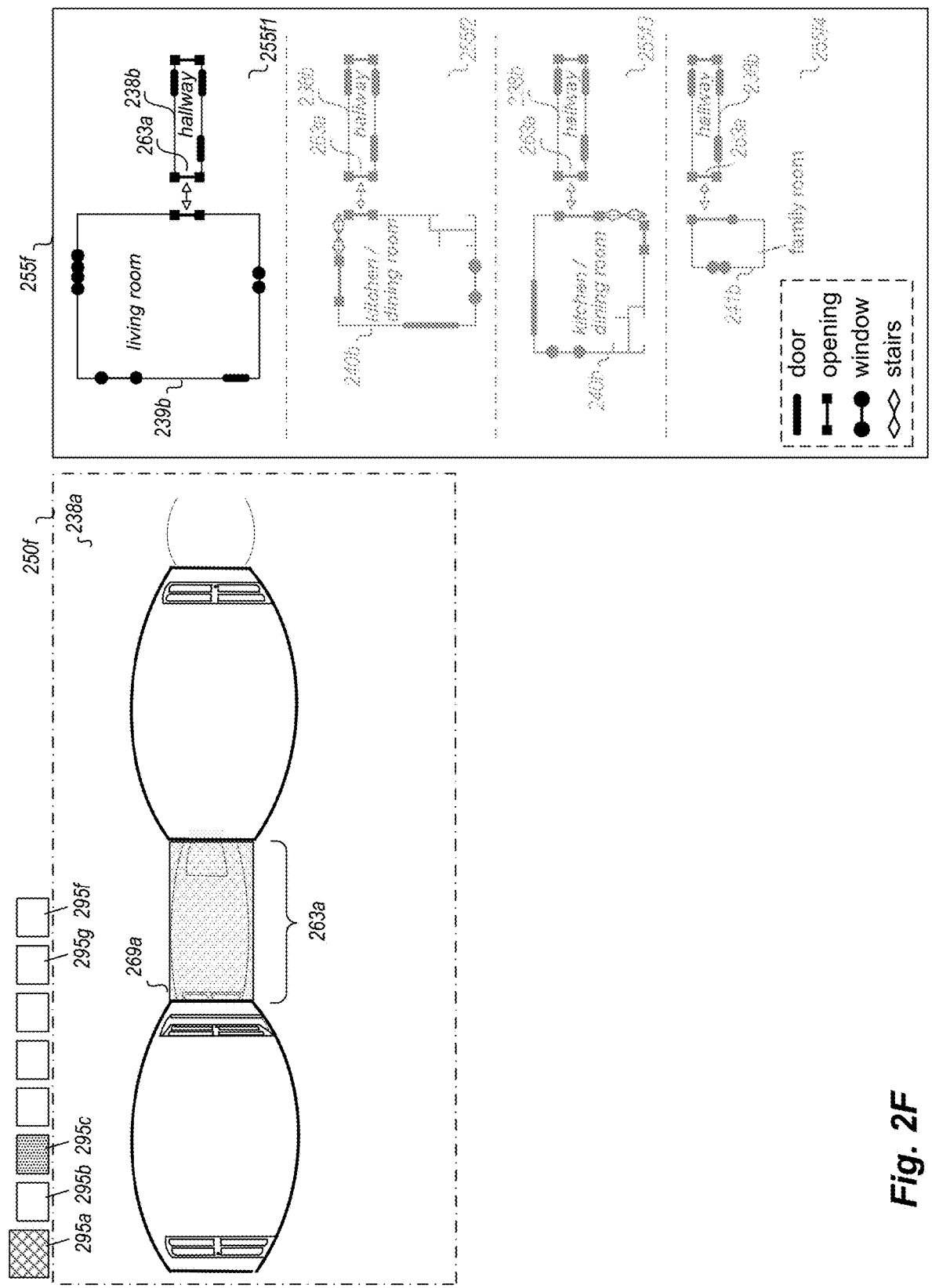

FIG. 2F continues the examples of FIGS. 2A-2E, and illustrates further use of the displayed GUI to identify candidate rooms and inter-room wall openings to connect to one or more of the inter-room wall openings of the hallway. In particular, GUI control 295c is further selected in FIG. 2F to correspond to the user initiating such functionality (e.g., to initiate a process of the MIGM system for automatically determining one or more suggested additional rooms to connect to one or more wall openings of the hallway), with the first GUI pane 250f being updated to illustrate that the inter-room wall opening 263a of the hallway is selected for connection to another room for at least a first candidate room connection, via a corresponding visual representation 269a of that inter-room wall opening being overlaid on the panorama image 238a in this example to assist the MIGM system operator user. The wall opening 263a may be selected from the five inter-room wall openings of the hallway in various manners in various embodiments, such as by the user (not shown in this example) or by the MIGM system (e.g., randomly; based on one or more defined criteria, such as a type of the wall opening and/or quantity of candidate rooms for the connection; etc.)—alternatively, in other embodiments, the MIGM system may consider candidate rooms that potentially connect to any combination of one or more of the five wall openings of the hallway. In addition, in some embodiments, the visual representation 269a may be a user-manipulatable control that the user may manipulate, such as to change the size and/or location of the visual representation if it does not correspond to the particular location of the wall opening in the image 238a (and with the corresponding room layout information for the hallway being updated accordingly to reflect such changes).

In the example of FIG. 2F, the MIGM system has determined four candidate rooms to potentially connect to the wall opening 263a of the hallway, with corresponding information displayed in the updated floor plan pane 255f, including to display at least option information 255f1 for the first candidate room connection (e.g., the highest ranked candidate room connection option), and optionally to also display option information 255f2-255f4 for the additional three candidate room connections in some embodiments. In this example, option information 255f1 corresponds to connecting a room shape 239b of the living room to the wall opening 263a of the hallway, option information 255f2 corresponds to connecting one of the two wall openings in the room shape 240b of the kitchen/dining room to the wall opening 263a of the hallway, option information 255f3 corresponds to connecting another of the two wall openings in the kitchen/dining room 240b to the wall opening 263a of the hallway, and option information 255f4 corresponds to connecting the room shape 241b of the family room to the wall opening 263a of the hallway. Accordingly, the displayed information 255f for each of the candidate options includes a room shape of the candidate other room arranged in a layout corresponding to the potential connection between the corresponding wall openings of the two rooms (such that the kitchen/dining room 240b is displayed with different rotations and locations for the two candidate options 255f2 and 255f3), and in this example with illustrations of the wall openings of the candidate other room. In at least some embodiments, the MIGM system may further rank the candidate options, such that the options in the pane 255f may be displayed in order from highest ranking (e.g., at the top) to lowest ranking (e.g., at the bottom)—in other embodiments, only the highest-ranked option may initially be shown in the pane 255f, with other options displayed only if requested by the user (e.g., by the GUI including one or more controls to cycle between the next candidate match and/or the previous candidate match, such as controls 295g and 295h). In this example, the MIGM system determines the four options based on matching a type of the wall opening 263a of the hallway (e.g., an inter-room wall opening other than a door or stairway) to corresponding types of other inter-room wall openings of other rooms, such that other rooms (e.g., bedrooms and a bathroom) are not selected as candidates due to having inter-room doorways of a different type, although in other embodiments and situations the type of wall opening may not be used in this manner (or instead other types of wall openings may be considered but given a lower ranking due to a lower likelihood of being correct). As discussed further with respect to FIGS. 2L-2R, in some embodiments a room connection graph is created and used by the MIGM system as part of determining candidate room connection options for such interconnections, and one or cost metrics may be used by the MIGM system to rank the candidate options with respect to likelihood of being the actual connection in the house (or with respect to one or more other metrics)—as a simple example, the candidate options 255f3 and 255f4 may be ranked lower than candidate options 255f1 and 255f2 due to the size of the wall openings of those candidate rooms not matching the size of the wall opening 263a of the hallway.

More generally, in at least some embodiments, one or more metrics that measure the degree of match (or lack of match) of a potential connection between two wall openings of two rooms may be based on one or more of a variety of factors, such as the following non-exclusive list: an alignment of walls of the two rooms if the two rooms are connected via the two wall openings (e.g., to decrease the weight given to a candidate as the alignment improves); an amount of overlap between panorama images of the two rooms if one room's panorama image is overlaid on the other room's panorama image at a position reflecting the two rooms being connected via the two wall openings (e.g., to decrease the weight given to a candidate as the similarity or other fit increases between the two images' visual information, such as based on alignment or other agreement of one or more of lines, colors, brightness/darkness, etc.); an amount of wall space (if any) between the walls of the two rooms if the two rooms are connected via the two wall openings (e.g., to decrease the weight given to a candidate as the amount of space between wall(s) of the candidate room and wall(s) of the other existing rooms at a location of the inter-room connection approaches an expected or otherwise specified amount of space); a closeness in order and/or time of capturing the panorama images for the two rooms as part of capturing panorama images throughout some or all of the rooms of the building (e.g., to decrease the weight given to a candidate as the difference decreases between the order and/or time of capturing the two panorama images); etc. Furthermore, the score from such metrics may either increase or decrease as the degree of match increases, depending on the embodiment and situation, with the term 'cost' metric generally referred to herein as having a decreasing score (or 'cost') as the degree of match increases, unless indicated otherwise.

In at least some embodiments, multiple cost metrics are further used together, and a candidate room connection's ranking or other assessment score is based on combining cost information from multiple cost metrics, such as to use a weighted sum of the multiple cost metrics, or to instead use machine learning techniques to train a neural network or other model to provide an aggregate cost score based on a combination of information from the multiple cost metrics. Non-exclusive examples of multiple cost metrics that may be used in this manner include the following:

(1) a shape-intersection-area cost, such as to measure how much a candidate room's room shape location is overlapping with the existing partial floor plan. As one example, this cost can be measured with the following equation (a), using 'target shape' to refer to the room shape of the candidate room, 'reference shape' to refer to the room shape(s) of the one or more rooms in the current partial floor plan, and 'shape intersection' to refer to the overlap of the candidate room's room shape with the existing room shape(s):

Cost=step function(area of shape intersection/area of target shape)+step function(area of shape intersection/area of reference shape) (a)

In at least some embodiments, some degree of room shape overlap is permitted (e.g., in large open spaces), with this cost metric considering wall openings, and optionally using ray casting to decide if an overlapping area is behind an opening or not (with overlapping areas behind openings not being counted as overlaps).

(2) a panorama capture order cost, such as to measure a similarity in order and/or time between when two panorama images for two rooms are captured, and to produce a higher score if a candidate/target room's image capture increases in order and/or time from that of the image capture(s) of the current room(s) in the partial floor plan to which the candidate room may be connected.

(3) a shape alignment cost, such as to measure how well the walls of the candidate/target room's room shape (or corresponding panorama image) aligns with the room shape(s) (or corresponding panorama image(s)) of the current room(s) in the partial floor plan to which the candidate room may be connected, and to optionally include both negative costs (or 'rewards) and positive costs. For example, if a candidate/target room's room shape has a wall that blocks an inter-room wall opening of a current room of the partial floor plan (or vice versa), a specified (positive) cost will be included, while other walls separate from the location of the inter-room connection that are parallel or perpendicular may in some embodiments can a specified negative cost (reward) to be included.

(4) a snapping feature similarity cost, such as to measure the similarity of two inter-room wall openings to be connected (e.g., by their size and/or their type, including in some embodiments to classify doors into sub-categories such as entry door, inter-room door, closet door, etc.).

(5) a shape orientation cost, such as to measure how well, if a potential connection between two inter-room wall openings is made, the orientation of the candidate/target room's room shape is aligned with the room shape(s) of the current room(s) of the partial floor plan.

(6) a room object spatial reprojection cost, such as to measure a degree to which wall feature positions match expected positions when an image reprojection is performed. For example, given known wall features for a room shape (e.g., wall features automatically determined with an object detection pipeline, manually annotated by one or more users, etc.), and an algorithm for object localization within an image (e.g., the 'Faster R-CNN' algorithm, or the faster region-based convolutional neural network algorithm), bounding boxes may be generated from panorama images for wall openings (e.g., doors, windows and other wall openings), and a wall feature position may be computed from a candidate/target room's room shape in a panorama image for a current room to be connected to the candidate/target room via inter-room wall openings of the rooms—such a reprojected wall feature bounding box may then be compared with bounding boxes generated for the panorama image for the current room for a corresponding wall feature (e.g., a wall opening). A corresponding cost value can be calculated in some embodiments with the following equation (b):

$$\text{Cost} = \text{Area of Bounding Box Intersection}/\text{Area of Bounding Box from Panorama Image For Current Room} \quad (b)$$

(7) an image camera spatial relation based cost, such as to measure a camera relative angle between a panorama image for a candidate/target room and a panorama image for a current room of the existing floor plan to which the candidate/target room is to be connected. For example, a panorama visual connection (PVC) angle may be generated to represent the angle between 2 panorama images' camera positions in space, such as to compute the PVC angle using feature matching between two such panorama images to solve the homograph matrix between them, or using a convolutional neural network-based image patch matching algorithm, or using SLAM (simultaneous localization and mapping) and compass information. For a candidate/target room and a current room of an existing partial floor plan, if they are connected, the camera relative angle can be computed between panorama images for the two rooms, and can be compared to the PVC angle, with the costs increasing as the angles diverge.

(8) an image content similarity cost, such as to measure a degree of similarity between 2 panorama images that have visual overlaps. For example, convolutional neural networks (e.g., a Siamese neural network architecture) can be used to compare 2 panorama images to determine if they have any visual overlaps and to compute where any such image overlaps occur in image space. Such a convolutional neural network may thus be used to determine the visual overlaps between two panorama images of a candidate/target room and current room of an existing partial floor plan if connected via two inter-room wall openings, the visual overlaps between two such panorama images may be further inferred using ray casting, and the content similarity between the panorama images may be measured based on the consistency between the inferred visual overlap and the determined visual overlap.

(9) a cost related to room shape alignment, such as to reduce the cost as 2 shapes become more aligned and a line segment composing a room shape polygon becomes aligned.

(10) a cost based on a topological relation related to room type (e.g., adjacency of room types), such as to reduce the cost for room types that have a higher likelihood of being close to each other (e.g., a bathroom typically being close to a bedroom and/or a hallway, and typically being less close to a patio).

(11) a cost based on a shape alignment between a shape of combined rooms and an exterior contour of the structure. For example, an exterior contour of a house and/or a location or alignment of windows and doors can be determined based on analysis of exterior images of the structure (e.g., images taken from the group, from the air, from satellites, etc.), and a cost for combining rooms may be reduced as the shape of the combined rooms matches the exterior contour and/or other location/alignment information.

In addition, with respect to using machine learning techniques in some embodiments to train a neural network or other model to provide an aggregate cost score based on a combination of information from the multiple cost metrics, at least some such embodiments may concatenate the features or other information for each cost item corresponding to an application of one of the multiple cost metrics, and supply them as input to a trained machine learning network (e.g., a trained decision tree) to produce a final aggregate cost score.

Figure 2G:
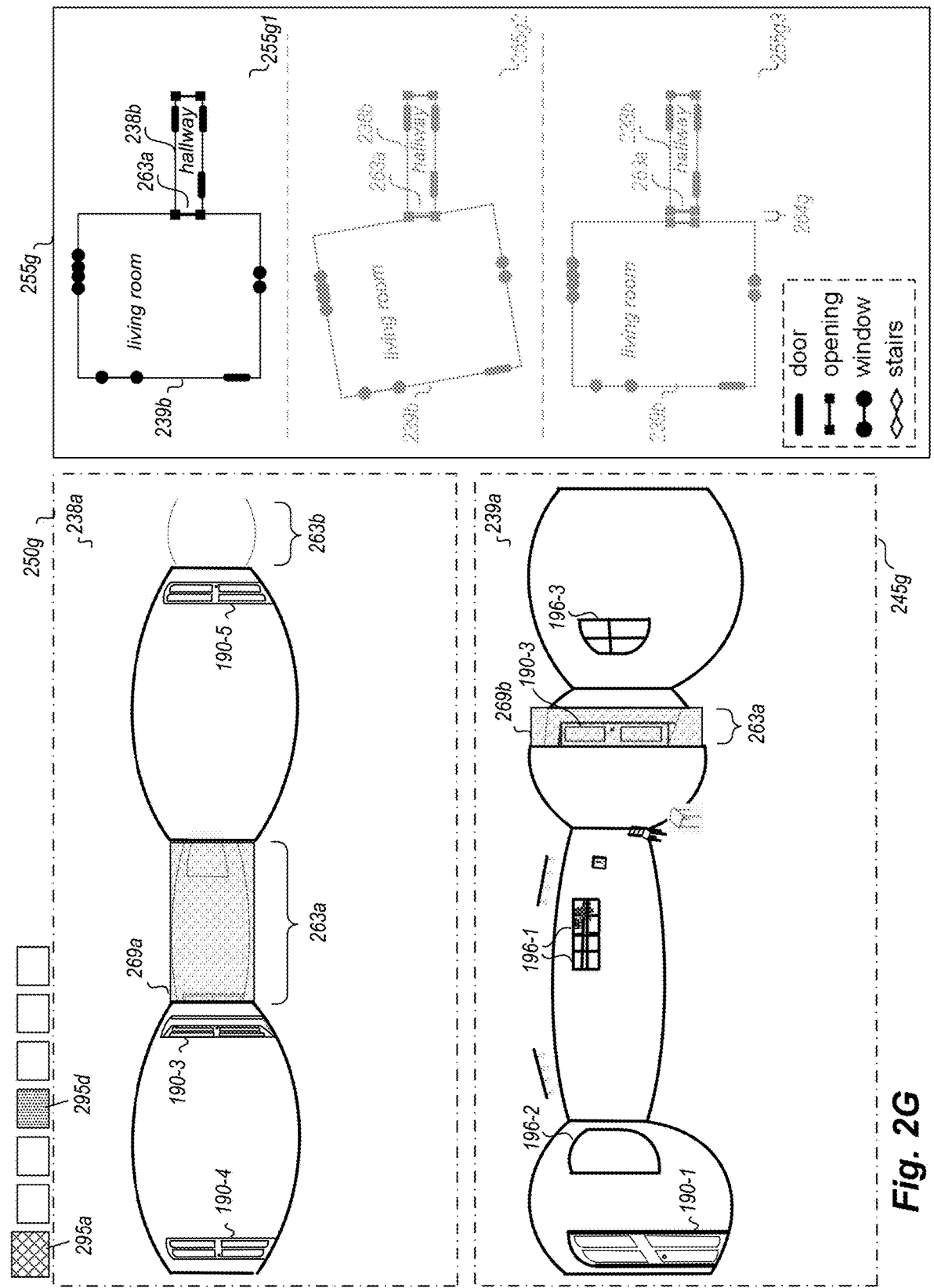

FIG. 2G continues the examples of FIGS. 2A-2F, and illustrates further use of the displayed GUI to manipulate information about an inter-room connection between the hallway and one of the candidate rooms. In particular, in the illustrated embodiment, the living room has been selected (corresponding to option 255f1 of FIG. 2F) for further interactions by the user (e.g., based on selection of a corresponding confirmation user-selectable control, not shown), whether before the user has made a final confirmation to connect the living room to wall opening 263a of the hallway (e.g., to enable examination of further details about the possible connection to verify that it is correct), or after that confirmation has been made (e.g., to adjust how the connection occurs, such as the relative layout of the room shapes 238b and 239b of the hallway and living room)—in embodiments in which only a single suggested candidate room connection is initially displayed to the user (e.g., a highest ranked candidate room connection), the GUI may display an interface similar to that of FIG. 2G without ever displaying information similar to that of FIG. 2F, and with the user having the ability to change the displayed information to sequentially correspond to other options 255f2-255f4 if so desired (e.g., by cycling through options in an order based on their ranking). In addition, while not shown in FIG. 2G, one or more of the displayed panorama images for the hallway and the living room may be overlaid with information corresponding to the other room in at least some embodiments (e.g., a wire-frame depiction of some or all borders of the other room), as discussed further with respect to FIG. 2I.

In particular, in the example embodiment displayed in FIG. 2G, the first panorama pane 250g remains the same as illustrated in FIG. 2F, but a new second panorama pane 245g has been added to display a panorama image 239a of the living room, including a visual representation 269b to show the location of the inter-room wall opening 263a of the hallway in the living room's panorama image if the living room is connected to the hallway via that wall opening. In addition, the GUI controls 295 have been updated to show that secondary control 295d has been selected, such as to correspond to performing adjustments or other user manipulations of a potential connection between two or more rooms. In addition, the floor plan pane 255g has been updated to show information about at least a first option 255g1 of multiple options 255g1-255g3 that correspond to different possible alignments of the room shapes of the hallway and living room relative to each other, although in other embodiments only a single option may be displayed and may be updated as the user makes corresponding changes via interactions with the floor plan pane or one of the panorama panes (or alternatively for the user to be able to switch to display different possible alignment options). In the illustrated example, the option 255g1 corresponds to a situation in which the east wall of the living room is displayed parallel to the west end of the hallway (perpendicular to the northern and southern walls of the hallway), and with no space between that eastern wall of the living room's room shape and the western end of the hallway's room shape, such as if the wall openings in the two room shapes are snapped together and the rotation of the living room's room shape is modified to provide the alignment. The other options 255g2 and 255g3 correspond to other possible configurations of the layout of the two room shapes, such as if the east wall of the living room is not exactly parallel to the west end of the hallway in option 255g2 (e.g., the information in one of the room shapes about the location of its inter-room wall opening is imprecise and is not perfectly aligned with a surrounding wall of that room shape), or if an estimated amount of distance 264g between the east wall of the living room and the west end of the hallway is included in option 255g3 to correspond to an estimated width of the wall (e.g., between the eastern wall of the living room and western walls of two bedrooms to the east of the living room and to the north and south of the hallway). In some embodiments and situations, the user may further manipulate displayed information to control an amount of the wall depth, such as is discussed in greater detail with respect to FIG. 2J. As noted elsewhere, in at least some embodiments and situations, the information in the various displayed GUI panes is coordinated, such that changes made by the user to information in any of the GUI panes is reflected in the information displayed in other of the panes—thus, for example, if the visual representation 269a's size and/or location is modified in pane 250g, corresponding visual representation 269b in pane 245g and information in page 255g about that wall opening may be automatically updated (e.g., in a real-time simultaneous manner, or near-real-time manner).

Figure 2H:
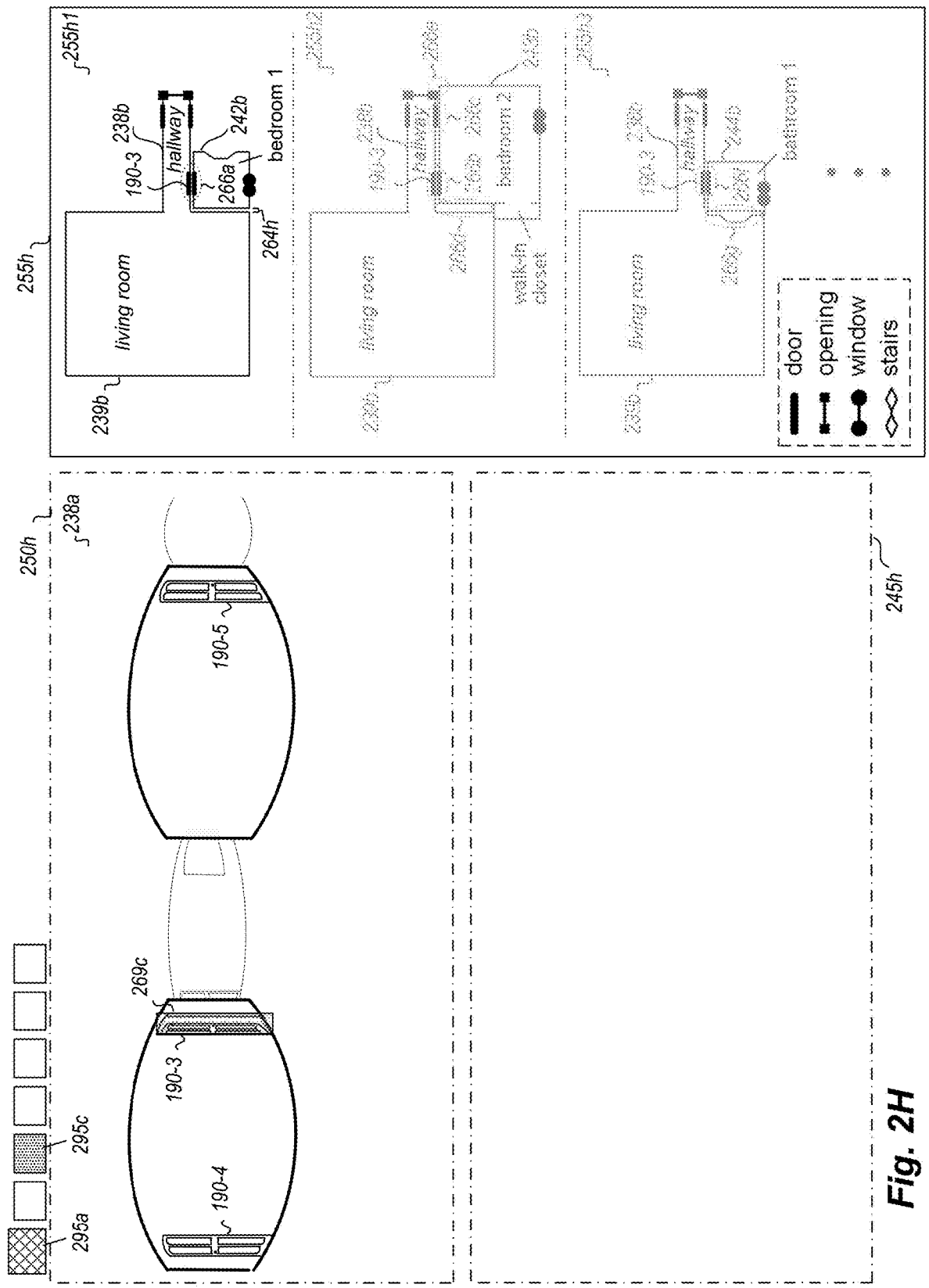

FIG. 2H continues the examples of FIGS. 2A-2G, and illustrates use of the displayed GUI to continue to interconnect additional rooms to the partial floor plan, such as after a particular alignment of the room shapes for the hallway and living room have been confirmed by the user (e.g., based on selection of a corresponding confirmation user-selectable control, not shown). In particular, in the example embodiment displayed in FIG. 2H, the connection between the living room and hallway via the wall opening 263a of the hallway has been made, and secondary GUI control 295c has been used to generate a new group of suggested candidate room connections to combine to the combination of the hallway and the living room in the resulting partial floor plan. In this example, at least a first option 255h1 of three additional candidate room connection options 255h1-255h3 are shown in the floor plan pane 255h as updated, and the second panorama image pane is updated 245h to not show any panorama image (e.g., since a particular additional candidate room connection option is not yet selected), although in other embodiments only a single option may be displayed in floor plan pane 255h (e.g., corresponding to a highest ranked one of the candidate room connection options) and a corresponding panorama image for that option may be initially displayed in the second panorama image pane 245h. In this example, the panorama image 238a is updated 250h to show a visual representation 269c corresponding to doorway wall opening 190-3 near the southwest end of the hallway and to remove the previous visual representation 269a corresponding to wall opening 263a, with the options 255h1-255h3 each corresponding to candidate room connection options for doorway 190-3 in this example—in other embodiments, the candidate room connection options that are generated and ranked may correspond to connections to any available wall opening of any of the rooms in the current partial floor plan (e.g., for a first option to correspond to a first other room connected to doorway 190-3 of the hallway; for a second option to correspond to a connection of another room to the doorway wall opening 190-1 of the living room, such as if the door is not yet known to be an exterior door that does not connect to any other rooms; for third and fourth options to correspond to connections to a different doorway wall opening of the hallway, such as doorway 190-4 or 190-5; etc.).

As the number of rooms in the partial floor plan increases, additional information may be available to improve rankings of candidate room connection options, as reflected in aspects 266a-266g illustrated in pane 255h for the benefit of the reader (and optionally displayed to the MIGM system operator user in some embodiments, such as if the user requests details about likelihood rankings or other assessment scores of one or more candidate room connection options). For example, with respect to option 255h1 in which the doorway 190-3 of the hallway is interconnected with a doorway of a displayed room shape 242b, aspect 266a corresponds to a potential connection of the two doorways, which in this example appears to match doorway openings of the same size—furthermore, the west and north walls of the room shape 242b appear to be generally aligned with the east wall of the living room and south wall of the hallway, respectively, and the south wall of the room shape 242b appears to generally be aligned with the south wall of the living room, and an initial width 264h is shown corresponding to a wall depth between the west wall of the room shape 242b and the east wall of the living room, and a similar wall depth is shown between the north wall of the room shape 242b and the south wall of the hallway. In this example, the room shape 242b is labeled as corresponding to a "bedroom 1" room, such as if that annotation information is available with room layout information for that room, while in other embodiments such room labels may be added by the MIGM system operator user (whether at a time of connecting that room into the partial floor plan or another time, such as after all of the room shapes have been interconnected) or may not be displayed at this time.

Figure 2I:
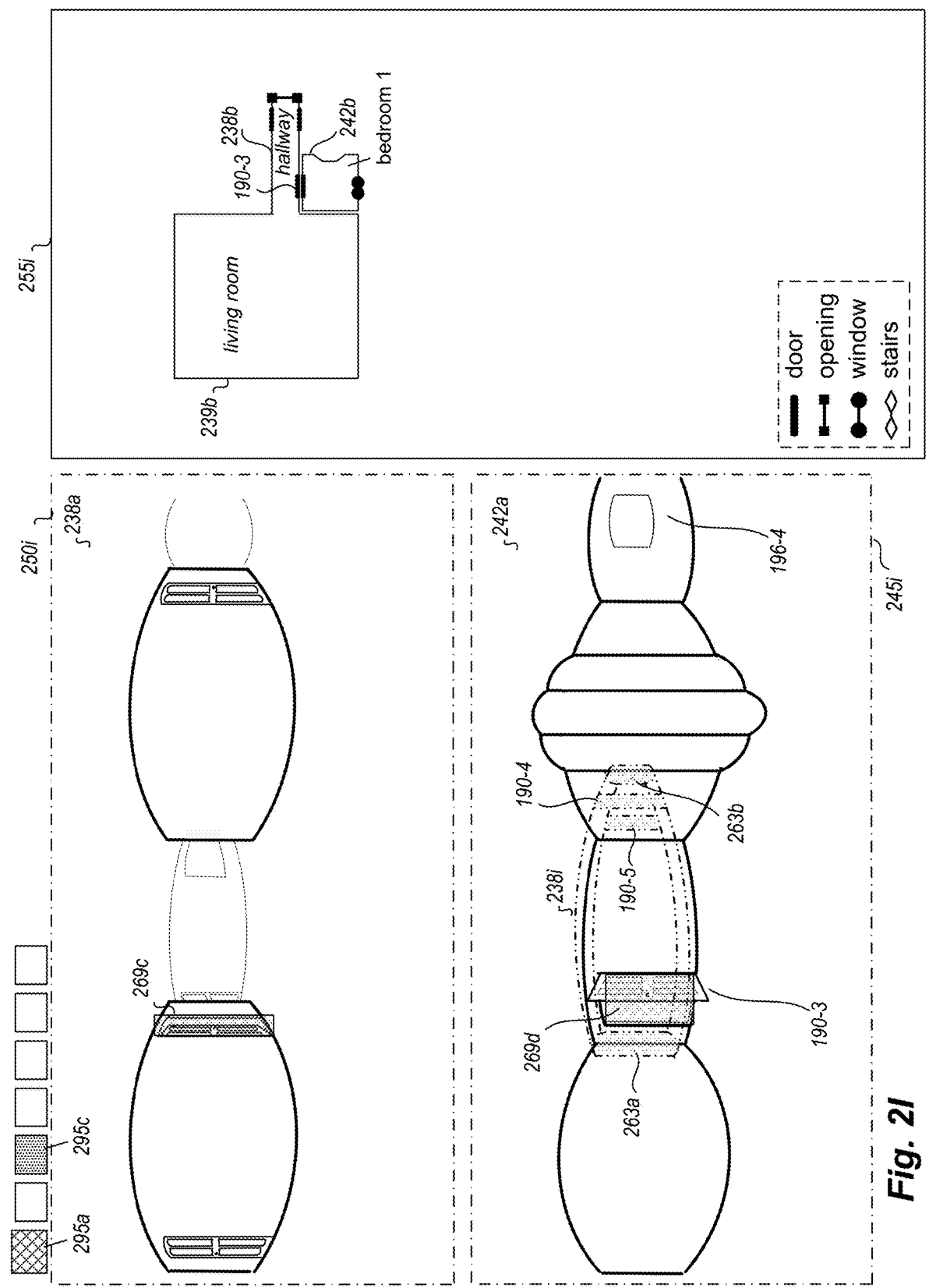

FIG. 2I continues the examples of FIGS. 2A-2H, and illustrates additional use of the displayed GUI to continue to interconnect an additional room to the partial floor plan in which the hallway is interconnected to the living room, such as after the 'bedroom 1' room shape 242b has been selected (corresponding to option 255h1 of FIG. 2H) for further interactions by the user (e.g., based on selection of a corresponding confirmation user-selectable control, not shown). In particular, in the example embodiment displayed in FIG. 2I, the further user interactions may be performed before the user has made a final confirmation to connect bedroom 1 to doorway opening 190-3 of the hallway (e.g., to enable examination of further details about the possible connection to verify that it is correct), or after that confirmation has been made (e.g., to adjust how the connection occur, such as the relative layout of the room shape 242b relative to room shapes 238b and 239b of the hallway and living room, and optionally to further adjust the relative layouts of the room shapes 238b and 239b of the hallway and living room to each other if appropriate). In embodiments in which only a single suggested candidate room connection is initially displayed to the user (e.g., a highest ranked of multiple candidate room connections), the GUI may display an interface similar to that of FIG. 2I without ever displaying information similar to that of FIG. 2H, and with the user having the ability to change the displayed information to sequentially correspond to other options 255h2-255h3 if so desired (e.g., by cycling through options in an order based on their ranking).

FIG. 2I further illustrates an example of displaying information overlaid on one of the panorama images for one of the rooms that corresponds to the other room, and in particular illustrates information 238i for the hallway that is overlaid on panorama image 242a of bedroom 1 displayed in pane 245i—in this example, the overlaid information 238i includes borders of the hallway shown using dashed lines, along with visual representations of the locations of doorways 190-3, 190-4 and 190-5 and other wall openings 263a and 263b of the hallway (including a visual representation 269d of doorway opening 190-3 of the hallway). While similar overlaid information for bedroom 1 is not displayed on panorama image 238a of the hallway in this example, such additional overlaid information may be displayed at least some embodiments. As with other portions of the GUI, the MIGM system operator user may manipulate various information in one of the displayed panes to cause corresponding information to be updated in other displayed panes, such as to manipulate the size and/or location of the overlaid information 238i to affect how the interconnection between the hallway and bedroom 1 occurs, with corresponding updates to the information displayed in the floor plan pane 255i and to the panorama image 238a as appropriate (e.g., to update the display of the overlaid information on panorama image 238a corresponding to borders of bedroom 1, not shown).

FIG. 2J continues the examples of FIGS. 2A-2I, and illustrates additional use of the displayed GUI to obtain information from user manipulations of displayed information to control interconnections of room shapes. In particular FIG. 2J illustrates an expanded version of GUI pane 250j without other portions of the GUI, in order to display additional detail about the doorway opening 190-3 of the hallway that is potentially being connected to bedroom 1. In this example, additional information is specified to represent the doorway from both the hallway side 224a and the side 224b of the connected room, with the difference 223 corresponding to the width of the wall in this example. In particular, the user may manipulate visual representations 224a and/or 224b of the door (and of additional portions of the hallway and/or bedroom 1, not shown) to match the room borders for the hallway and for bedroom 1 in this image, and such wall width information may be further used in the room layout information to specify a corresponding width of the walls between the hallway and bedroom 1. Similar information can be specified for other doors and inter-room openings, with corresponding wall width being determined and also used in a similar manner for the layout of interconnected room shapes. Information about wall widths may be determined and used in other manners in other embodiments, such as to use a fixed size (e.g., based on a standard thickness of drywall or other wall material), to not represent or otherwise use wall widths, or to otherwise perform automated determinations and/or manual adjustments of wall width information using image information and/or other information (e.g., acquired depth data from depth sensors).

Returning to FIG. 2H, information 255h2-255h3 may also be shown for other candidate room connection options, whether initially together with information 255h1 for the highest ranked option or instead later (e.g., sequentially as a user request information about other room connection options). In this example, information 255h2 corresponds to a potential room connection with a different room having room shape 243b being connected to the doorway 190-3 of the hallway (with that different room having a label of 'bedroom 2' in this example), and information 255h3 corresponds to a different potential room connection with another different room having room shape 244b being connected to the doorway 190-3 of the hallway (with that other different room having a label of 'bathroom 1' in this example). Additional indicated aspects 266b-266g illustrate potential problems with the room alignments for the options corresponding to information 255h2 and 255h3 in this example, such as to score higher costs with respect to one or more cost metrics than the option for information 255h1 (and thus be ranked lower than the option for information 255h1). For example, with respect to information 255h2, the information aspect 266b for the potential connection illustrates a similar connection between doorways as is present for the highest ranked option of information 255h1, but aspect 266c illustrates that the room shape for bedroom 2 continues far enough to the east to cover the doorway 190-4 of the hallway without any corresponding doorway in bedroom 2, aspect 266d illustrates that the room shape for bedroom 2 ends short of the east wall of the living room by an amount that is larger than a typical wall width, and aspect 266e illustrates that the east end of the room shape 243b extends beyond the end of the hallway, one or more of which may each result in higher costs for one or more cost metrics than the potential connection to bedroom 1 shown in information 255h1. Similarly, with respect to information 255h3, the information aspect 266f for the potential connection illustrates a similar connection between doorways as is present for the highest ranked option of information 255h1, but aspect 266g illustrates that the room shape for bathroom 1 has a west wall that is not aligned with the shape of the east wall of the living room and further continues far enough to the west to overlap with part of the living room, each of which may result in higher costs for one or more cost metrics than the potential connection to bedroom 1 shown in information 255h1.

Figure 2K:
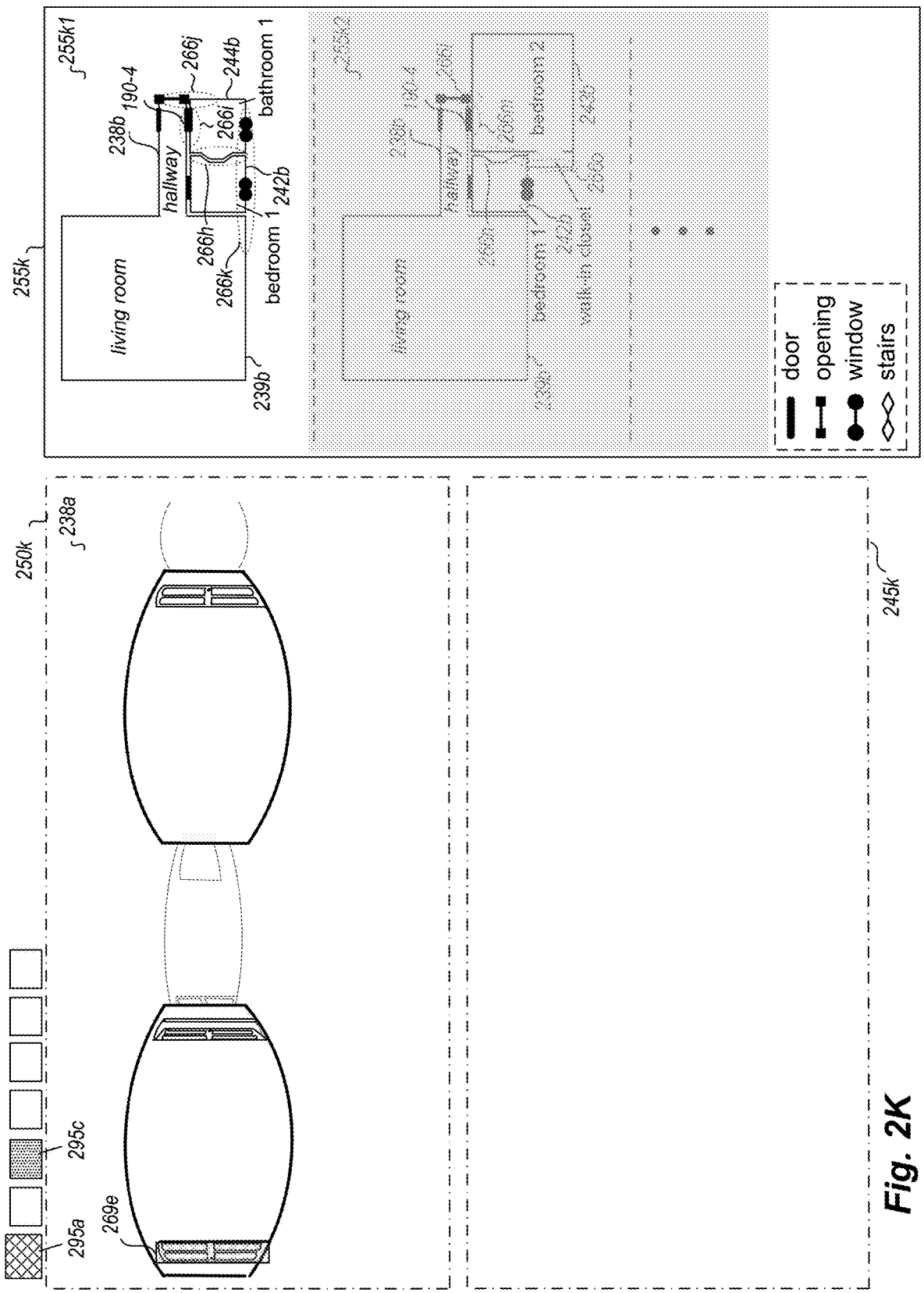

FIG. 2K continues the examples of FIGS. 2A-2J, and illustrates use of the displayed GUI to continue to interconnect additional rooms to the partial floor plan that now includes interconnections between the hallway and the living room and bedroom 1, such as after a particular alignment of the room shape for bedroom 1 relative to those of the hallway and living room have been confirmed by the user (e.g., based on selection of a corresponding confirmation user-selectable control, not shown). In particular, in the example embodiment displayed in FIG. 2K, the connection between the bedroom 1 and the hallway via the doorway opening 190-3 of the hallway has been made, and secondary GUI control 295c has been used to generate a new group of suggested candidate room connections to combine to the combination of the hallway and the living room and bedroom 1 in the resulting partial floor plan. In this example, at least a first option 255k1 of two or more further candidate room connection options 255k1-255k2 are shown in the floor plan pane 255k as updated, and the second panorama image pane 245k is updated to not show any panorama image (e.g., since a particular additional candidate room is not yet selected), although in other embodiments only a single option may be displayed in floor plan pane 255k (e.g., corresponding to a highest ranked one of the candidate room connection options) and a corresponding panorama image for that option may be initially displayed in the second panorama image pane 245k. In this example, the panorama image 238a is updated to show a visual representation 269e corresponding to doorway wall opening 190-4 near the southeast end of the hallway, with the options 255k1-255k2 each corresponding to candidate room connection options for doorway 190-4 in this example—in other embodiments, the candidate room connection options that are generated and ranked may correspond to connections to any available non-connected wall opening of any of the rooms in the current partial floor plan.

In a manner similar to that of FIG. 2H, FIG. 2K illustrates information about aspects 266h-266o in pane 255k for the benefit of the reader (and optionally displayed to the MIGM system operator user in some embodiments, such as if the user requests details about likelihood rankings or other assessment scores of one or more candidate room connection options). For example, with respect to option 255k1 in which the doorway 190-4 of the hallway is interconnected with a doorway of the displayed room shape 244b of bathroom 1, aspect 266i corresponds to a potential connection of the two doorways, which in this example appears to match doorway openings of the same size—furthermore, aspect 266h illustrates that the west wall of bathroom 1 fits the east wall of bedroom 1, aspect 266j illustrates that the east wall of bathroom 1 is generally aligned with the east end of the hallway, and aspect 266k illustrates that the south walls of the living room and bedroom 1 and bathroom 1 are all generally aligned. In contrast, additional indicated aspects 266l-266o illustrate potential problems with the room alignments for the option corresponding to information 255k2 in this example, such as to score higher costs with respect to one or more cost metrics than the option for information 255k1 (and thus be ranked lower than the option for information 255kj1). For example, with respect to information 255k2, the information for aspect 266m for the potential connection illustrates a similar connection between doorways as is present for the highest ranked option of information 255k1, but aspect 266l illustrates that the room shape for bedroom 2 continues far enough to the east to be significantly past the east end of the hallway, aspect 266n illustrates that the west wall of the room shape for bedroom 2 does not fit with the east wall of bedroom 1, and aspect 266o illustrates that the southwest part of the room shape 243b extends beyond the south walls of the living room and bedroom 1 (which may be inconsistent with information from the panorama image taken at acquisition location 210M that shows all of the south side of the house being flat and along the same plane), some or all of which may result in higher costs for one or more cost metrics than the potential connection to bathroom 1 shown in information 255k1.

The MIGM system may continue to perform automated operations to iteratively connect additional rooms to the existing partial floor plan, with one example of a resulting completed floor plan being illustrated and discussed with respect to FIG. 2S. While not illustrated in FIGS. 2D-2K, various additional types of functionality may also be provided in some embodiments. For example, in some embodiments an MIGM system operator user may further initiate additional manual inter-connections between rooms as part of generating a floor plan, such as to reject the automatically determined and suggested potential room connections and to instead manually select a new room to connect to one or more current rooms of a partial floor plan (e.g., to display all remaining room shapes, and allow the user to select one of those room shapes and to manually position it as desired), to manage situations in which panorama images are available for only a subset of the rooms of a building and the user manually adds information for other rooms, etc. In addition, in some embodiments, the MIGM system may further use information about features visible in multiple images (e.g., windows) in order to determine alignments between rooms displayed in the images. Moreover, in some embodiments, the MIGM system may further automatically align walls of rooms as part of potential room connections, whether in addition to or instead of interconnecting wall openings of rooms.

Figure 2L:
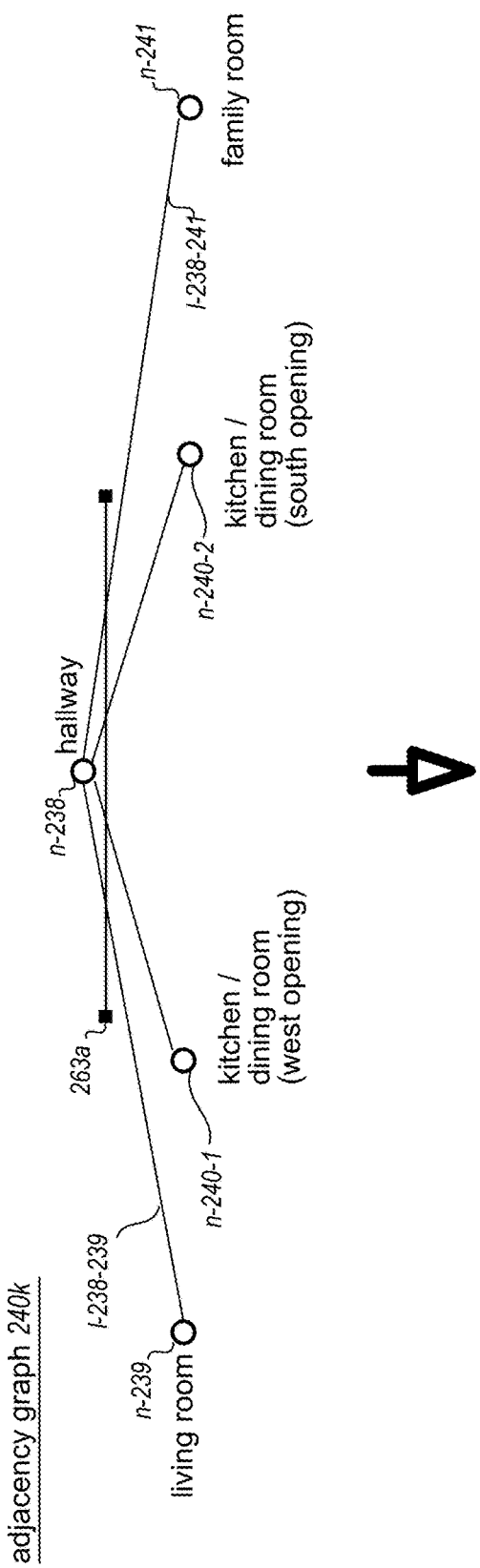
Figure 2L:
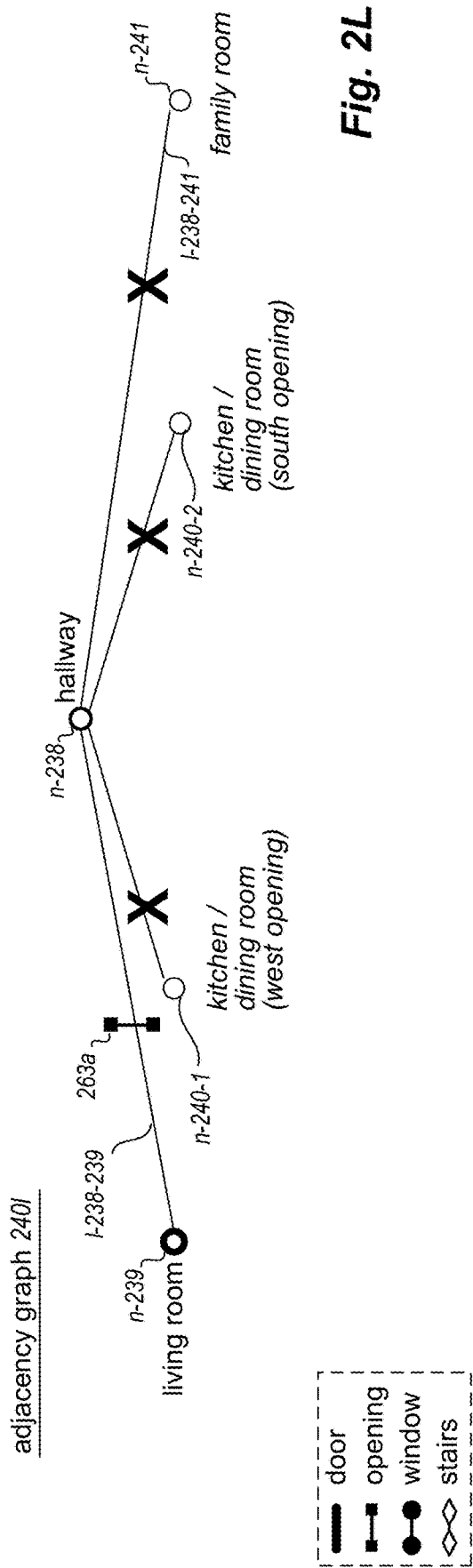

FIGS. 2L-2R continues the examples of FIGS. 2A-2K, and further illustrate information about one or more example graphs that may be constructed by and/or used by the MIGM system as part of determining candidate room connection options to provide to an MIGM system operator user via the GUI of the MIGM system, as well as representing confirmed inter-room connections. In particular, with respect to FIG. 2L, it illustrates a graph 240k for rooms of the house, such as to correspond to the candidate room connection options displayed in FIG. 2F for connections to the wall opening 263a of the hallway. In particular, in this example, this version of the room connection graph is built incrementally, beginning with a node n-238 that represents the hallway room, and with possible child nodes n-239, n-240-1, n-240-2 and n-241 being added that correspond to rooms having potential connections to wall opening 263a of the hallway, as shown by corresponding inter-node links (e.g., link 1-238-239 corresponding to the potential connection between the hallway 238 and the living room 239 via wall opening 263a of the hallway)—for reference purposes, such an incrementally created room connection graph is referred to with respect to FIGS. 2L-2N as an adjacency graph to distinguish it from the room connection graphs discussed with respect to FIGS. 2O-2R. As discussed in greater detail elsewhere herein, various costs metrics may be applied to the potential connections, such as to result in ranking the potential connection represented by link 1-238-239 to the living room as the highest ranked option. FIG. 2L further illustrates a modified adjacency graph 240*l* that corresponds to the living room having been confirmed as connected to the hallway via the wall opening 263*a*, such as after an MIGM system operator user manually confirms the connection or based on the MIGM system automatically selecting and confirming the connection based on the rankings—in the modified adjacency graph 240*l*, the links for the non-selected connections and their corresponding child nodes are being removed.

Figure 2M:
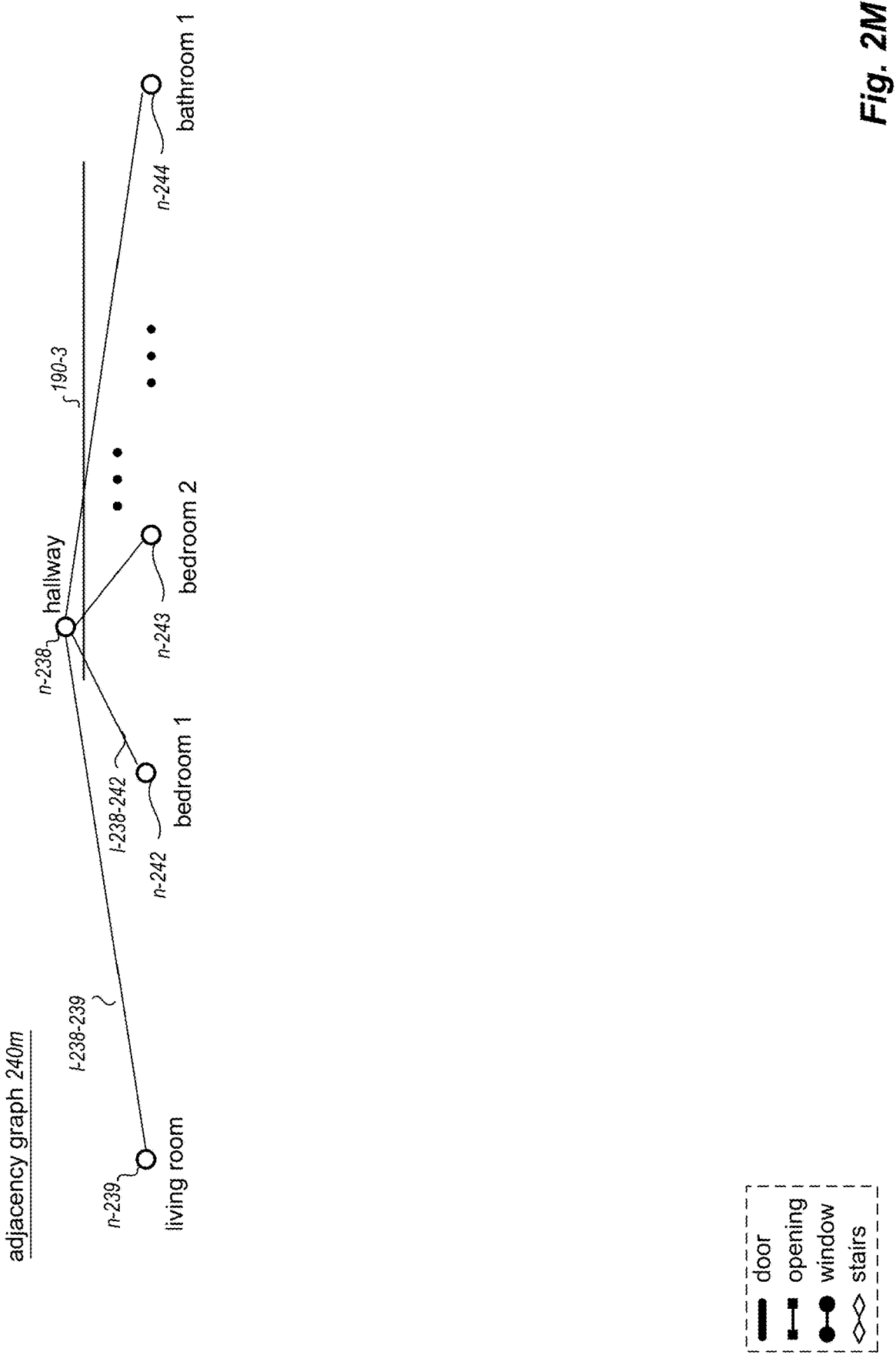

FIG. 2M continues the examples of FIGS. 2A-2L, and illustrates a modified version of the adjacency graph 240*m* that contains information corresponding to FIG. 2H, in which candidate room connection options are determined to combine with an existing partial floor plan that has a combination of the hallway and the living room. In this example, the existing connection represented by link 1-238-239 to the living room continues to be shown, and additional possible candidate room connection options corresponding to doorway 190-3 of the hallway are further added to the adjacency graph, such as to correspond to potential connections to additional rooms bedroom 1, bedroom 2 and bathroom 1 via corresponding links (e.g., link 1-238-242 corresponding to the potential connection between the hallway 238 and the bedroom 1 via doorway opening 190-3 of the hallway). As discussed in greater detail elsewhere herein, various cost metrics may be applied to the potential connections, such as to result in making the potential connection represented by link 1-238-242 to bedroom 1 as the highest ranked option. While not illustrated in FIG. 2M, the links for the non-selected connections and their corresponding child nodes will be removed once an actual inter-room connection is confirmed.

Figure 2N:
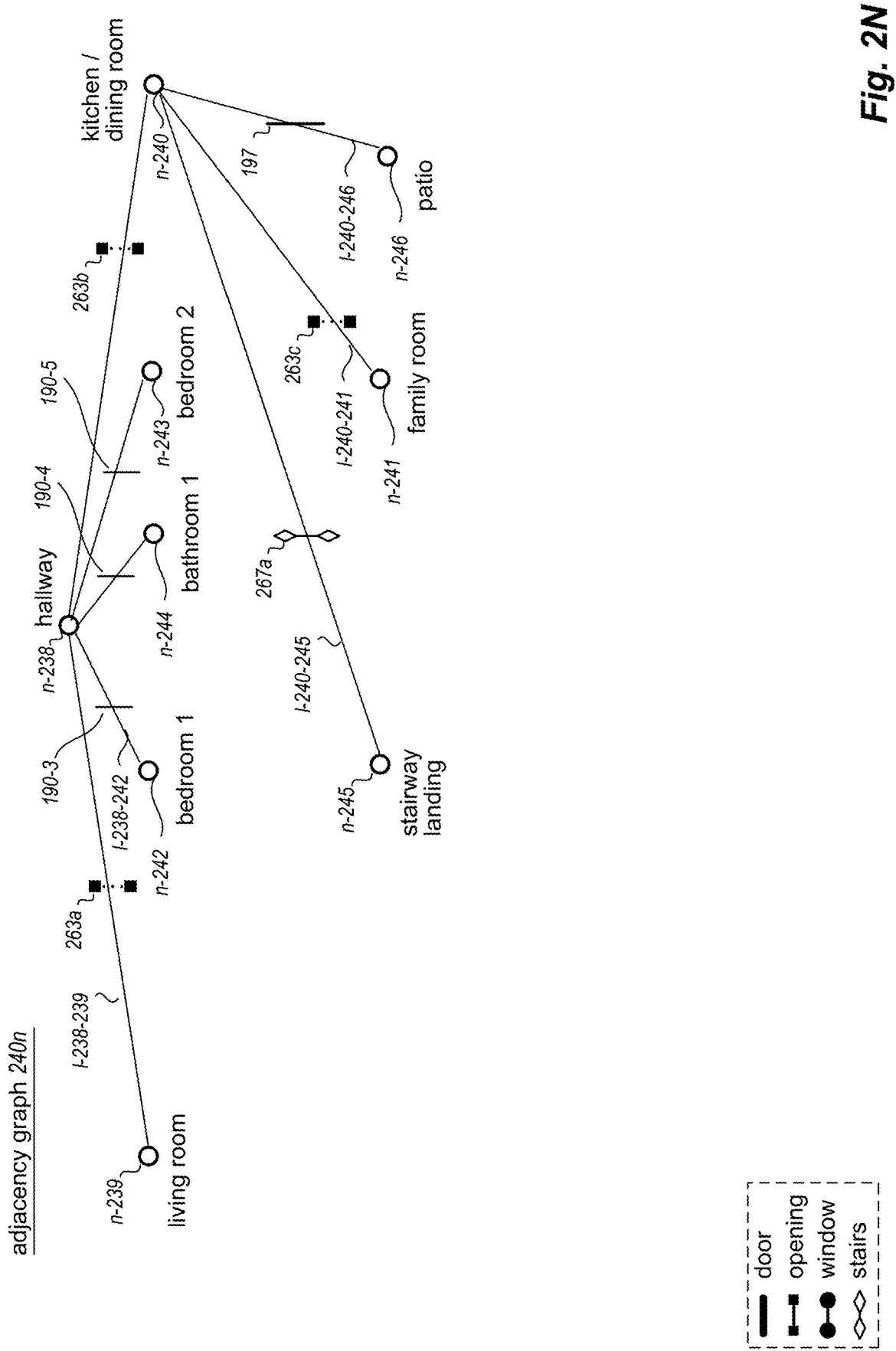

FIG. 2N continues the examples of FIGS. 2A-2M, and illustrates a further modified version of the adjacency graph 240*n* at a later point in time after all five wall openings of the hallway have been connected to corresponding rooms (i.e. living room 239, bedroom 1 242, bathroom 1 244, bedroom 2 243 and kitchen/dining room 240, connected to wall openings 263*a*, 190-3, 190-4, 190-5 and 263*b* of the hallway, respectively), as shown by corresponding links and child room nodes of the modified adjacency graph. The modified adjacency graph further illustrates additional inter-room connections that have been made for three other wall openings of the kitchen/dining room to other rooms or areas of the house (i.e. landing 245 in the middle of the stairway, the family room 241, and the patio 246 outside the eastern exterior door 197 of the house, connected to wall openings 267*a*, 263*c* and 197 of the kitchen/dining room, respectively). The adjacency graph 240*n* may be further modified to reflect connections to additional rooms of a second story (not shown) of the house via the stairway landing node n-245, and in some embodiments may be further modified to include links from the patio to one or more exterior areas corresponding to the acquisition locations 210L and 210M (e.g., a backyard and a side yard, respectively). When completed, such an adjacency graph represents a final room connection graph for the house that shows the connections between the rooms in the final floor plan. In addition, while not illustrated in FIG. 2N, the nodes and/or links of the adjacency graph may contain further information in at least some embodiments, such as to each include one or more attributes with associated values. For example, some or all nodes may each include information about attributes of the room represented by the node, such as for attributes including one or more of the following: room type; room dimensions; locations in the room of windows and doors and other inter-room openings; information about a shape of the room (whether about a 2D shape and/or 3D shape); a type of view for each window, and optionally direction information that each window faces; optionally direction information for doors and other inter-room openings; information about other features of the room, such as from analysis of associated images and/or information supplied by end-users who view the floor plan and optionally its associated images (e.g., visual appearance and types of materials used, such as colors and/or textures and/or types for carpets or other floor materials and for wall coverings and for ceilings; etc.; light fixtures or other built-in elements; furniture or other items within the room; etc.); information about and/or copies of images taken in the room (optionally with associated location information within the room for each of the images); information about and/or copies of audio or other data captured in the room (optionally with associated location information within the room for each of the audio clips or other pieces of data); etc. Similarly, some or all links (or 'edges') may each include information about attributes of the inter-room adjacency represented by the link/edge, such as for attributes including one or more of the following: an inter-room connection type; inter-room connection dimensions (e.g., width; height and/or depth); etc. Various other types of information may similarly be stored in or associated with the adjacency graph in at least some embodiments.

Figure 2O:
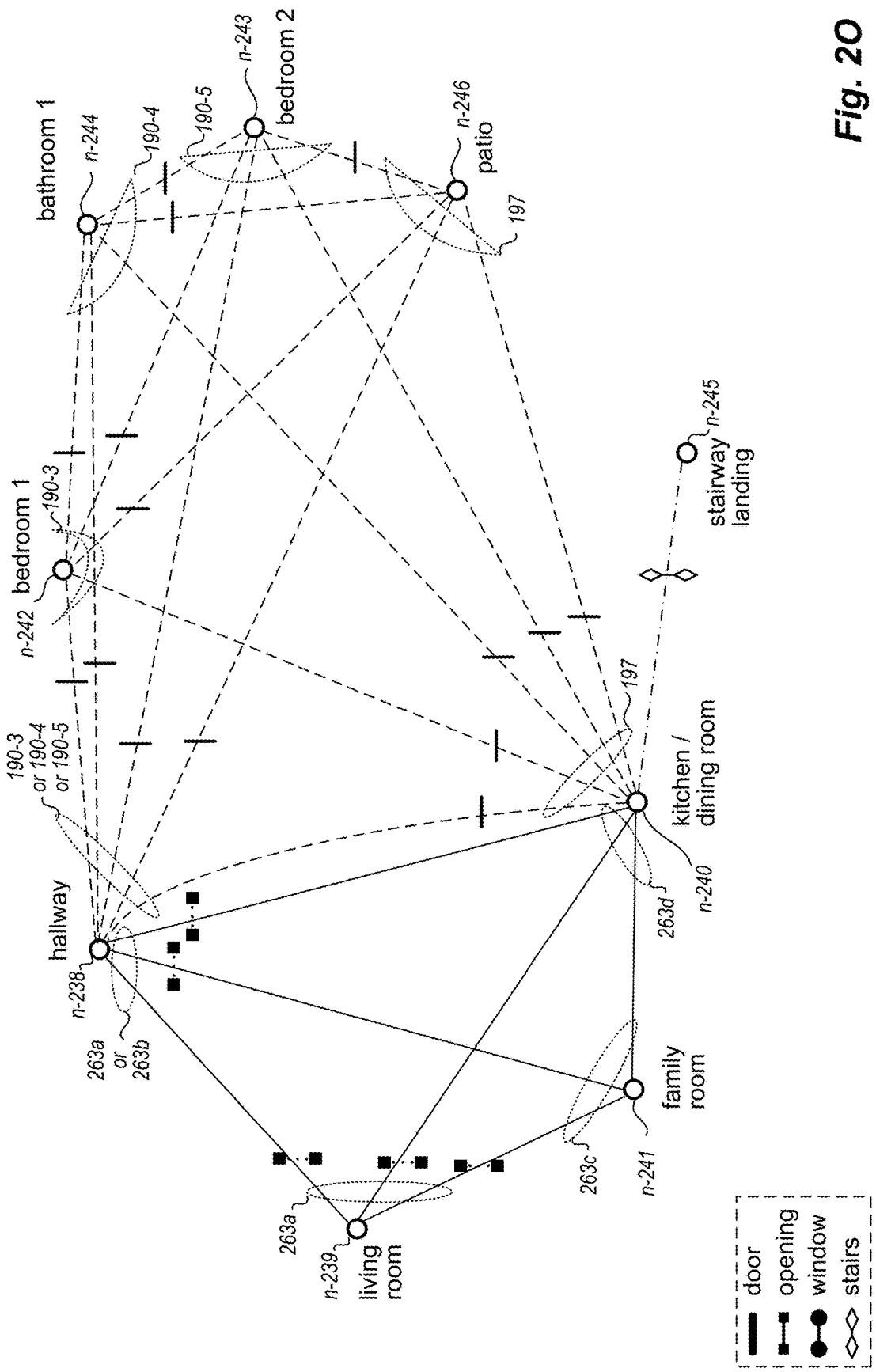

FIGS. 2O-2R continues the examples of FIGS. 2A-2K, and illustrate examples of an alternative technique for generating and using a room connection graph corresponding to a floor plan for the house. In particular, FIG. 2O illustrates an initial version of the room connection graph 240*o* for rooms of the house that is fully connected, such as to include links representing all possible candidate room connection options between all rooms of the house (which in this example are limited to connections between wall openings of the same type, and do not include connection options to areas outside of the house). Accordingly, while room connection graph 240*o* includes a node n-238 that represents the hallway room in a similar manner to the adjacency room graphs of FIGS. 2L-2N, and includes links corresponding to connections between that node and other nodes n-239, n-240 and n-241 corresponding to the living room and family room and kitchen/dining room to which wall opening 263*a* of the hallway may be potentially connected, the room connection graph 240*o* further includes other nodes as reflected in the adjacency room graph of FIG. 2N and includes other links corresponding to potential connections between other rooms as illustrated. While not illustrated in FIG. 2O, the nodes and links/edges may further store various attribute information of various types corresponding to their respective rooms and inter-room connections, as discussed with respect to FIG. 2N and elsewhere herein.

Figure 2P:
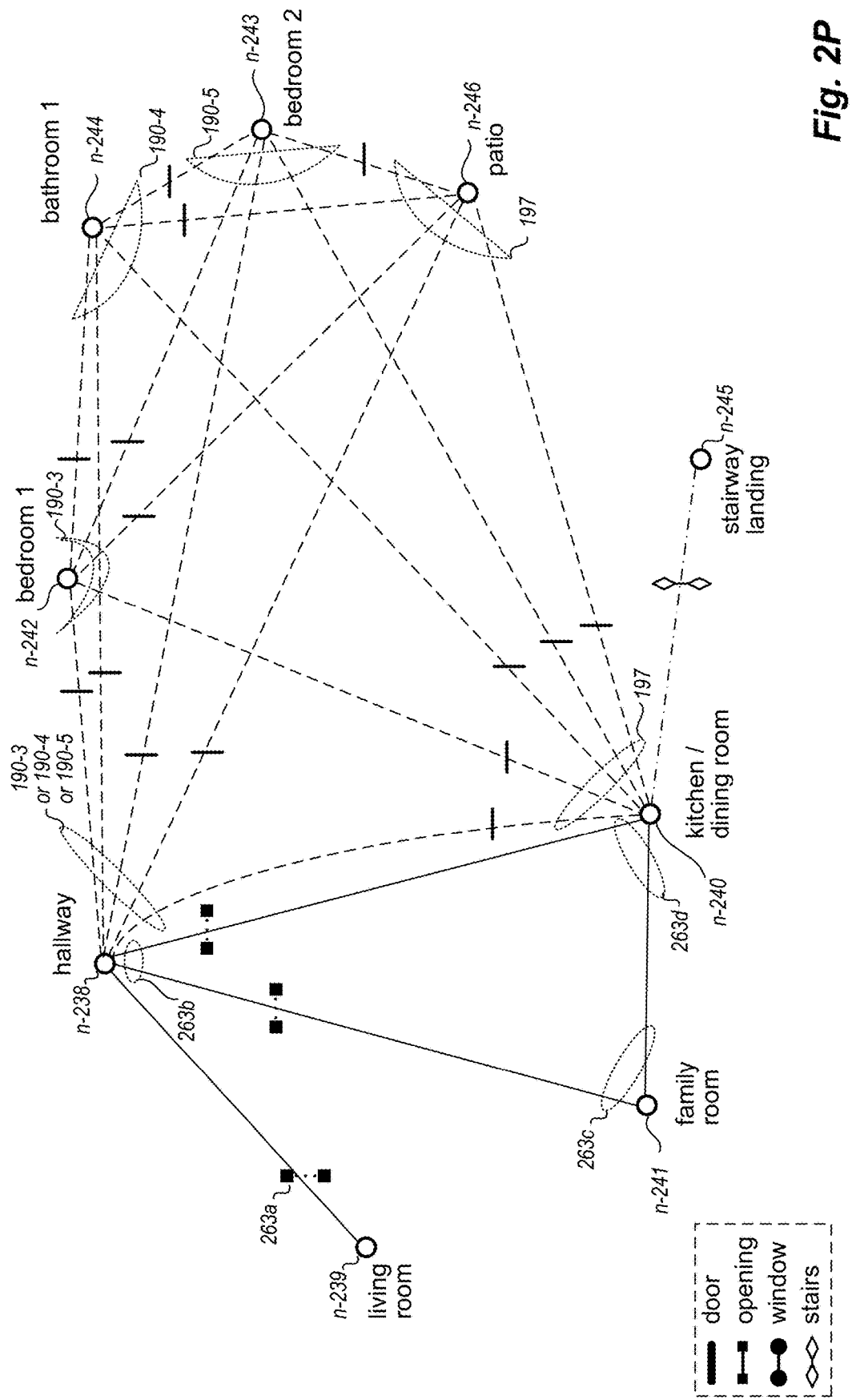

FIG. 2P continues the examples of FIGS. 2A-2O, and illustrates a modified version of the room connection graph 240*p* in which some links have been removed from the graph 240*o* so that the resulting graph is only partially connected. In particular, the room connection graph 240*p* corresponds to FIG. 2G, in which an inter-room connection between the living room and the hallway has been established via wall opening 263*a* of the hallway—accordingly, other possible links corresponding to possible connections to wall opening 263*a* of the hallway and the wall opening of the living room have been removed (to reflect an assumption in the illustrated embodiment that only two wall openings are interconnected, although in other embodiments more than two wall openings may be connected in at least some situations), while other possible connections for other wall openings remain.

Figure 2Q:
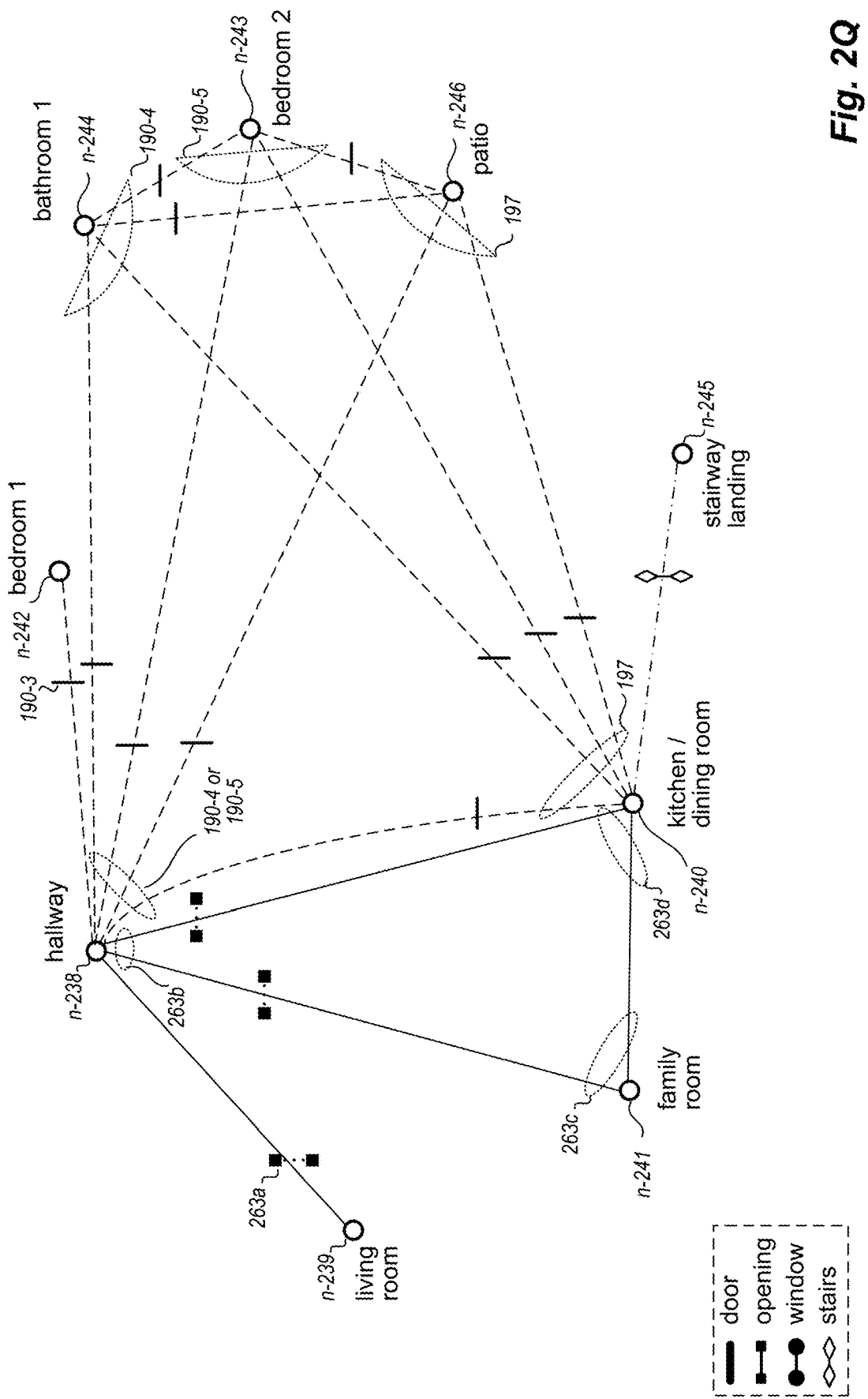

FIG. 2Q continues the examples of FIGS. 2A-2P, and illustrates a further modified version of the room connection graph 240*q* in which additional links have been removed from the graph 240*p*, corresponding to a further inter-room connection being established between the hallway and bedroom 1 via doorway 190-3 of the hallway. Accordingly, other possible links corresponding to possible connections to doorway 190-3 and the doorway of bedroom 1 have been removed, while other possible connections for other wall openings remain.

Figure 2R:
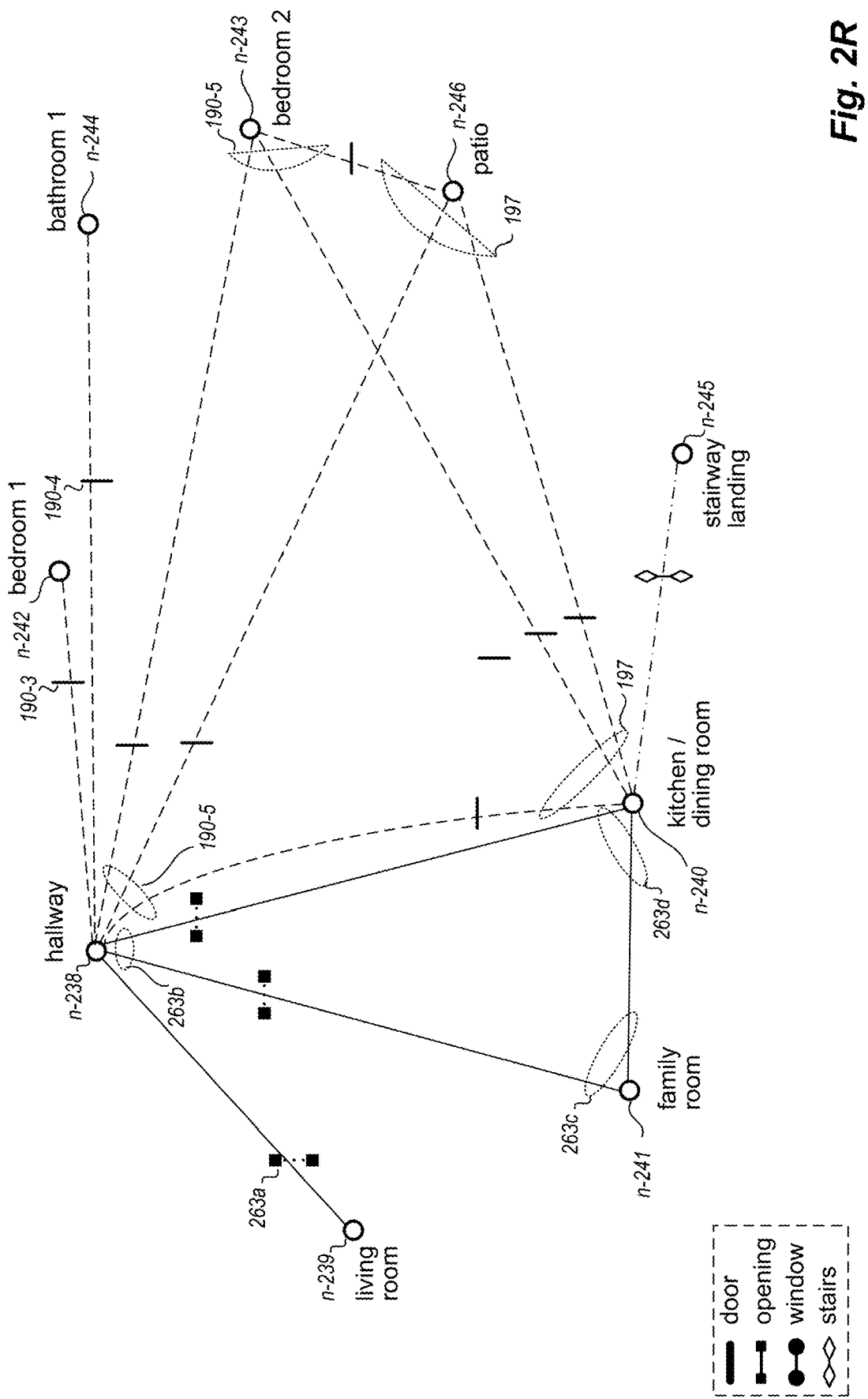
Figure 2S:
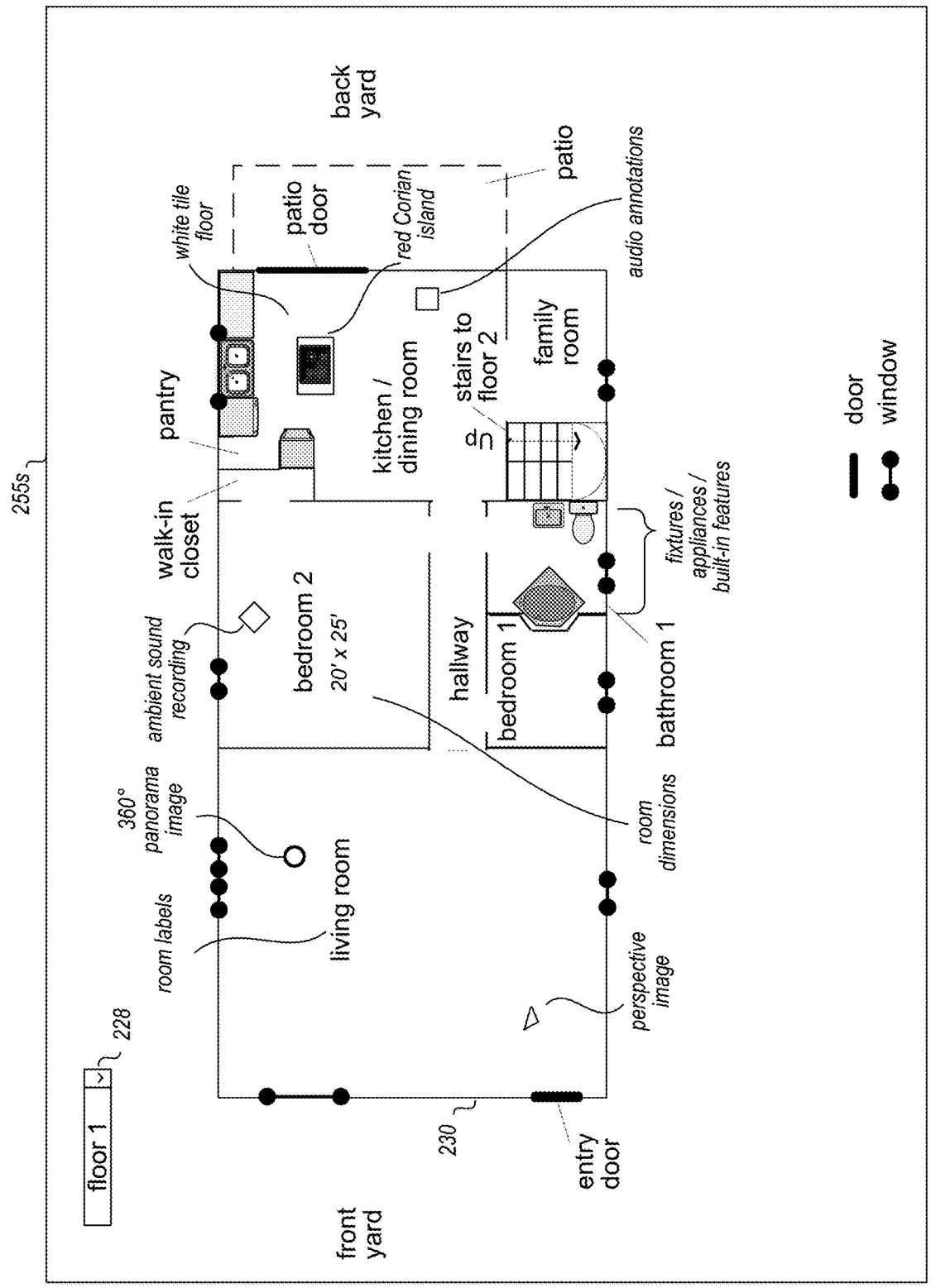

FIG. 2R continues the examples of FIGS. 2A-2Q, and illustrates a further modified version of the room connection graph 240*r* in which additional links have been removed from the graph 240*q*, corresponding to a further inter-room connection being established between the hallway and bathroom 1 via doorway 190-4 of the hallway. Accordingly, other possible links corresponding to possible connections to doorway 190-4 and the doorway of bathroom 1 have been removed, while other possible connections for other wall openings remain. It will be appreciated that the room connection graph may be further iteratively modified in this manner until a final floor plan for the house has been completed, with the resulting room connection graph appearing the same or similar to the final adjacency graph in at least some embodiments.

While not illustrated in FIG. 2R, the room connection graphs may be further used in additional manners in additional embodiments to determine information of interest regarding the house, whether before, while or after a floor plan for the house is completed. For example, room connection graphs such as those illustrated in FIGS. 2O-2R may be searched in various manners to identify actual or possible room connections between rooms, as discussed in greater detail elsewhere herein. As one nonexclusive example, instead of suggesting a single next room to add next, a graph search algorithm (e.g., A*) may be used to search for the next N possible connections, where N can range from 1 to the total number of room shapes in a house (if the total number of room shapes in a house, one or more candidates for a full building floor plan may be generated). Other searching algorithms such as genetic algorithms (GAs) or other evolutionary algorithms may similarly be used to evolve toward optimized versions of a partial or full floor plan.

After all of the room shape interconnection and other layout information has been specified for the house, whether automatically by the MIGM system and/or by using information supplied by one or more MIGM system operator users, the final results may be used to generate a 2D floor plan of the house, optionally after final optimizations have been performed and visual aspects of the final floor plan have been added—such final optimizations may include, for example, one or more of ensuring consistent visual aspects (e.g., line widths, colors, text styles, etc.), placing textual room labels at preferred locations on the final floor plan, adding missing spaces such as small closets or other additional areas not included on the defined room shape layouts (e.g., areas that did not have any images taken from within them, resulting in empty spaces within an exterior of the building that are not identified in the defined room shape layouts), merging multiple overlapping and/or adjacent walls, correcting any geometric anomalies, etc. In at least some embodiments, the described techniques may include performing at least some such updates in an automated manner, and optionally providing corresponding GUI tools for one or more users to make final manual adjustments (e.g., GUI tools similar to those of a drawing or painting program) to a floor plan for the house that is generated.

FIG. 2S illustrates one example 230 of such a final 2D floor plan for the house 198, such as may be presented to an MIGM system operator user and/or end user in a GUI 255*s*, and with various types of information being added to the combination of interconnected room shapes—it will be appreciated that a 3D or 2.5D floor plan showing wall height information may be similarly generated in some embodiments, whether in addition to or instead of such a 2D floor plan. In this example, room labels have been added to some or all rooms (e.g., "living room" for the living room), room dimensions have been added for some or all rooms, visual indications of fixtures or appliances or other built-in features have been added for some or all rooms, visual indications of positions of additional types of associated and linked information have been added (e.g., of panorama images and/or perspective images that an end user may select for further display, of audio annotations and/or sound recordings that an end user may select for further presentation, etc.), visual indications of doors and windows may be shown, etc.—in addition, in at least some embodiments and situations, some or all such types of information may be provided by one or more MIGM system operator users (e.g., to receive textual room labels from those users), such as during activities described with respect to FIGS. 2A-2R or instead at other times. In addition, in this example a user-selectable control 228 is added to the GUI to indicate a current floor that is displayed for the floor plan, and to allow the user to select a different floor to be displayed—in some embodiments, a change in floors or other levels may also be made directly from the floor plan (such as via selection of a connecting passage, such as the stairs to floor 2 in the illustrated floor plan), and in some embodiments information for multiple floors (e.g., all floors) will be displayed simultaneously (whether as separate sub-floor plans for separate floors, or instead by integrating the room connection information for all rooms and floors into a single floor plan that is shown together at once). It will be appreciated that a variety of other types of information may be added in some embodiments, that some of the illustrated types of information may not be provided in some embodiments, and that visual indications of and user selections of linked and associated information may be displayed and selected in other manners in other embodiments.

Various details have been provided with respect to FIGS. 2A-2S, but it will be appreciated that the provided details are non-exclusive examples included for illustrative purposes, and other embodiments may be performed in other manners without some or all such details.

In addition, a variety of additional automated functionalities (and in at least some embodiments, associated GUI functionality for use by one or more MIGM system operator users) may be provided by and/or used via the MIGM system in at least some embodiments. As one example, in some embodiments functionality may be provided to combine multiple panorama images that are taken in a single room into a single panorama image, such as by localizing information for one of the panorama images into the space of the other panorama image—for example, both panorama images may be displayed to a user who selects one or more common points in both images (e.g., a common plane with infinite points in both images), with the MIGM system determining the corresponding locations of the visual information of the two panorama images based on the indicated common point(s). After such a combination panorama image is created, it may be further used in a similar manner to that of other panorama images, as discussed in greater detail elsewhere herein. In addition, in some embodiments one or more additional supplemental panorama images are used in combination with a single primary panorama image for each room, such as to generate a supplemental panorama image at the location of each of one or more inter-room connections in order to assist in determining the connection between those rooms (e.g., alignment and other layout of the room shapes of the rooms), such as by using information in the supplemental panorama image to match to corresponding features in the panorama images for each of the connecting rooms. Moreover, in some embodiments additional functionality may be provided via the MIGM system to perform a global optimization of a generated floor plan, such as to identify final alignments of walls and other room shape information.

In addition, in some embodiments additional functionality may be provided via the MIGM system to refine transformations of room shapes, such as by providing an optimization that uses alignment of line segments and a top-down view or by using direct image overlaps (e.g., via rendering). Moreover, in some embodiments additional functionality may be provided via the MIGM system to perform or assist with a selection of a first room shape to begin generation of a floor plan, such as based on an automated analysis of information about that room (e.g., relative to that of other rooms of the building), and/or based on information supplied by an MIGM system operator user (e.g., after information about some or all room shapes is displayed or otherwise provided to the user)—as one example, a room may be selected to be used as a starting room based on one or more factors, such as having the most inter-room wall openings, the least inter-room wall openings, a wall opening corresponding to an exterior door (e.g., the entry to the building), the order of panorama image capture (e.g., to use the room corresponding to the first panorama image capture or the last panorama image captured), etc.

Furthermore, in some embodiments additional functionality may be provided via the MIGM system to align or otherwise connect multiple floors or other levels of the building, such as via connecting stairway's or other connecting passages. Such additional functionality may include, for example, aligning the multiple floors of a house into a single coordinate system so that they can all be rendered as a 3D model (e.g., in a rendering system), and/or aligning the multiple floors of a house in 2D so that they can be overlaid in a top-down orthographic projection (e.g., in a CAD system or in architectural blueprints). As one non-exclusive example, one way to implement connections between rooms on two separate floors is to use panorama images that show the stairway connecting the two floors, such as a panorama image at one or both of the bottom and top of the stairs (e.g., for a straight stairway that directly connects the floors, without any stair landing), and to interconnect the wall openings of the rooms at the top and bottom of the stairs in a manner similar to other wall opening connections (such as by including a horizontal distance between the two wall openings corresponding to a measured or estimated length of the stairs, and optionally including vertical information between the two wall openings if available), and with the sub-floor plans for two such floors being rotated in a consistent manner and at corresponding positions in 3D space. Estimates of the height difference and horizontal distance between two such wall openings at the ends of a stairway may be determined, for example, if a height of a stairway step is known (e.g., the height of a riser and the tread above it) and/or if a panorama image is available in which both the stairway foot and head ends are visible (e.g., from the top or bottom of a straight stairway; from each stairway landing of a non-straight stairway, such as by treating each such landing as an 'intermediate' floor that is connected with the other floors in a manner analogous to that of connecting two floors for a straight stairway; etc.) that enables determination of horizon line(s) in the panorama image corresponding to the stairway foot and/or head. In some embodiments and situations, a height and/or depth of a step could be measured during panorama image capture, whether manually or automatically using an object of known size on one of the steps. In addition, the quantity of steps may be automatically determined using image processing in some embodiments, with that information combined with step depth information to determine a horizontal length of the stairway (optionally accounting for the nosing/overhang of the stair tread over the riser) and/or with step height information to determine a vertical height of the stairway. In this manner, such embodiments may perform the connection of rooms on two floors using relatively sparse geometric features with clear semantic meanings (e.g., the lines in one or more panorama images representing the foot and head of a stairway) in a minimal number of captured panorama images, rather than using dense data with numerous panorama images (e.g., to provide dense visual connection information) and/or other dense measurements taken along a stairway.

In addition, in at least some embodiments additional information may be used as part of generating a floor plan for a building that is obtained outside of the building, such as one or more panorama images acquired outside of the building (e.g., in which some or all of the building is visible), one or more panorama images acquired of outbuildings or other structures on the same property, satellite and/or drone images from overhead, images from a street adjacent to the building, information from property records or other sources about dimensions of the exterior of the building, etc. As one example, one or more exterior panorama images may be used to identify a shape of an exterior wall of the building, the quantity and/or locations of one or more windows in the exterior wall, identification of one or more floors of the building that are visible from that exterior, etc., such as from an automated analysis of the panorama images and/or based on manual annotations of the panorama images by one or more MIGM system operator users, and with such information subsequently used to eliminate/select and/or to rank possible room connections according to how they fit with the information acquired from the exterior panorama image(s). As another example, one or more exterior panorama images may be treated as being part of one or more exterior rooms that surround or are otherwise associated with the building, with the exterior rooms being modeled (e.g., with room shapes) and connected to and used with other interior rooms of the building in a floor plan and/or in other manners. It will be appreciated that a variety of other types of functionality may similarly be provided in at least some embodiments.

Figure 3:
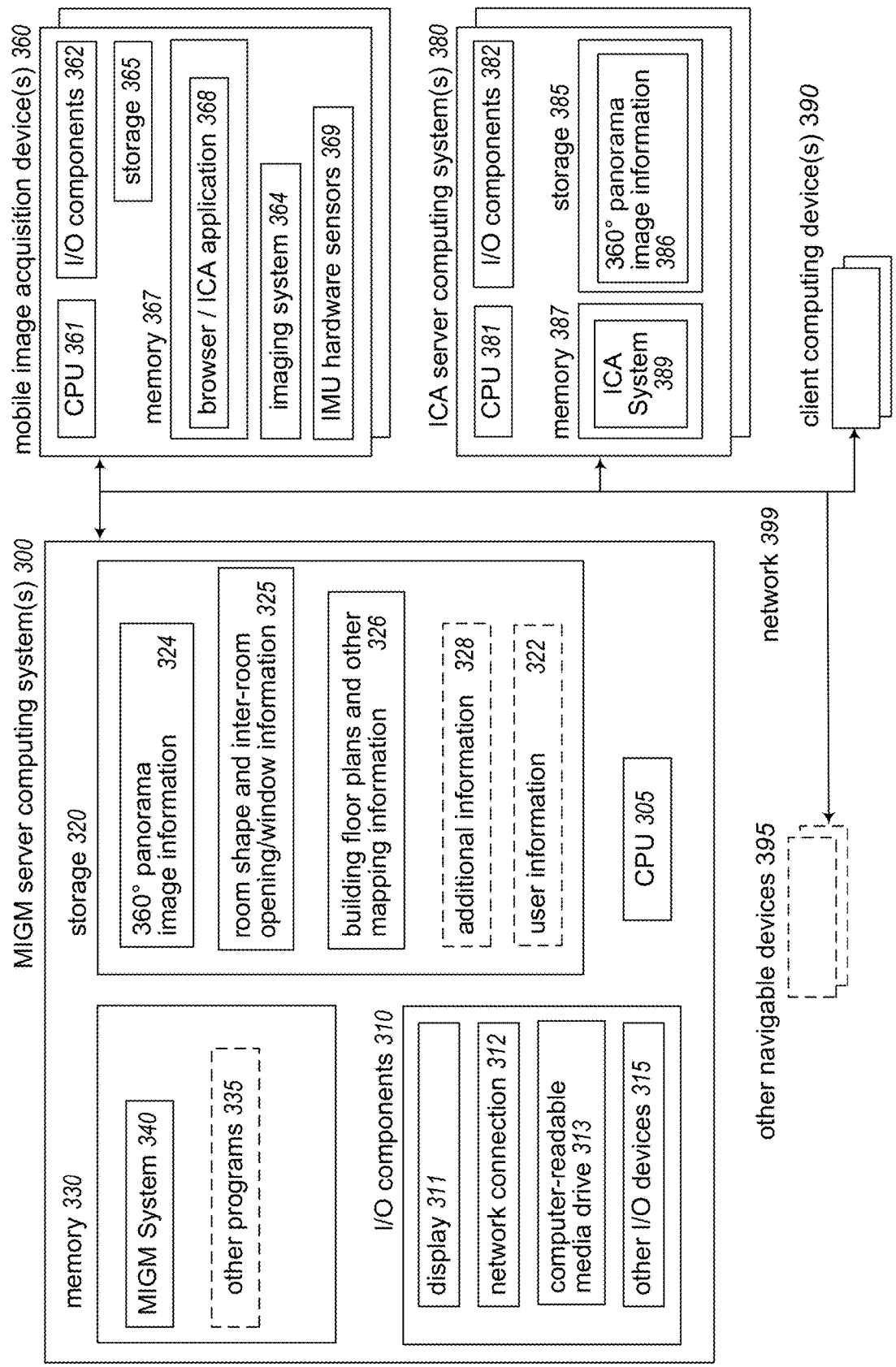
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of an MIGM system 340, and one or more server computing systems 380 executing an implementation of an ICA system 389—the server computing system(s) and MIGM and/or ICA systems may be implemented using a plurality of hardware components that form electronic circuits suitable for and configured to, when in combined operation, perform at least some of the techniques described herein. In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 387, storage 385 and I/O components 382 are illustrated for the sake of brevity.

The server computing system(s) 300 and executing MIGM system 340, and server computing system(s) 380 and executing ICA system 389, may communicate with each other and with other computing systems and devices in this illustrated embodiment via one or more networks 399 (e.g., the Internet, one or more cellular telephone networks, etc.), such as to interact with user client computing devices 390 (e.g., used by system operator users of the MIGM or ICA systems to interact with those respective systems; used by end users to view floor plans, and optionally associated images and/or other related information; etc.), and/or mobile image acquisition devices 360 (e.g., used to acquire panorama images and optionally other information for buildings or other environments to be modeled), and/or optionally other navigable devices 395 that receive and use floor plans and optionally other generated information for navigation purposes (e.g., for use by semi-autonomous or fully autonomous vehicles or other devices). In other embodiments, some of the described functionality may be combined in less computing systems, such as to combine the MIGM system 340 and the image acquisition functionality of device(s) 360 in a single system or device, to combine the ICA system 389 and the image acquisition functionality of device(s) 360 in a single system or device, to combine the MIGM system 340 and the ICA system 389 in a single system or device, to combine the MIGM system 340 and the ICA system 389 and the image acquisition functionality of device(s) 360 in a single system or device, etc.

In the illustrated embodiment, an embodiment of the MIGM system 340 executes in memory 330 of the server computing system(s) 300 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the MIGM system may include one or more components, not shown, to each perform portions of the functionality of the MIGM system, and the memory may further optionally execute one or more other programs 335—as one specific example, a copy of the ICA system may execute as one of the other programs 335 in at least some embodiments, such as instead of or in addition to the ICA system 389 on the server computing system(s) 380. The MIGM system 340 may further, during its operation, store and/or retrieve various types of data on storage 320 (e.g., in one or more databases or other data structures), such as one or more of the following: acquired 360° panorama image information 324, such as from ICA system 389 (e.g., for analysis to produce room layout information; for use to assist in generating floor plans; to provide to users of client computing devices 390 for display; etc.); generated or received information 325 about room layouts for rooms of one or more buildings (e.g., room shapes and locations of doors and windows and other wall openings in walls of the rooms); generated floor plans and other associated mapping information 326 for one or more buildings (e.g., generated and saved 2.5D and/or 3D models, building and room dimensions for use with associated floor plans, additional images and/or annotation information, etc.); optionally various types of user information 322; and/or various types of additional optional information 328 (e.g., various analytical information related to presentation or other use of one or more building interiors or other environments captured by an ICA system and/or modeled by the MIGM system).

In addition, an embodiment of the ICA system 389 executes in memory 387 of the server computing system(s) 380 in the illustrated embodiment in order to perform some of the described techniques, such as by using the processor(s) 381 to execute software instructions of the system 389 in a manner that configures the processor(s) 381 and computing system 380 to perform automated operations that implement those described techniques. The illustrated embodiment of the ICA system may include one or more components, not shown, to each perform portions of the functionality of the ICA system, and the memory may further optionally execute one or more other programs (not shown). The ICA system 389 may further, during its operation, store and/or retrieve various types of data on storage 385 (e.g., in one or more databases or other data structures), such as information 386 about acquired panorama images and optionally associated acquisition metadata, and optionally other types of information that are not shown in this example (e.g., about ICA system operator users, additional images and/or annotation information, dimension/size information for one or more images, etc.).

Some or all of the user client computing devices 390 (e.g., mobile devices), mobile image acquisition devices 360, optional other navigable devices 395 and other computing systems (not shown) may similarly include some or all of the same types of components illustrated for server computing system 300. As one non-limiting example, the mobile image acquisition devices 360 are each shown to include one or more hardware CPU(s) 361, I/O components 362, storage 365, and memory 367, with one or both of a browser and one or more client applications 368 (e.g., an application specific to the MIGM system and/or ICA system) executing within memory 367, such as to participate in communication with the MIGM system 340, ICA system 389 and/or other computing systems—the devices 360 each further include one or more imaging systems 364 and IMU hardware sensors 369 and optionally other components (e.g., a lighting system, a depth-sensing system, etc.), such as for use in acquisition of images and associated movement data of the device 360. While particular components are not illustrated for the other navigable devices 395 or other computing systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated MIGM system 340 and/or ICA system 389 may in some embodiments be distributed in various components, some of the described functionality of the MIGM system 340 and/or ICA system 389 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the MIGM system 340 executing on server computing systems 300, by the ICA software 389 executing on server computing systems 380 and/or on devices 360, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
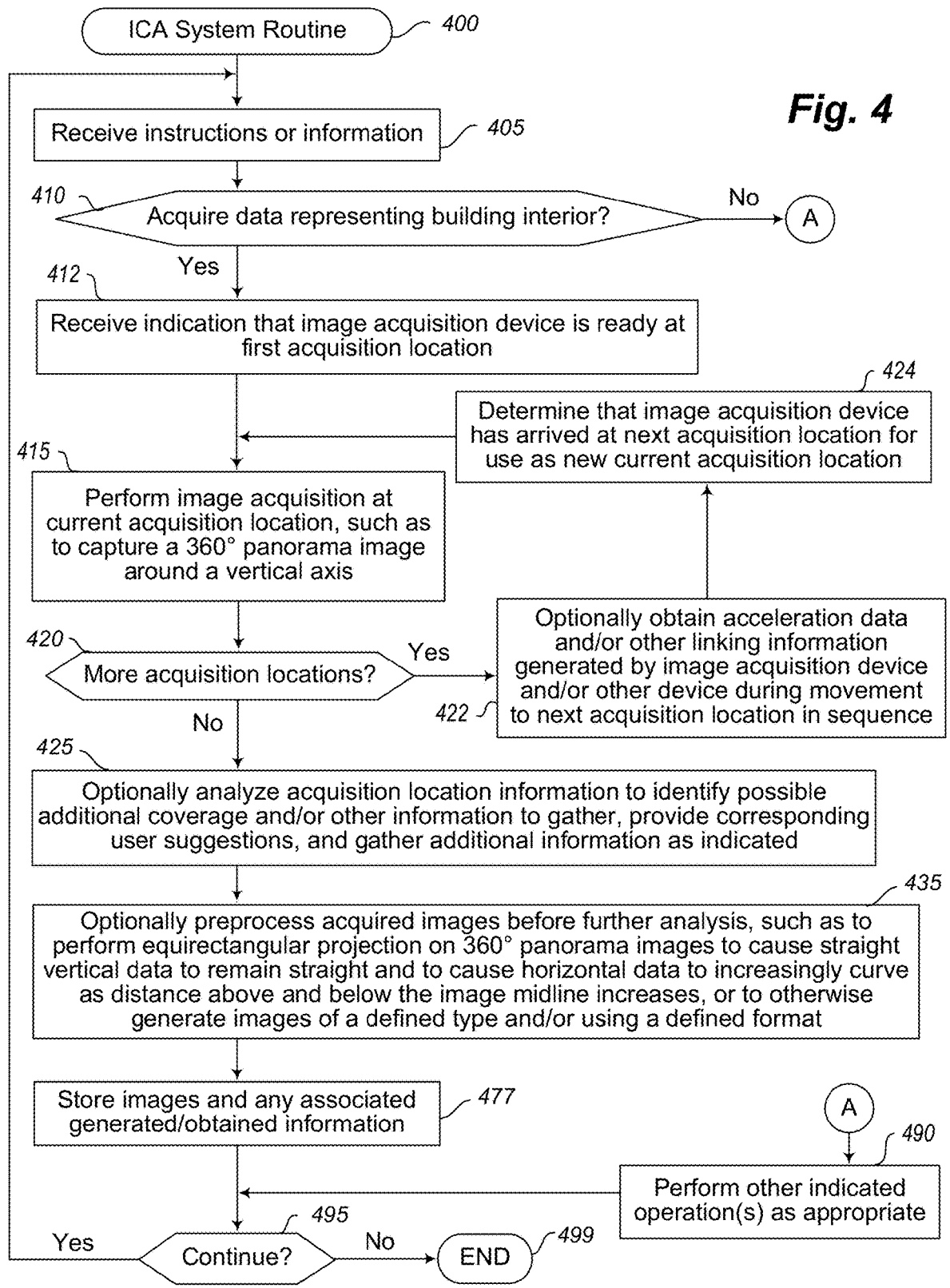
FIG. 4 illustrates an example embodiment of a flow diagram for an Image Capture and Analysis (ICA) system routine in accordance with an embodiment of the present disclosure.

FIG. 4 illustrates an example flow diagram of an embodiment of an ICA System routine 400. The routine may be performed by, for example, the ICA System 160 of FIG. 1A, the ICA system 389 of FIG. 3, and/or as otherwise described herein, such as to acquire 360° panorama images and/or other images at acquisition locations within buildings or other structures, such as for use in subsequent generation of related floor plans and/or other mapping information. While portions of the example routine 400 are discussed with respect to acquiring particular types of images at particular acquisition locations, it will be appreciated that this or a similar routine may be used to acquire video or other data (e.g., audio), whether instead of or in addition to such images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication to begin the image acquisition process at a first acquisition location (e.g., from a user of a mobile image acquisition device that will perform the acquisition process). After block 412, the routine proceeds to block 415 in order to perform acquisition location image acquisition activities for acquiring a 360° panorama image for the acquisition location in the interior of the target building of interest, such as via one or more fisheye lenses and/or non-fisheye rectilinear lenses on the mobile device, and such as to provide horizontal coverage of at least 360° around a vertical axis. As one non-exclusive example, the mobile image acquisition device may be a rotating (scanning) panorama camera equipped with a fisheye lens (e.g., with 180° degrees of horizontal coverage) and/or other lens (e.g., with less than 180° degrees of horizontal coverage, such as a regular lens or wide-angle lens or ultrawide lens). The routine may also optionally obtain annotation and/or other information from the user regarding the acquisition location and/or the surrounding environment, such as for later use in presentation of information regarding that acquisition location and/or surrounding environment.

After block 415 is completed, the routine continues to block 420 to determine if there are more acquisition locations at which to acquire images, such as based on corresponding information provided by the user of the mobile device. If so, and when the user is ready to continue the process, the routine continues to block 422 to optionally initiate the capture of linking information (e.g., acceleration data) during movement of the mobile device along a travel path away from the current acquisition location and towards a next acquisition location within the building interior. The captured linking information may include additional sensor data (e.g., from one or more IMU, or inertial measurement units, on the mobile device or otherwise carried by the user) and/or additional visual information (e.g., images, video, etc.) recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues to the user regarding the motion of the mobile device, quality of the sensor data and/or visual information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 424, the routine determines that the mobile device has arrived at the next acquisition location (e.g., based on an indication from the user, based on the forward movement of the user stopping for at least a predefined amount of time, etc.), for use as the new current acquisition location, and returns to block 415 in order to perform the acquisition location image acquisition activities for the new current acquisition location.

Figure 5A:
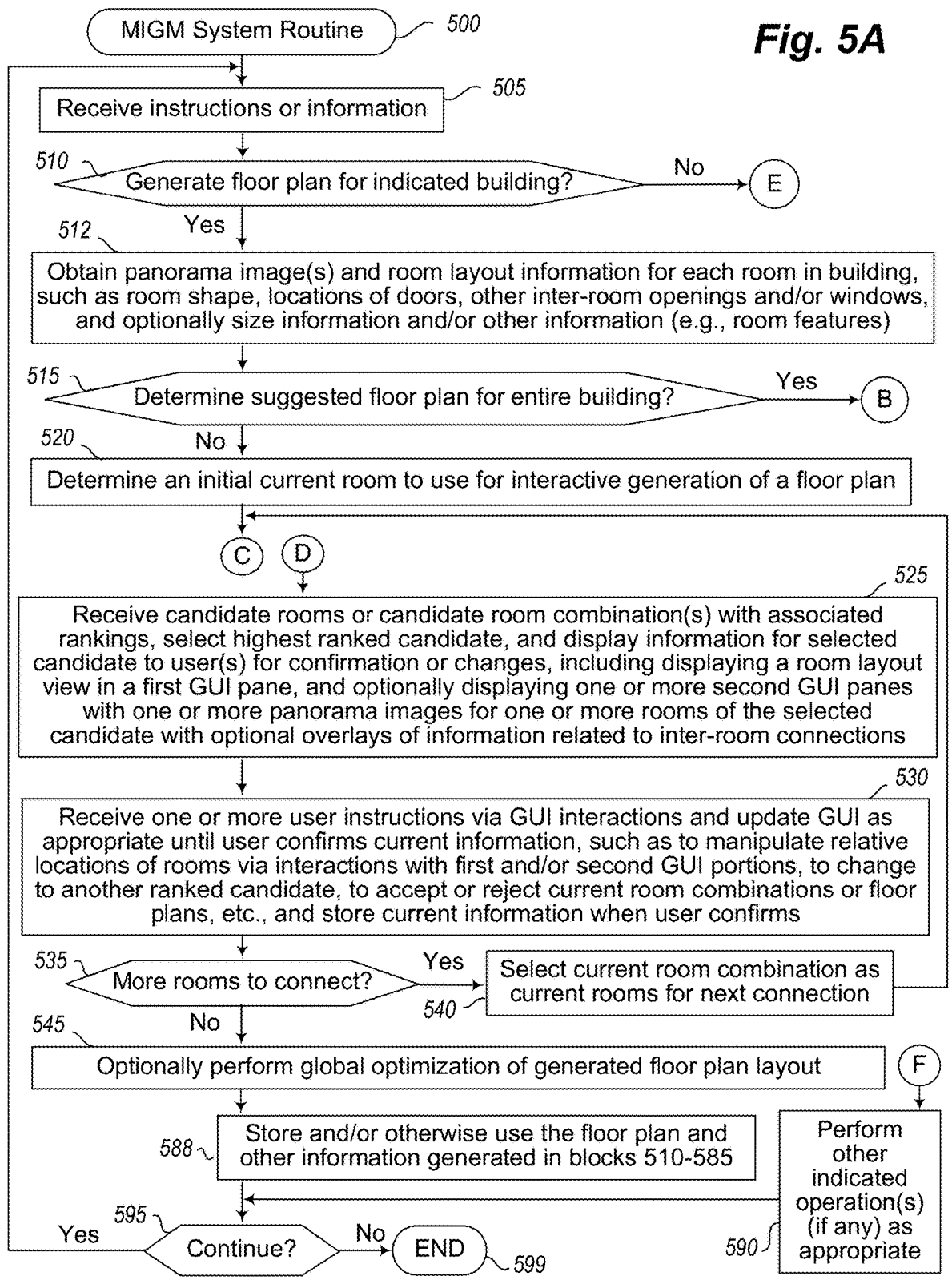
Figure 5B:
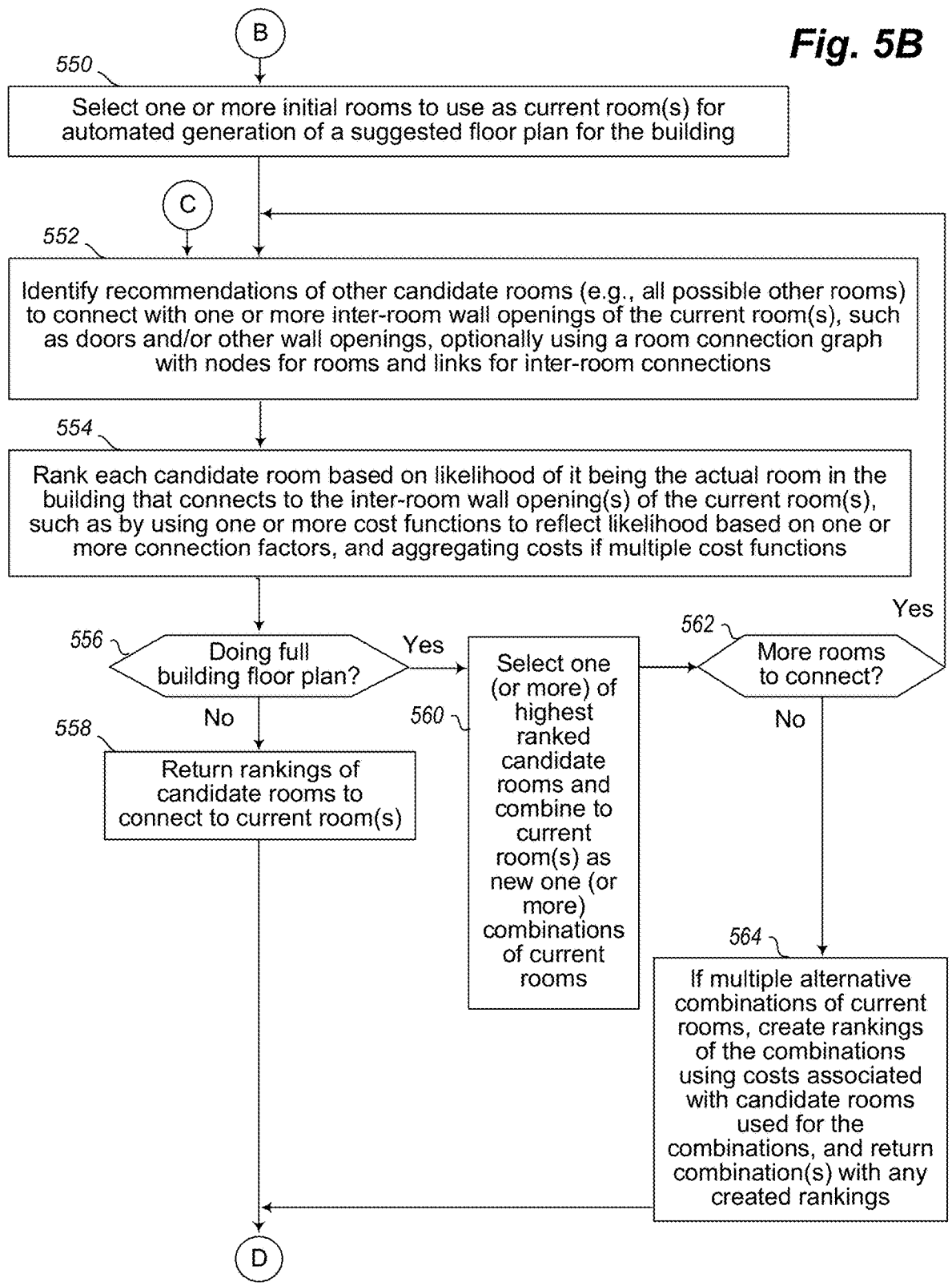

If it is instead determined in block 420 that there are not any more acquisition locations at which to acquire image information for the current building or other structure, the routine proceeds to block 425 to optionally analyze the acquisition location information for the building or other structure, such as to identify possible additional coverage (and/or other information) to acquire within the building interior. For example, the ICA system may provide one or more notifications to the user regarding the information acquired during capture of the multiple acquisition locations and optionally corresponding linking information, such as if it determines that one or more segments of the captured information are of insufficient or undesirable quality, or do not appear to provide complete coverage of the building. After block 425, the routine continues to block 435 to optionally preprocess the acquired 360° panorama images before their subsequent use for generating related mapping information, such as to produce images of a particular type and/or in a particular format (e.g., to perform an equirectangular projection for each such image, with straight vertical data such as the sides of a typical rectangular door frame or a typical border between 2 adjacent walls remaining straight, and with straight horizontal data such as the top of a typical rectangular door frame or a border between a wall and a floor remaining straight at a horizontal midline of the image but being increasingly curved in the equirectangular projection image in a convex manner relative to the horizontal midline as the distance increases in the image from the horizontal midline). In block 477, the images and any associated generated or obtained information is stored for later use. FIGS. 5A-5C illustrate one example of a routine for generating a floor plan representation of a building interior from the generated panorama information.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ICA system, etc.), to respond to requests for generated and stored information (e.g., to identify one or more groups of inter-connected linked panorama images each representing a building or part of a building that match one or more specified search criteria, one or more panorama images that match one or more specified search criteria, etc.), to generate and store inter-panorama image connections between panorama images for a building or other structure (e.g., for each panorama image, to determine directions within that panorama image toward one or more other acquisition locations of one or more other panorama images, such as to enable later display of an arrow or other visual representation with a panorama image for each such determined direction from the panorama image to enable an end-user to select one of the displayed visual representations to switch to a display of the other panorama image at the other acquisition location to which the selected visual representation corresponds), to obtain and store other information about users of the system, etc.

Following blocks 477 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

FIGS. 5A-5C illustrate an example embodiment of a flow diagram for a Mapping Information Generation Manager (MIGM) System routine 500. The routine may be performed by, for example, execution of the MIGM system 140 of FIG. 1A, the MIGM system 340 of FIG. 3, the MIGM system described with respect to FIGS. 2A-2S and/or an MIGM system as described elsewhere herein, such as to generate mapping information for a defined area based at least in part on images (e.g., 360° spherical panorama images) of the area and associated information about rooms or other areas in which the images are located. In the example of FIGS. 5A-5C, the generated mapping information includes a floor plan of a building (e.g., a house), but in other embodiments, other types of mapping information may be generated for other types of buildings and used in other manners, as discussed elsewhere herein.

The illustrated embodiment of the routine begins at block 505, where information or instructions are received. The routine continues to block 510 to determine whether the instructions received in block 505 indicate to generate a floor plan for an indicated building, optionally along with other related mapping information or other associated information about the building, and if so the routine continues to perform blocks 512-564 to do so, and otherwise continues to block 565.

In block 512, the routine first obtains panorama images captured in multiple rooms of the indicated building and obtains room layout information for some or all of those rooms, such as a room shape and locations of wall openings (e.g., doors, stairs and other wall openings) for each room, and optionally additional related information such as room sizes and/or information about other visible features of the room. The panorama images and/or room layout information may be obtained in some embodiments by receiving it in block 505 or retrieving the information from storage, while in other embodiments the routine may analyze some or all panorama images for the building in order to dynamically determine some or all of the room layout information, as discussed in greater detail elsewhere herein.

After block 512, the routine continues to block 515, where it determines whether the instructions or other information received in block 505 indicate to determine a suggested floor plan for the entire building in an automated manner for confirmation by the user, and if so proceeds to block 550, and otherwise continues to block 520. If the routine proceeds to block 520, the routine determines an initial room of the indicated building's multiple rooms to currently use in beginning an interactive process for generating a floor plan layout for the building, and if the routine instead proceeds to block 550, the routine instead determines one or more initial current rooms of the building for use in an automated process for generating a suggested floor plan for the building.

After blocks 520 or 550, the routine continues to block 552, where it identifies recommendations of other candidate rooms (e.g., all possible other rooms) to connect to one or more inter-room wall openings of the one or more current rooms, such as to inter-connect doors, stairs, or other inter-room wall openings in the current room(s) and in the other candidate rooms. In some embodiments and situations, the identification of other recommended candidate rooms includes using a room connection graph that has nodes for each room and links between nodes that correspond to potential and/or actual inter-room connections, such as by using the links for potential inter-room connections to identify some or all such other candidate rooms—in such embodiments, if such a room connection graph does not exist, the routine may further generate the room connection graph using room layout information obtained in block 512 before its initial use, as discussed in greater detail elsewhere herein. After block 552, the illustrated embodiment of the routine continues to block 554 to rank each candidate room based on the likelihood of it being the actual room in the building that connects to the one or more inter-room wall openings of the current room(s), although in some other embodiments such ranking may not be performed—in order to perform the ranking, one or more defined cost metrics may each be used to evaluate one or more aspects of each possible connection with an associated cost, as discussed in greater detail elsewhere herein, including to aggregate multiple costs if multiple cost metrics are used to reach an overall cost ranking for each possible connection.

After block 554, the routine continues to block 556, where it determines whether the routine is currently performing an automated generation of a full suggested building floor plan, and if so continues to block 560 to select one or more of the highest ranked candidate rooms and to combine the selected room(s) with the current room(s) via the corresponding inter-room wall openings of the current and selected rooms, for use as a new combination of current rooms—in some embodiments, multiple alternative combinations of current rooms will be generated by combining different candidate rooms to the current room(s), such as to provide alternative possible floor plans. After block 560, the routine continues to block 562 to determine whether there are more rooms to connect to the current combination(s) of rooms, and if so returns to block 552 to continue the process, with subsequent operations of blocks 552 and 554 being performed separately for each combination of current rooms if there are multiple alternative combinations. If it is instead determined in block 562 that there are not more rooms to connect, the routine continues instead to block 564, where if there are multiple alternative combinations of rooms for the building, those multiple combinations are each assessed (e.g., by combining the ranking scores previously generated in block 554 for each candidate room that was added to a particular combination to generate a corresponding overall assessment score for each combination, and/or by newly using one or more cost metrics for an entire combination of connected rooms to generate a new overall assessment score), and otherwise the single combination of current rooms is selected and its corresponding assessment score optionally determined, with the combination(s) and any associated created assessment scores returned for further use as rankings of the one or more combinations as suggested floor plans for the building. Alternatively, if it is instead determined in block 556 that an automated process to complete a full suggested floor plan for the building is not being performed, the routine continues instead to block 558, where it returns indications of the current candidate rooms and their associated rankings for use as suggestions to connect to the current room(s).

After blocks 558 or 564, the routine continues to block 525, where it receives the rankings of one or more candidate rooms to add to the current room determined in block 520 (if the interactive floor plan generation process is being used) or it receives the rankings of one or more candidate room combinations that are suggested floor plans of the building (if the automated full floor plan generation process is being used), selects one or more of the highest ranked candidates, and displays information for the selected candidate(s) to the user in a GUI for confirmation or changes. In at least some embodiments and situations, the displaying of information includes displaying multiple GUI panes that have different but related information, such as to display a room layout view of a first GUI pane that shows a partial or full floor plan with interconnected room shapes for two or more rooms, and to optionally display one or more additional GUI panes that each include one or more panorama images for at least one of the rooms shown in the floor plan pane and that optionally have additional information overlaid on the displayed panorama image(s), as discussed in greater detail elsewhere herein. After block 525, the routine continues to block 530, where it receives one or more user instructions via interactions of the user with the GUI, and updates the GUI as appropriate based on those interactions, until the user confirms to use the current information in the GUI for proceeding (to use a current partial combination of rooms for further floor plan generation if the interactive floor plan generation process is being used, or to use a current full combination of rooms as the floor plan for the building if the automated full floor plan generation process is being used). In block 535, the routine then determines if there are more rooms to connect, such as if the interactive floor plan generation process is being used and all rooms have not been added to the current combination of rooms—if so, the routine continues to block 540 to select the current room combination as the current rooms to use, and then returns to block 552 to determine additional candidate rooms to connect to those current rooms. If it is instead determined in block 535 that there are not more rooms to connect, such as if the interactive floor plan generation process is being used and all rooms have been added to the current combination of rooms, or if the automated full floor plan generation process is used and a suggested floor plan has been confirmed by the user after any modifications, the routine continues to block 545.

In block 545, the routine optionally performs a global optimization of the generated floor plan layout for the indicated building, and then continues to block 588, where it stores or otherwise uses the floor plan generated for the indicated building and any other information generated in blocks 510-585, such as to provide the generated information for display on one or more client devices, provide that generated information to one or more other devices for use in automating navigation of those devices and/or associated vehicles or other entities, etc. The generated floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building—it will be appreciated that if sufficiently detailed dimension information is obtained, a floor plan may be generated from the floor plan that includes dimension information for the rooms and the overall building. It will also be appreciated that while various operations are discussed herein for generating mapping information for a building, such operations made be performed in other orders in other embodiments, and that some such operations may not be performed in some embodiments.

While not illustrated in routine 500, one or more MIGM system users may perform various types of modifications to produce the final floor plan to be used, such as to produce a consistent style (e.g., line widths, colors, text styles, etc.), to add textual room labels if not previously specified and/or to place the textual room labels at preferred locations on the final floor plan, to add missing spaces such as small closets, to correct any geometric anomalies, to modify locations of images and/or other associated and linked information, etc. In addition, while not illustrated in routine 500, in other embodiments the routine may generate other types of mapping information for the building, whether instead of or in addition to a 2D schematic floor plan as discussed for this example embodiment of routine 500—non-exclusive examples of other mapping information include a 2.5D texture map in which 360° panorama images can optionally be re-projected on the geometry of the displayed texture map, a 3D structure that illustrates accurate height information as well as width and length (and in which 360° panorama images can optionally be re-projected on the geometry of the displayed 3D structure), etc. In addition, in some embodiments additional information may be generated and used, such as to determine a geographical alignment (e.g., with respect to true north or magnetic north) and/or geographical location (e.g., with respect to latitude and longitude, or GPS coordinates) for the building and corresponding parts of the generated floor plan, and to optionally further align with other external information (e.g., satellite or other external images, including street-level images to provide a 'street view' of the building; neighborhood information, such as nearby street maps and/or points of interest; etc.). Other information about the building may also be retrieved from, for example, one or more external sources (e.g., online databases, 'crowd-sourced' information provided by one or more end users, etc.), and associated with and linked to the floor plan and/or particular locations within the floor plan—such additional information may further include, for example, exterior dimensions and/or shape of the building, additional images and/or annotation information acquired corresponding to particular locations within the building (optionally for locations different from acquisition locations of the acquired panorama or other images), etc.

If it was determined in block 510 to not generate a floor plan for an indicated building, the routine continues instead to block 565 to determine whether the instructions or other information received in block 505 are to combine multiple panorama images for a room into a single overall panorama image for that room, such as by localizing one of the panorama images within the other. If so, the routine continues to block 567, where it receives two panorama images taken in the same room, and displays them to the user in the GUI. In block 569, the routine then receives one or more user manipulations via the GUI to indicate at least one common point in the two images (e.g., optionally a common plane having infinite points in each of the two images), and in block 573 uses the common point information to combine information from the two images into one overall panorama image, and stores the combined information as a panorama image to later use for the room.

After block 573, or if it was instead determined in block 565 that the instructions or other information received in block 505 are not to combine multiple panorama images for a room, the routine continues to block 575, where it determines whether the instructions or other information received in block 505 are to combine information for multiple rooms together into a single overall room (e.g., if the two or more separate rooms are partial rooms that are not fully separated from each other by complete walls). If so, the routine continues to block 576, where indications of the two or more rooms to combine are received, and information about the two or more rooms is displayed to the user in the GUI (e.g., by displaying their room shapes, associated panorama images, etc.). In block 578, the routine then receives one or more user manipulations via the GUI to indicate how to combine the layout information for the multiple rooms into a new single room, and stores the combination information to later use with the new single room.

After block 578, or if it was instead determined in block 575 that the instructions or other information received in block 505 are not to combine multiple rooms into one, the routine continues to block 580, where it determines whether the instructions or other information received in block 505 are to obtain and store user-specified information related to a building. If so, the routine continues to block 585, where it receives user-specified information about one or more rooms (e.g., dimensions, annotations, etc.), and stores the information for later use.

After block 585, or if it was instead determined in block 580 that the instructions or other information received in block 505 are not to obtain user-specified information, or in block 510 that the information or instructions received in block 505 are not to generate a floor plan for an indicated building, the routine continues instead to block 590 to perform one or more other indicated operations as appropriate. Such other operations may include, for example, receiving and storing panorama images for a building for later use, receiving or generating room layout information for rooms of a building (e.g., based on images and/or depth information acquired in the rooms) and storing it for later use, automatically combining information for two or more panorama images taken in a room to determine room layout information (e.g., based on one or more common points identified in each of the images), receiving and responding to requests for previously generated floor plans and/or other generated information (e.g., requests for such information for display on one or more client devices and/or to provide to one or more other devices for use in automated navigation), obtaining and storing information about buildings for use in later floor plan generation operations (e.g., information about exterior images, dimensions, numbers or types of rooms, total square footage, etc.), etc.

After blocks 588 or 590, the routine continues to block 595 to determine whether to continue, such as until an explicit indication to terminate is received, or instead only if an explicit indication to continue is received. If it is determined to continue, the routine returns to block 505 to wait for and receive additional instructions or information, and otherwise continues to block 599 and ends.

Figure 6:
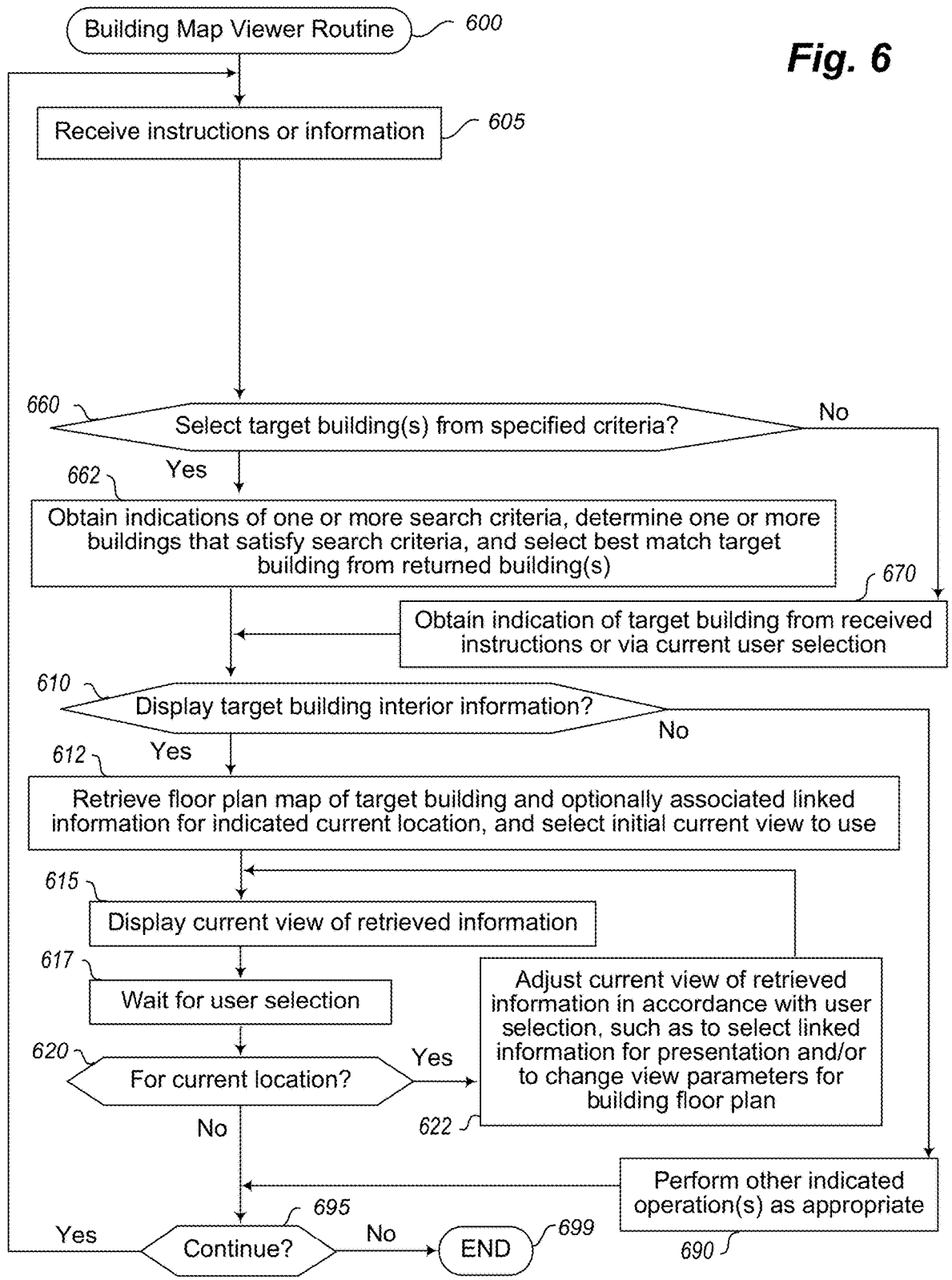
FIG. 6 illustrates an example embodiment of a flow diagram for a Building Map Viewer system routine in accordance with an embodiment of the present disclosure.

FIG. 6 illustrates an example embodiment of a flow diagram for a Building Map Viewer system routine 600. The routine may be performed by, for example, execution of a map viewer client computing device 175 and its software system(s) (not shown) of FIG. 1A, a client computing device 390 of FIG. 3, and/or a mapping information viewer or presentation system as described elsewhere herein, such as to receive and display mapping information (e.g., a floor plan and/or building model, whether 2D, 3D, 2.5D or other format) for a defined area, including to display images (e.g., 360° panorama images) and/or other information associated with particular locations to which the mapping information corresponds. In the example of FIG. 6, the presented mapping information is based on a floor plan of a building (such as a house) that may optionally have additional associated linked information (e.g., images taken within the building, sounds recorded within the building, annotations or other descriptive information associated with particular locations within the building, etc.), but in other embodiments, other types of mapping information may be presented for other types of buildings or environments and used in other manners, as discussed elsewhere herein.

The illustrated embodiment of the routine begins at block 605, where instructions or information are received. After block 605, the routine continues to block 660 to determine whether the instructions or other information received in block 605 are to select one or more target buildings using specified criteria, and if not continues to block 670, where it obtains an indication of a target building to use from the user (e.g., based on a current user selection, such as from a displayed list or other user selection mechanism; based on information received in block 605; etc.). Otherwise, if it is determined in block 660 to select one or more target buildings from specified criteria, the routine continues instead to block 662, where it obtains indications of one or more search criteria to use, such as from current user selections or as indicated in the information or instructions received in block 605, and then searches stored information about buildings to determine one or more of the buildings that satisfy the search criteria. In the illustrated embodiment, the routine then further selects a best match target building from the one or more returned buildings (e.g., the returned other building with the highest similarity or other matching rating for the specified criteria, or using another selection technique indicated in the instructions or other information received in block 605).

After blocks 662 or 670, the routine continues to block 610 to determine whether the instructions or other information received in block 605 are to display information or otherwise present information about a target building (e.g., via a floor plan that includes information about the interior of the target building), such as the target building from blocks 662 or 670, and if not continues to block 690. Otherwise, the routine proceeds to block 612 to retrieve a floor plan map for the building, optionally with associated linked information for the floor plan and/or a surrounding location, and selects an initial view of the retrieved information (e.g., a view of the floor plan). In block 615, the routine then displays or otherwise presents the current view of the retrieved information, and waits in block 617 for a user selection. After a user selection in block 617, if it is determined in block 620 that the user selection corresponds to the current building or other current location (e.g., to change the current view), the routine continues to block 622 to update the current view in accordance with the user selection, and then returns to block 615 to update the displayed or otherwise presented information accordingly.

The user selection and corresponding updating of the current view may include, for example, changing how the current view is displayed (e.g., zooming in or out, rotating information if appropriate, selecting a new portion of the current view to be displayed or otherwise presented that was not previously visible, etc.), displaying or otherwise presenting a piece of associated linked information that the user selects (e.g., a particular other image), etc.

If it is instead determined in block 610 that the instructions or other information recited in block 605 are not to present information representing a building interior, the routine continues instead to block 690 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the MIGM system, etc.), to obtain and store other information about users of the system, to respond to requests for generated and stored information, etc.

Following block 690, or if it is determined in block 620 that the user selection does not correspond to the current location, the routine proceeds to block 695 to determine whether to continue, such as until an explicit indication to terminate is received, or instead only if an explicit indication to continue is received. If it is determined to continue (e.g., if the user made a selection in block 617 related to a new building or other new location to present), the routine returns to block 605 to await additional instructions or information (or to continue on to block 612 if the user made a selection in block 617 related to a particular new building or other new location to present), and if not proceeds to step 699 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    capturing, by one or more computing devices, and for a house with multiple rooms, multiple panorama images that include at least one panorama image taken in each of the multiple rooms, wherein each of the panorama images includes 360 horizontal degrees of visual information around a vertical axis from an acquisition location in the house;
    determining, by the one or more computing devices, and without using any acquired depth data from a depth sensor about a depth from any acquisition locations to walls of any of the multiple rooms, room layouts of the multiple rooms by analyzing visual information in the multiple panorama images, wherein each room layout for a room indicates a room shape of walls of that room and includes one or more door locations in the walls of that room;
    generating, by the one or more computing devices, a floor plan for the house that interconnects the multiple rooms, including:
        determining, by the one or more computing devices, and for a first door location in a first room of the multiple rooms, a ranking of other rooms of the multiple rooms as candidate rooms for actually being connected in the house to the first door location, wherein the determining is based at least in part on analyzing a room connection graph representing possible connections between door locations of the multiple rooms to identify the candidate rooms and on using one or more defined metrics to determine the ranking for the candidate rooms;
        displaying, by the one or more computing devices and to a user via a displayed graphical user interface (GUI), a panorama image taken in the first room and information about the candidate room that has a highest ranking, including overlaying at least some of the room shape of that candidate room on the displayed panorama image in a location of that candidate room relative to the first room if that candidate room is inter-connected with the first room via the first door location;
        obtaining, by the one or more computing devices via the displayed GUI, user confirmation that a second door location of one of the candidate rooms is connected in the house to the first door location of the first room, and displaying a partial floor plan for the house with the first room and the one candidate room being interconnected via the first and second door locations;
        iteratively expanding, by the one or more computing devices, the partial floor plan to include all of the multiple rooms, by performing one or more further iterations each including:
            using the room connection graph to determine rankings of additional candidate rooms to connect with some or all rooms in a current version of the partial floor plan via one or more additional door locations;
            displaying information to the user via the displayed GUI about at least one of the additional candidate rooms, including displaying at least some of the room shape of the at least one additional candidate room overlaid on other displayed information for at least one room of the some or all rooms; and
            extending the current version of the partial floor plan by adding a further room confirmed by the user via the GUI to have one or more additional connections to one or more door locations in the some or all rooms, and updating the displayed partial floor plan to include the further room; and
        selecting, by the one or more computing devices, the iteratively expanded partial floor plan to use as the generated floor plan for the house; and
    using, by the one or more computing devices, the generated floor plan for navigation of the house.

2. The computer-implemented method of claim 1 wherein the using of the generated floor plan includes controlling navigation activities by an autonomous vehicle in moving between the multiple rooms of the house according to the generated floor plan.

3. The computer-implemented method of claim 1 wherein the using of the generated floor plan further includes displaying, by the one or more computing devices, the generated floor plan showing the multiple rooms and door locations of interconnections between the multiple rooms.

4. The computer-implemented method of claim 1 further comprising:
    generating, by the one or more computing devices before the generating of the floor plan, and by using information about door locations of the multiple rooms from the determined room layouts, the room connection graph with nodes representing each of the multiple rooms and with links between nodes representing possible connections from each door location of a room to door locations of other rooms;
    modifying, by the one or more computing devices, and in response to the user confirmation that the second door location of the one candidate room is connected in the house to the first door location of the first room, the room connection graph to remove all links for the first and second door locations other than a link representing a connection between the first and second door locations; and
    further modifying, by the one or more computing devices, and for each further room confirmed by the user during iterative expanding to have one or more additional connections to one or more door locations in the some or all rooms of the current version of the partial floor plan, the room connection graph to remove links for the one or more door locations other than for the one or more additional connections.

5. The computer-implemented method of claim 1 further comprising, before the obtaining of the user confirmation that the second door location of one of the candidate rooms is connected in the house to the first door location of the first room:
    receiving, by the one or more computing devices, and after the displaying of the panorama image taken in the first room and the information about the candidate room that has the highest ranking, user interactions with the displayed GUI, that cause information about one or more other candidate rooms to be overlaid on the displayed panorama image taken in the first room in place of the information about the candidate room that has the highest ranking, that select one of the other candidate rooms with the second door location as the one candidate room that is connected in the house to the first door location of the first room, and that manipulate displayed information about the first room and the one candidate room to adjust their relative locations; and updating, by the one or more computing devices, information in the displayed GUI to reflect each of the user interactions.

6. A computer-implemented method comprising:

obtaining, by a computing device, information for a building that includes, for each of multiple rooms of the building, a panorama image taken in the room and a room layout of the room that indicates a room shape of the room and one or more locations on the room shape of one or more inter-room openings in walls of the room to one or more other areas, wherein the room layout of the room is determined without using any acquired depth data from a depth sensor about a depth to walls of the room from an acquisition location of the panorama image taken in the room;

generating, by the computing device, a floor plan for the building that interconnects the multiple rooms, including:

determining, by the computing device, and for a first room of the multiple rooms that has a first inter-room opening in the building connected to an other room in the building, at least some rooms of the multiple rooms to be candidate rooms that each could be that other room based at least in part on the room layouts for the candidate rooms, and ranking, using one or more defined metrics, the candidate rooms with respect to a likelihood of being that other room;

presenting, by the computing device and to a user via a displayed graphical user interface (GUI), the panorama image for the first room and information about one or more of the candidate rooms that are selected at least in part based on the ranking, the presented information including at least some of the room shape for each of the one or more candidate rooms;

obtaining, by the computing device via the displayed GUI, user confirmation that a second room from the candidate rooms is the other room connected in the building to the first room via the first inter-room opening, and displaying a partial floor plan with the first room and the second room interconnected via the first inter-room opening; and iteratively expanding, by the computing device, the partial floor plan to include all of the multiple rooms, by further performing one or more iterations that each includes determining additional candidate rooms to connect via one or more additional inter-room openings with some or all rooms in a current version of the partial floor plan, and includes presenting information to the user via the displayed GUI about at least one of the additional candidate rooms, and includes creating a new current version of the partial floor plan by adding a further room confirmed by the user via the GUI to connect with the some or all rooms via the one or more additional inter-room openings; and presenting, by the computing device, the generated floor plan, to cause use of the presented floor plan for navigating the building.

7. The computer-implemented method of claim 6 further comprising generating, by the one or more computing devices and before the determining of the at least some rooms to be candidate rooms, a room connection graph that uses information from the room layouts of the multiple rooms and that represents possible connections between inter-room openings in walls of the multiple rooms, and wherein the determining of the at least some rooms to be candidate rooms includes performing a graph search of the room connection graph to identify the at least some rooms based at least in part on the possible connections.

8. The computer-implemented method of claim 7 wherein the generating of the room connection graph includes adding nodes to the room connection graph representing each of the multiple rooms and adding links to the room connection graph between nodes that represent possible connections from each inter-room opening of each room to other inter-room openings of other rooms, wherein the user confirmation indicates a connection of the first inter-room opening of the first room to a second inter-room opening of the second room, wherein each further room confirmed by the user during the one or more iterations is connected to the some or all rooms in the current version of the partial floor plan via at least one additional connection between two inter-room openings, and wherein the method further comprises:

modifying, by the one or more computing devices, and in response to the user confirmation that the connection of the first inter-room opening of the first room is to the second inter-room opening of the second room, the room connection graph to remove all links representing possible connections for the first and second inter-room openings other than a link representing the connection between the first and second inter-room openings; and further modifying, by the one or more computing devices, and for each further room confirmed by the user during the one or more iterations to connect with the some or all rooms in the current version of the partial floor plan via the at least one additional connection between the two inter-room openings, the room connection graph to remove all links representing possible connections for those two inter-room openings other than for the at least one additional connection.

9. The computer-implemented method of claim 7 wherein the inter-room openings in the walls of the multiple rooms are of multiple types that include at least one door type and one or more non-door opening types, and wherein the possible connections in the room connection graph between the inter-room openings in the walls of the multiple rooms are each for two or more inter-room openings of a same one of the multiple types.

10. The computer-implemented method of claim 6 wherein the one or more defined metrics each score a potential connection between two inter-room openings of two rooms and are based on at least one of an order of acquiring the panorama images for the multiple rooms or of an alignment of walls of the two rooms if connected via the potential connection or of an overlap of features visible in the panorama images for the two rooms, and wherein the ranking of the candidate rooms includes generating a ranking score for each of the candidate rooms by using the one or more defined metrics to score a potential connection between an inter-room opening in the candidate room and the first inter-room opening in the first room.

11. The computer-implemented method of claim 10 wherein the one or more defined metrics include multiple defined metrics each providing separate measurement information for that metric, and wherein the generating of the ranking score for each of the candidate rooms includes generating an aggregate score for the candidate room from a combination of the measurement information for the multiple defined metrics.

12. The computer-implemented method of claim 10 wherein each determining of the additional candidate rooms for one of the one or more iterations includes ranking the additional candidate rooms using the one or more defined metrics, and wherein each presenting of the information to the user about the at least one additional candidate room for one of the one or more iterations includes selecting the at least one additional candidate room based on the ranking for that one iteration.

13. The computer-implemented method of claim 6 wherein the one or more defined metrics include multiple defined metrics that score a potential connection between two inter-room openings of two rooms and are based on tinning of acquiring the panorama images for the two rooms and on an alignment of walls of the two rooms if connected via the potential connection and on an overlap of features visible in the panorama images for the two rooms, and wherein the ranking of the candidate rooms includes generating a ranking score for each of the candidate rooms based on a combination of the multiple defined metrics.

14. The computer-implemented method of claim 13 wherein the multiple defined metrics that score a potential connection between two inter-room openings of two rooms are further based on one or more of how much the two rooms overlap if connected via the potential connection, or of an alignment of shape of the two rooms if connected via the potential connection, or of a match in size of the two inter-room openings, or of a match in type of the two inter-room openings, or of one or more types of the two rooms being likely to be connected and/or adjacent, or of a match between information about a combination of the two rooms and information about an exterior of the building that includes at least one of a building shape or openings in exterior walls of the building, or of a match in location of an object in a panorama image for one of the two rooms if reprojected on a panorama image for an other of the two rooms in accordance with the potential connection, or of a match in a first angle between acquisition locations of panorama images in the two rooms that is determined from visual contents of the panorama image and a second angle between the acquisition locations of the panorama images in the two rooms that is determined if the two rooms are connected via the potential connection, or of a match between an overlapping area in visual contents of panorama images in the two rooms and of that overlapping area as generated using ray casting in accordance with the potential connection.

15. The computer-implemented method of claim 6 wherein the indicated room shape of each of the multiple rooms includes information about locations of inter-wall borders and of borders between walls and a floor and a ceiling, and wherein the presenting of the panorama image for the first room and the information about the one or more candidate rooms includes overlaying, on the presented panorama image, a display of at least some borders of at least one of the candidate rooms in locations determined according to a connection of at least one candidate room if connected to the first room via the first inter-room opening.

16. The computer-implemented method of claim 15 wherein the presenting of the panorama image for the first room and the information about the one or more candidate rooms includes simultaneously displaying multiple panes in the GUI with coordinated information, including a first pane that displays the presented panorama image for the first room, and a second pane that displays an initial partial floor plan with visual representations of the first room and of one of the one or more candidate rooms, and a third pane that displays the panorama image for the one candidate room, and wherein the method further comprises:
  receiving, by the computing device, one or more user interactions with information displayed in one of the multiple panes of the displayed GUI; and
  updating, by the computing device, information displayed in each of the multiple panes of the displayed GUI to reflect the user interactions.

17. The computer-implemented method of claim 16 wherein the one or more user interactions include one or more manipulations by the user to a displayed visual representation of a location of one room relative to a displayed visual representation of another location of another room to change at least one of a width of a wall between the one room and the another room or of an alignment of one or more walls of the one room relative to one or more other walls of the another room, and wherein the updating of the information displayed in each of the multiple panes includes changing displayed visual representations of rooms to reflect the one or more user manipulations.

18. The computer-implemented method of claim 6 wherein the obtaining of the information for the building includes capturing multiple panorama images that include a panorama image taken in each of the multiple rooms, wherein each of the panorama images includes 360 horizontal degrees of visual information around a vertical axis from an acquisition location of the panorama image, and further includes determining, by the computing device, the room layout for each of the multiple rooms based at least in part on visual information in the panorama image taken in the room.

19. The computer-implemented method of claim 18 wherein the determining of the room layout for each of the multiple rooms includes analyzing the visual information in the panorama image taken in the room.

20. The computer-implemented method of claim 18 wherein the capturing of the multiple panorama images includes capturing at least two panorama images in one of the multiple rooms, and combining information from the at least two panorama images to create a single room shape for the one room based at least in part on, for one or more points that are visible in each of the at least two panorama images, identifying a location of each of the one or more points in each of the at least two panorama images.

21. The computer-implemented method of claim 18 wherein the capturing of the multiple panorama images includes capturing an external panorama image outside of the building that shows at least some of an exterior of the building, and wherein the determining of the additional candidate rooms for each of at least one of the one or more iterations includes evaluating whether a combination of each of the additional candidate rooms with the some or all rooms in the current version of the partial floor plan for the iteration matches visual information in the external panorama image about the at least some exterior.

22. The computer-implemented method of claim 6 wherein the inter-room openings in the walls of the multiple rooms include doors and stairs and other wall openings, and wherein connections in the generated floor plan between two inter-room openings in two rooms are made between inter-room openings of a same type.

23. The computer-implemented method of claim 6 wherein the multiple rooms are a subset of a plurality of rooms for the building, and wherein the generating of the floor plan for the building further includes adding, by the computing device and in response to one or more instructions from the user, one or more additional rooms to the floor plan that are separate from the multiple rooms.

24. The computer-implemented method of claim 6 wherein the computing device implements a mapping information generation manager system that performs automated operations as part of the generating of the floor plan, including providing functionality for one or more of:
    performing a connection between two inter-room openings of two rooms by aligning walls of the two rooms; or
    selecting the first room to use as part of beginning generation of the floor plan; or
    selecting, for one of the multiple rooms that has multiple inter-room openings for which connections to other rooms have not yet been determined, one of the multiple inter-room openings for which to first determine a connection to another room; or
    performing, after the iterative expanding of the partial floor plan to include all of the multiple rooms, a global optimization of placements of the multiple rooms relative to each other for use in the generated floor plan; or
    connecting, via inter-room stair openings fora stairway in two rooms on two floors of the building, the two floors, and aligning a partial floor plan for one of the two floors with a partial floor plan of an other of the two floors based at least I part on the connecting of the two floors; or
    determining, from the panorama image for one of the multiple rooms, the room layout for the one room by using one machine learning techniques to analyze that panorama image and to determine the room shape for the one room and to identify the one or more inter-room openings in the walls of the one room.

25. A non-transitory computer-readable medium having stored contents that cause one or more computing devices to perform automated operations including at least:
    obtaining, by the one or more computing devices, and for each of multiple rooms of a building, an image of at least some of an interior of the room and information about a room layout of the room that includes a room shape of the room and includes one or more locations of one or more openings from the room to one or more other areas, wherein the room layout of the room is determined without using any acquired depth data from a depth sensor about a depth to walls of the room from an acquisition location of the image of the at least some of the interior of the room;
    generating, by the one or more computing devices, a floor plan that interconnects the multiple rooms, including:
        determining, by the one or more computing devices, and fora first room of the multiple rooms having a first opening, candidate rooms of the multiple rooms having room layouts that are options for connecting to the first room in the building via the first opening according to one or more defined metrics;
        presenting, by the one or more computing devices and to a user via a displayed graphical user interface (GUI), the image for the first room and information about at least one of the determined candidate rooms;
        obtaining, by the one or more computing devices via the displayed GUI, user confirmation of one or more second rooms that connect to the first room in the building via the first opening, and displaying a partial floor plan with the first room and the one or more second rooms interconnected via the first opening; and
        expanding, by the one or more computing devices, the partial floor plan to include all of the multiple rooms, by performing one or more further iterations each including determining additional candidate rooms to connect with one or more rooms in a current version of the partial floor plan and including presenting information via the displayed GUI to the user about at least one of the additional candidate rooms and including extending the current version of the partial floor plan by adding one or more further rooms confirmed by the user to connect with the one or more rooms in the current version of the partial floor plan; and
    providing, by the one or more computing devices, the generated floor plan, for further use involving the building.

26. The non-transitory computer-readable medium of claim 25 wherein the determining of the candidate rooms that are options according to the one or more defined metrics includes using the one or more defined metrics to rank the candidate rooms to reflect a likelihood of including a room in the building to which the first room actually connects via the first opening, and wherein the presenting of the information about the at least one determined candidate room includes selecting one or more highest ranked candidate rooms to be the at least one determined candidate room for which information is presented.

27. The non-transitory computer-readable medium of claim 25 wherein the presenting of the image for the first room and the information about the at least one determined candidate room includes overlaying information on the presented image for at least part of one of the determined candidate rooms in one or more locations that correspond to the one determined candidate room being connected via the first opening, and wherein the obtaining of the user confirmation of the one or more second rooms includes receiving information from the user to confirm that the overlaid information for the one determined candidate room in the one or more locations matches the first room and to use the one determined candidate room as some or all of the one or more second rooms.

28. The non-transitory computer-readable medium of claim 25 wherein the image for each of the multiple rooms is a panorama image with 360 degrees horizontally of visual information, wherein the first opening is a door in a wall between the first room and at least one of the one or more second rooms, and wherein the stored contents include software instructions that, when executed, further cause the one or more computing devices to perform the providing of the generated floor plan by presenting the floor plan to one or more additional users.

29. The non-transitory computer-readable medium of claim 25 wherein the candidate rooms include multiple room groups each having at least two rooms, and wherein the determining of the candidate rooms that are options according to the one or more defined metrics includes using the one or more defined metrics to rank, for each of the multiple room groups, a likelihood of the at least two rooms of the room group actually connecting to the first room via the first opening.

30. The non-transitory computer-readable medium of claim 25 wherein, for one of the further iterations, the additional candidate rooms include multiple room groups each having at least two rooms, and wherein the determining of the additional candidate rooms includes using at least one defined metric to rank, for each of the multiple room groups, a likelihood of the at least two rooms of the room group actually connecting to the rooms of the current version of the partial floor plan.

31. A system comprising:
one or more hardware processors of one or more computing devices; and
one or more memories with stored instructions that, when executed by at least one of the one or more hardware processors, cause at least one of the one or more computing devices to perform automated operations including at least:
obtaining descriptive information for multiple rooms of a building that includes, for each of the multiple rooms, a room shape of the room and one or more opening locations from the room to one or more other areas, wherein the room shape of the room is determined without using any acquired depth data from a depth sensor about a depth to walls of the room from an acquisition location of any images taken in the room;
generating a floor plan that interconnects the multiple rooms, including:
determining, for a first room of the multiple rooms having a first opening, candidate rooms of the multiple rooms that are options for connecting to the first room in the building via the first opening based at least in part on room shapes and opening locations for the candidate rooms, and ranking the candidate rooms based on one or more defined metrics;
selecting one of the candidate rooms with a highest ranking to connect to the first room via the first opening, and generating a partial floor plan with the first room and the selected candidate room interconnected via the first opening;
expanding the partial floor plan to include all of the multiple rooms, including, for each of one or more further iterations, determining additional candidate rooms to connect with one or more rooms in a current version of the partial floor plan and ranking the additional candidate rooms based on the one or more defined metrics and extending the current version of the partial floor plan by adding a highest ranked additional candidate room as being interconnected with the one or more rooms in the current version of the partial floor plan; and
presenting, to a user via a displayed graphical user interface (GUI), the expanded partial floor plan and additional information for one or more of the multiple rooms, and obtaining user confirmation of a final version of the expanded partial floor plan to use as the generated floor plan; and
providing the generated floor plan for further use.

32. The system of claim 31 wherein the ranking of the candidate rooms based on the one or more defined metrics includes using the one or more defined metrics to rank the candidate rooms to reflect a likelihood of being a room in the building to which the first room actually connects via the first opening, wherein the selecting of the one candidate room with the highest ranking includes displaying information to the user via the displayed GUI that reflects a connection from the first room to the selected one candidate room via the first opening and includes obtaining a confirmation from the user via the displayed GUI to use the selected one candidate room in the generated floor plan as being connected to the first room via the first opening, and wherein each extending of the current version of the partial floor plan by adding a highest ranked additional candidate room includes obtaining an additional confirmation from the user to add that highest ranked additional candidate room to the current version of the partial floor plan.

33. The system of claim 32 wherein the displaying of the information to the user via the displayed GUI that reflects the connection from the first room to the selected one candidate room includes displaying an image of an interior of the first room and overlaying information on the displayed image for at least part of the selected one candidate room in one or more locations that correspond to the selected one candidate room being connected via the first opening.

34. The system of claim 31 wherein the selecting of the one candidate room with the highest ranking to connect to the first room is based on an instruction received from the user via the displayed GUI to use that one candidate room to connect to the first room via the first opening, wherein the first opening is a door in a wall between the first room and the selected one candidate room, and wherein the stored instructions include software instructions that, when executed, further cause the one or more computing devices to perform the providing of the generated floor plan by presenting the floor plan to one or more additional users.

* * * * *